US008561734B2

(12) United States Patent
Furuta et al.

(10) Patent No.: US 8,561,734 B2
(45) Date of Patent: Oct. 22, 2013

(54) CAR, WALKING APPARATUS, AND METHOD OF DETERMINING SHAPE OF WHEEL

(75) Inventors: Takayuki Furuta, Chiba (JP); Masaharu Shimizu, Tokyo (JP); Hideaki Yamato, Chiba (JP); Yu Okumura, Tokyo (JP); Tetsuo Tawara, Tokyo (JP); Masaki Shimomura, Tokyo (JP); Ken Endo, Shizuoka (JP)

(73) Assignee: Chiba Institute of Technology, Narashino-Shi (JP)

( * ) Notice: Subject to any disclaimer, the term of this patent is extended or adjusted under 35 U.S.C. 154(b) by 382 days.

(21) Appl. No.: 12/700,325

(22) Filed: Feb. 4, 2010

(65) Prior Publication Data
US 2010/0193265 A1    Aug. 5, 2010

Related U.S. Application Data

(62) Division of application No. 11/636,687, filed on Dec. 8, 2006, now abandoned.

(30) Foreign Application Priority Data

| May 8, 2006 | (JP) | 2006-129078 |
| May 8, 2006 | (JP) | 2006-129079 |
| May 29, 2006 | (JP) | 2006-148416 |
| Jun. 13, 2006 | (JP) | 2006-163959 |

(51) Int. Cl.
*B62D 57/00* (2006.01)

(52) U.S. Cl.
USPC ............... 180/13; 180/282; 701/124; 301/5.1

(58) Field of Classification Search
USPC ............... 180/8.1–8.6, 13, 282; 305/1, 19; 701/124
See application file for complete search history.

(56) References Cited

U.S. PATENT DOCUMENTS

| 2,041,947 | A | * | 5/1936 | Olley | 280/124.106 |
| 2,186,065 | A | * | 1/1940 | Fischer | 280/124.136 |
| 2,657,067 | A | * | 10/1953 | Kolbe | 280/124.103 |
| 2,760,786 | A | * | 8/1956 | Kolbe | 280/5.509 |
| 2,768,000 | A | * | 10/1956 | Saives | 280/124.104 |
| 2,816,616 | A | * | 12/1957 | Hill | 180/359 |

(Continued)

FOREIGN PATENT DOCUMENTS

| JP | 57-024169 A | 2/1982 |
| JP | 63275486 A | 11/1988 |

(Continued)

OTHER PUBLICATIONS

Japanese Office Action, Application No. 2004-156073, Mailing Date May 19, 2009.

(Continued)

*Primary Examiner* — Anne Marie Boehler
*Assistant Examiner* — Maurice Williams
(74) *Attorney, Agent, or Firm* — Nutter McClennen & Fish LLP; John J. Penny, V.; Christopher A. Potts

(57) ABSTRACT

A car having a rotatable wheel, the car being able to run by rotating the wheel, the car having a leg used by the car for walking, and an attitude stabilization section for stabilizing an attitude of the car.

2 Claims, 33 Drawing Sheets

(56) References Cited

U.S. PATENT DOCUMENTS

| | | | |
|---|---|---|---|
| 3,006,581 A | 10/1961 | Langman | |
| 3,065,976 A * | 11/1962 | Vogel | 280/5.503 |
| 3,250,137 A | 5/1966 | Delsuc | |
| 3,402,783 A * | 9/1968 | Trachte et al. | 180/360 |
| 3,500,763 A * | 3/1970 | Mesnager | 104/23.2 |
| 3,608,236 A | 9/1971 | Janos et al. | |
| 3,756,338 A | 9/1973 | Goodridge | |
| 4,365,437 A | 12/1982 | Jameson | |
| 5,314,034 A | 5/1994 | Chittal | |
| 5,423,708 A | 6/1995 | Allen | |
| 5,492,390 A | 2/1996 | Kugelmann, Sr. | |
| 5,701,965 A | 12/1997 | Kamen et al. | |
| 5,944,417 A * | 8/1999 | Shiotani | 366/220 |
| 6,247,546 B1 | 6/2001 | Spletzer et al. | |
| 6,377,906 B1 | 4/2002 | Rowe | |
| 6,414,457 B1 * | 7/2002 | Agrawal et al. | 318/568.12 |
| 6,431,296 B1 | 8/2002 | Won | |
| 6,527,071 B1 | 3/2003 | Villedieu | |
| 6,571,892 B2 | 6/2003 | Kamen et al. | |
| 6,714,858 B2 | 3/2004 | Oblizajek et al. | |
| 6,725,895 B1 * | 4/2004 | Tsipov | 152/415 |
| 6,752,400 B2 | 6/2004 | Nakatsukasa et al. | |
| 6,860,346 B2 * | 3/2005 | Burt et al. | 180/8.2 |
| 6,934,611 B2 | 8/2005 | McKeown et al. | |
| 7,004,271 B1 | 2/2006 | Kamen et al. | |
| 7,017,687 B1 * | 3/2006 | Jacobsen et al. | 180/8.3 |
| 7,401,794 B2 * | 7/2008 | Laurent et al. | 280/5.514 |
| 2002/0063006 A1 | 5/2002 | Kamen et al. | |
| 2002/0189883 A1 * | 12/2002 | Lahmann et al. | 180/282 |
| 2003/0144767 A1 | 7/2003 | Brachert et al. | |
| 2004/0050609 A1 * | 3/2004 | Machida et al. | 180/282 |
| 2004/0195021 A1 * | 10/2004 | Jeswine et al. | 180/164 |
| 2005/0006166 A1 * | 1/2005 | Cho | 180/282 |
| 2005/0242557 A1 * | 11/2005 | Wang et al. | 280/755 |
| 2007/0084662 A1 | 4/2007 | Oikawa | |
| 2007/0193803 A1 | 8/2007 | Geiser | |
| 2007/0257451 A1 | 11/2007 | Furuta et al. | |
| 2010/0198493 A1 | 8/2010 | Furuta et al. | |

FOREIGN PATENT DOCUMENTS

| | | |
|---|---|---|
| JP | 04201793 A | 7/1992 |
| JP | 06031655 A | 2/1994 |
| JP | 6261485 A | 9/1994 |
| JP | 09175462 A | 7/1997 |
| JP | 2002500113 | 1/2002 |
| JP | 2002227883 A | 8/2002 |
| JP | 2003340762 A | 12/2003 |
| JP | 2004009205 A | 1/2004 |
| JP | 2005-162060 A | 6/2005 |
| JP | 2005335513 A | 12/2005 |

OTHER PUBLICATIONS

Japanese Office Action, Application No. 2006-129078, Mailing Date Oct. 20, 2009.

U.S. Office Action issued Oct. 19, 2012 for U.S. Appl. No. 12/700,359.

U.S. Office Action issued Jun. 19, 2012 for U.S. Appl. No. 12/700,359.

Japanese Office Action mailed Apr. 17, 2012 for Application No. 2006-163959.

U.S. Office Action issued Oct. 13, 2011 for U.S. Appl. No. 12/700,359.

Japanese Office Action Application No. 2006-148416, Mailed Jun. 7, 2011.

* cited by examiner

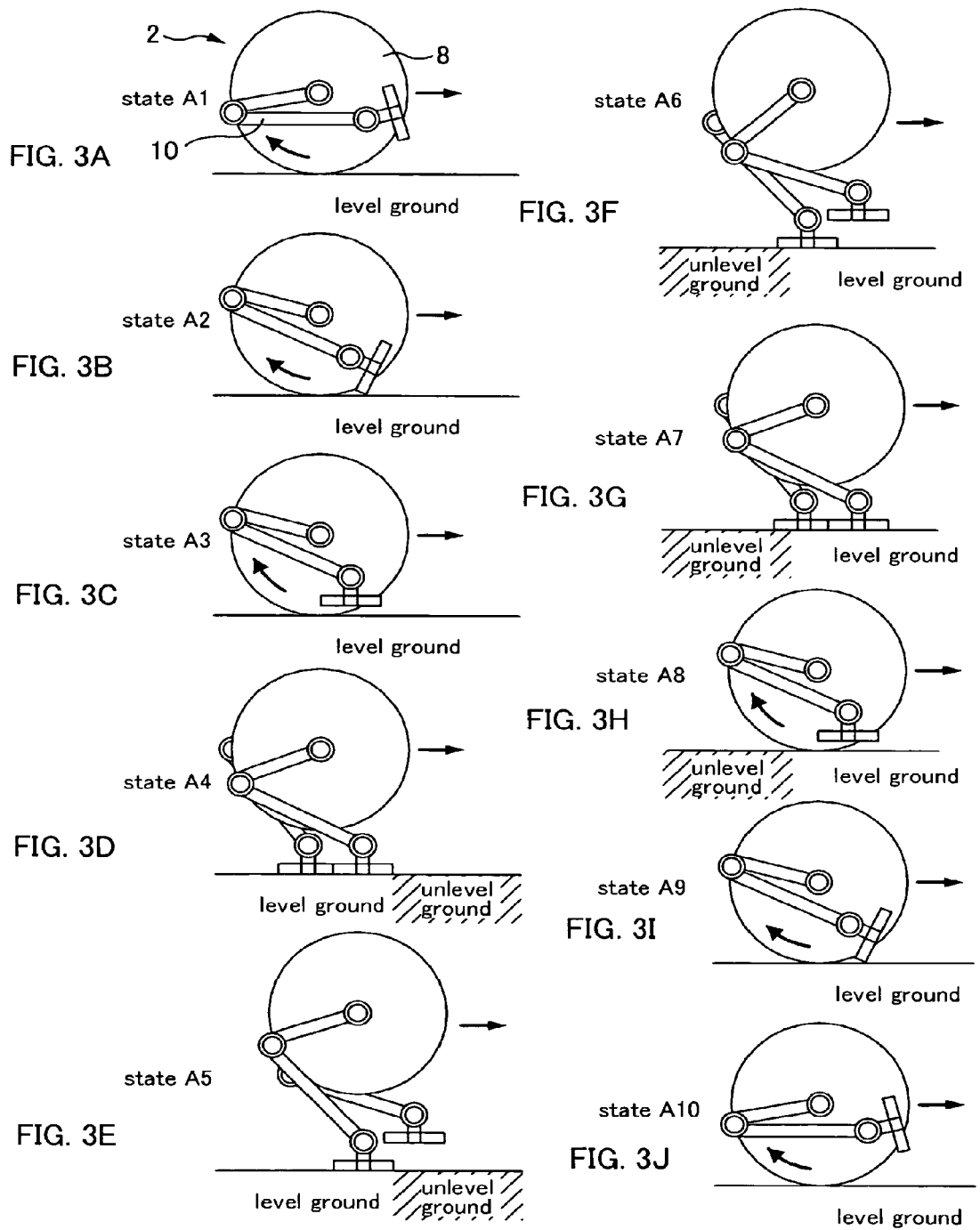

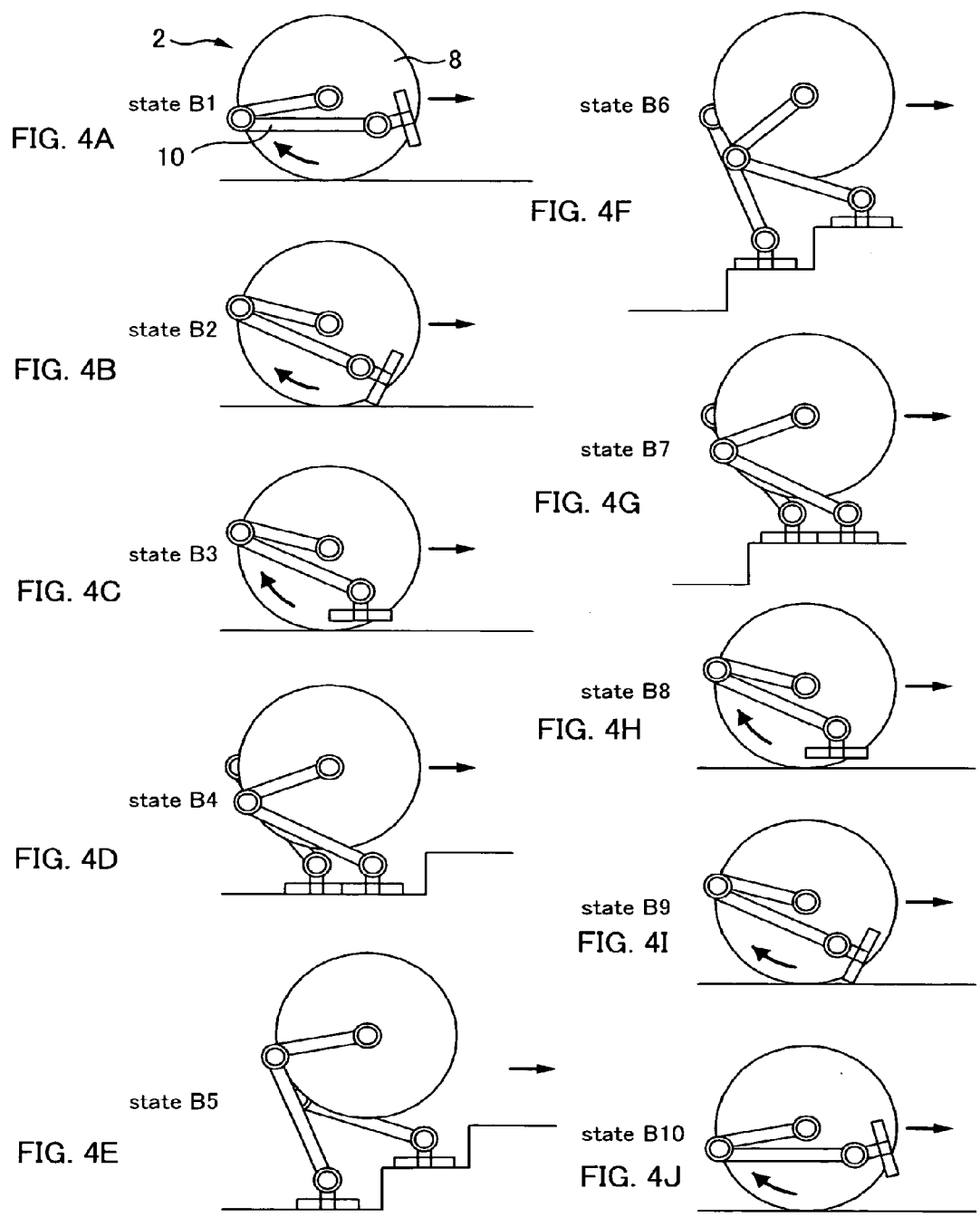

CAR, WALKING APPARATUS, AND METHOD OF DETERMINING SHAPE OF WHEEL

RELATED APPLICATIONS

This application is a divisional application based on U.S. application Ser. No. 11/636,687 filed on Dec. 8, 2006, entitled "CAR, WALKING APPARATUS, AND METHOD OF DETERMINING SHAPE OF WHEEL." The teachings of the aforementioned application are incorporated herein by reference.

CROSS-REFERENCE TO RELATED APPLICATIONS

Japanese Patent Application No. 2004-156073 filed on May 26, 2004, is incorporated by reference.

The present application claims priority upon Japanese Patent Application No. 2006-129078 filed on May 8, 2006, Japanese Patent Application No. 2006-129079 filed on May 8, 2006, Japanese Patent Application No. 2006-148416 filed on May 29, 2006 and Japanese Patent Application No. 2006-163959 filed on Jun. 13, 2006, which are herein incorporated by reference.

BACKGROUND

1. Technical Field

The present invention relates to cars, walking apparatuses, and methods of determining shape of wheel.

2. Related Art

Cars are already well known. The car is provided with a rotatable wheel and runs in a predetermined traveling direction by the wheel rotating (refer to JP-A-2002-227883).

By the way, a typical car is provided with the rotatable wheel and runs in a predetermined traveling direction by rotating the wheel. Such a car can make a turn by changing a direction of the wheel and can move backwards by rotating the wheel in an opposite direction, however, diversity of those movements is limited.

Walking apparatuses are well known. The walking apparatus is provided with legs for walking (refer to JP-A-2002-227883).

Cars having wheels that can rotate about a rotation axis are already well known. Furthermore, among the cars, there are cars provided with an attitude control mechanism for controlling the attitude of the car. Moreover, a wheel that is provided to the car has a contacting portion that can contact the ground while the car is moving and that is located lower than the rotation axis (refer to JP-A-2005-335513).

By the way, the attitude of the car needs to be able to change according to the movement of the car. For example, when the car performs a turning movement, a direction changing movement and so on, the attitude of the car needs to be inclined. In addition, the easier it is to incline the attitude of the car, the more the maneuverability of the car improves. For this reason, it is preferable that the contacting portion of the wheel is in a shape in which the attitude of the car can be easily changed to an inclined state.

On the other hand, the attitude of the car must be appropriately controlled by the attitude control mechanism. For example, the attitude of the car in the inclined state needs to be appropriately restored to an upright state by control of the attitude control mechanism. However, an attitude control ability of the attitude control mechanism has a limit, and depending on the shape of the contacting portion, there is a possibility that the attitude of the car is not maintained in an appropriate state. Therefore, the shape of the contacting portion needs to be a shape that takes into account the limit of the attitude control ability of the attitude control mechanism, so that the attitude of the car is maintained in an appropriate state.

There is already well known a car having a car body, and a wheel that is rotatably provided to the car body; an attitude of the car being restorable to a non-inclined state from an inclined state in which the car body and the wheel are inclined to the side, by control of an attitude control mechanism that controls the attitude of the car (refer to JP-A-2005-335513).

By the way, the shape of the wheel had been determined from the viewpoint of, for example, versatility, manufacturability, design, and the like.

However, the shape of the wheel influences the performance of the car, and in particular, whether or not the attitude of the car in the inclined state can be restored to the non-inclined state depends on the shape of the wheel. Therefore, in the case where the wheel with a shape which was determined from the viewpoint mentioned above is provided to the car, there is a possibility that the attitude of the car in the inclined state can not be appropriately restored to the non-inclined state by the control of the attitude control mechanism, and it becomes difficult to improve the performance of the car.

SUMMARY

An advantage of a first aspect and a second aspect of the invention is that it is possible to realize a car that can perform various types of movements.

An aspect of the invention is a car having a rotatable wheel, the car being able to run by rotating the wheel; the car including:
a leg used by the car for walking; and
an attitude stabilization section for stabilizing an attitude of the car.

An aspect of the invention is a car having a rotatable wheel, the car being able to run by rotating the wheel, the car including:
a leg used by the car for walking;
a rotatable flywheel with an axial direction of a rotation axis that is along an axial direction of a rotation axis of the wheel; and
a control moment gyro for stabilizing an attitude of the car.

An advantage of a third aspect of the invention is that it is possible to realize a walking apparatus that can perform carious movements.

An aspect of the invention is a walking apparatus that can walk including:
a leg used for walking of the walking apparatus; and
an attitude stabilization section for stabilizing an attitude of the walking apparatus.

An advantage of a fourth aspect of the present invention is that it is possible to realize a car that can easily change its attitude to an inclined state, and maintain the attitude in an appropriate state.

An aspect of the invention is a car having a wheel that is rotatable about a rotation axis including,
an attitude control mechanism for controlling an attitude of the car,
wherein the wheel has a contacting portion that can contact a ground while the car is moving, and that is located lower than the rotation axis,
wherein when an imaginary plane that includes the rotation axis and in which the normal direction is a horizontal direction is a first imaginary plane, an intersection line of the contacting portion and the first imaginary plane is a curved line, wherein among the points on the curved line are included a first point that satisfies a following first condition and a second point that satisfies a following second condition, wherein in the first condition, a second imaginary plane includes the first point and is perpendicular to the first imaginary plane, the second imaginary plane in which the normal direction of the second imaginary plane is a tangential direction of the curved line at the first point, being located lower than the center of gravity of the car, and wherein in the second condition, a third imaginary plane includes the second point and is perpendicular to the first imaginary plane, the third imaginary plane in which the normal direction of the third imaginary plane is a tangential direction of the curved line at the second point, being located upper than the center of gravity of the car.

An advantage of a fifth aspect of the present invention is that it is possible to provide a shape of a wheel that improves performance of a car.

An aspect of the invention is a method of determining a shape of a wheel of a car; the car having a car body, and the wheel that is rotatably provided to the car body; an attitude of the car being restorable to a non-inclined state from an inclined state in which the car body and the wheel are inclined to the side, by control of an attitude control mechanism that controls the attitude in order to restore the attitude of the car; the method including: determining the attitude in which state is to be restored to the non-inclined state, in order to set an attitude restoring performance of the car; and determining the shape of the wheel, based on a result that has been determined and a parameter showing a control ability of the attitude control mechanism.

Other features of the invention will become clear through the description of the present specification with reference to the accompanying drawings.

BRIEF DESCRIPTION OF THE DRAWINGS

For a more complete understanding of the invention and the advantages thereof, reference is now made to the following description taken in conjunction with the accompanying drawings wherein:

FIGS. 3A to 3J are state transition diagrams for explaining the example of switching between a running movement and a walking movement in the case the ground is made level and in the case the ground is not made level;

FIGS. 4A to 4J are state transition diagrams for explaining the example of switching between the running movement and the walking movement in the case where there are stairs and in the case where there are no stairs;

DESCRIPTION OF EXEMPLARY EMBODIMENTS

Figure 1:
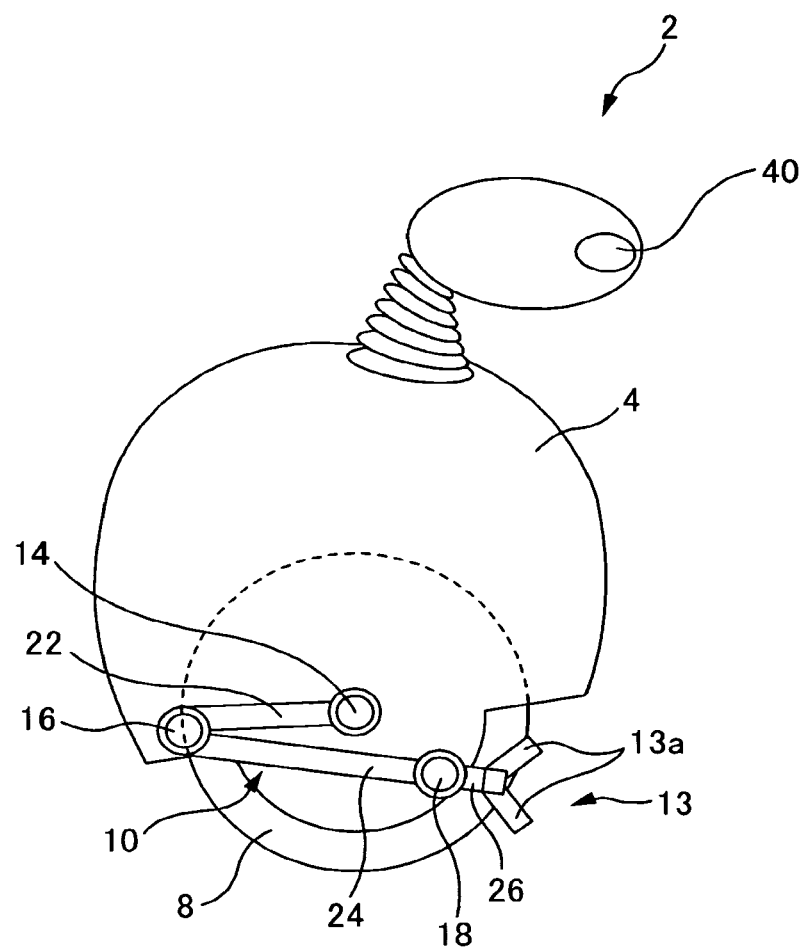
FIG. 1 is a schematic diagram showing an external configuration of the monocycle 2.

At least the following matters will be made clear by the explanation in the present specification and the description of the accompanying drawings.

A car having a rotatable wheel, the car being able to run by rotating the wheel; the car including:

a leg used by the car for walking; and an attitude stabilization section for stabilizing an attitude of the car.

Thus, it is possible to realize a car that can perform various movements with stability.

Further, it is possible that the attitude stabilization section is a control moment gyro.

Thus, it is possible to stabilize the attitude of the car appropriately even if a large external force that makes the attitude of the car change is applied to the car.

Further, it is possible that the control moment gyro includes a rotatable flywheel and an axial direction of a rotation axis of the flywheel can be along a direction from a contacting portion toward a center portion of the wheel. Further, it is possible that the car has a plurality of the control moment gyros, wherein the control moment gyro includes the rotatable flywheel, and wherein the axial direction of the rotation axis of the flywheels provided to each of the control moment gyros are different to each other.

Further, number of the above wheel can be one.

In such a case, an effect of the attitude stabilization section, namely, an effect of making it possible for the car to perform various movements with stability will be exerted more effectively.

Further, it is possible that the car has at least two legs, wherein the leg includes a foot and a plurality of joint portions, wherein the car walks by making the feet alternately contact the ground by bending and extending the joint portions.

In such a case, it is possible to perform the walking movement appropriately.

Further, the above foot can include a finger part which can hold an object.

In such a case, the variation of movements of the car increases.

Further, the car can be provided with a hand that can hold an object and an arm that is connected to the hand.

In such a case, the variation of movements of the car further increases.

Further, the car can run by rotating the wheel, in a state that the legs are folded by bending the joint portions.

In such a case, the possibility of the legs hindering the running movement of the car decreases.

Further, the car can walk by making the feet alternately contact the ground by bending and extending the joint portions, in the state that the wheel is not contacting the ground.

In such a case, the possibility of the wheel hindering the walking movement of the car decreases.

Further, it is possible that the car switches between a running movement by the wheel and a walking movement by the legs, according to the state of the ground.

In such case, it is possible for the car to move efficiently.

Further, it is possible that the car has a detection section for detecting the state of the ground, wherein the car switches between the running movement by the wheel and the walking movement by the legs, according to an output from the detection section.

In such a case, the car can move efficiently, even if information regarding the state of the ground is not provided beforehand.

Further, it is possible that the feet are made to contact the ground when passing a step or projections and depressions, in the case where there is the step or projections and depressions on the ground during the running movement by the wheel.

In such case, it becomes possible to prevent the car from being applied with an excessive impact.

Further, it is possible that the car has the detection section for detecting the step or projections and depressions, wherein the feet are made to contact the ground, according to an output from the detection section.

In such a case, it becomes possible to prevent the car from being applied with an excessive impact, even if information regarding the step or projections and depressions is not provided beforehand.

Further, it is possible that the car runs by rotating the wheel, in the state an object is held by the finger part provided to the foot.

In such a case, it is possible to carry the object appropriately.

Further, it is possible that the car runs by rotating the wheel, and walks by making the feet alternately contact the ground by bending and extending the joint portions, in the state an object is held by the hand.

In such a case, it is possible to carry the object appropriately.

Further, the car can be a monocyclic passenger car that a person can ride in.

In such a case, a monocyclic passenger car with a high level of convenience is realized.

Further, there can be realized the car having a rotatable wheel, the car being able to run by rotating the wheel; the car including:

a leg used by the car for walking; and an attitude stabilization section for stabilizing an attitude of the car, wherein the attitude stabilization section is a control moment gyro, wherein the control moment gyro includes a rotatable flywheel, wherein an axial direction of a rotation axis of the flywheel is along a direction from a contacting portion toward a center portion of the wheel, wherein the number of the wheel is one, having at least two legs, wherein the leg includes a foot and a plurality of the joint portions, wherein the car walks by making the feet alternately contact the ground by bending and extending the joint portions, wherein the foot includes a finger part that can hold an object, wherein the car runs by rotating the wheel, in a state that the legs are folded by bending the joint portions, wherein the car walks by making the feet alternately contact the ground by bending and extending the joint portions, in the state that the wheel is not contacting the ground, wherein the car switches between a running movement by the wheel and a walking movement by the legs, according to the state of the ground, having a detection section for detecting the state of the ground, wherein the car switches between the running movement by the wheel and the walking movement by the legs, according to an output from the detection section, wherein the feet are made to contact the ground when passing a step or projections and depressions, in the case where there is the step or projections and depressions on the ground during the running movement by the wheel, having the detection section for detecting the step or projections and depressions, wherein the feet are made to contact the ground, according to an output from the detection section, wherein the car runs by rotating the wheel, in the state an object is held by the finger part provided to the foot, and wherein the car is a monocyclic passenger car that a person can ride in.

A car having a rotatable wheel, the car being able to run by rotating the wheel, the car including:

a leg used by the car for walking;

a rotatable flywheel with an axial direction of a rotation axis that is along an axial direction of a rotation axis of the wheel; and a control moment gyro for stabilizing an attitude of the car.

Thus, it is possible to realize a car that can stably perform various movements.

Further it is possible that the number of the wheel is one.

In this case, an effect of the control moment gyro, that is, an effect that the car can stably perform various movements can be more effectively exerted.

Further, it is possible that a car has at least two legs, wherein the leg includes a foot and a plurality of joint portions, wherein the car walks by making the feet alternately contact the ground by bending and extending the joint portions.

In this case, it is possible to appropriately perform a walking movement.

Further it is possible that the foot includes a finger part that can hold an object.

In this case, variations in the movement of the car increases.

Further it is possible that a car includes a hand that can hold an object; and an arm that is connected to the hand.

In this case, variations in the movement of the car further increases.

Further it is possible that the car runs by rotating the wheel, in a state that the legs are folded by bending the joint portions.

In this case, the possibility of the legs obstructing the running movement of the car decreases.

Further, it is possible that the car walks by making the feet alternately contact the ground by bending and extending the joint portions, in the state that the wheel is not contacting the ground.

In this case, the possibility of the wheels obstructing the running movement of the car decreases.

Further, it is possible that the car switches between a running movement by the wheel and a walking movement by the legs, according to the state of the ground.

In this case, it is possible for the car to move efficiently.

Further, it is possible that a car includes, a detection section for detecting the state of the ground, wherein the car switches between the running movement by the wheel and the walking movement by the legs, according to an output from the detection section.

In this case, it is possible for the car to move efficiently, even if information regarding the state of the ground is not provided in advance.

Further, it is possible that in the case where there is a step or projections and depressions on the ground during the running movement by the wheel, the feet are made to contact the ground when passing the step or the projections and depressions.

In this case, it is possible to prevent excess impact being applied to the car.

Further, it is possible that a car has a detection section for detecting the step or the projections and depressions, wherein the feet are made to contact the ground, according to an output from the detection section.

In this case, it is possible to prevent excess impact being applied to the car, even if information regarding steps and projections and depressions is not provided in advance.

Further, it is possible that the car runs by rotating the wheel, in the state an object is held by the finger part provided to the foot.

In this case, it is possible to carry the object appropriately.

Further, it is possible that the car runs by rotating the wheel, and walks by making the feet alternately contact the ground by bending and extending the joint portions, in the state an object is held by the hand.

In this case, it is possible to carry the object appropriately.

Further, it is possible that the car is a monocyclic passenger car that a person can ride in.

In this case, it is possible to realize a monocyclic passenger car that is convenient.

Further, it is possible to realize a car having a rotatable wheel, the car being able to run by rotating the wheel, the car including:

a leg used by the car for walking;

a rotatable flywheel with an axial direction of a rotation axis that is along an axial direction of a rotation axis of the wheel; and a control moment gyro for stabilizing an attitude of the car, wherein the number of the wheel is one, having at least two legs, wherein the leg includes a foot and a plurality of joint portions, wherein the car walks by making the feet alternately contact the ground by bending and extending the joint portions, wherein the foot includes a finger part that can hold an object, wherein the car runs by rotating the wheel, in a state that the legs are folded by bending the joint portions, wherein the car walks by making the feet alternately contact the ground by bending and extending the joint portions, in the state that the wheel is not contacting the ground, wherein the car switches between a running movement by the wheel and a walking movement by the legs, according to the state of the ground, including a detection section for detecting the state of the ground, wherein the car switches between the running movement by the wheel and the walking movement by the legs, according to an output from the detection section, wherein, in the case where there is a step or projections and depressions on the ground during the running movement by the wheel, the feet are made to contact the ground when passing the step or the projections and depressions, having a detection section for detecting the step or the projections and depressions, wherein the feet are made to contact the ground, according to an output from the detection section, wherein the car runs by rotating the wheel, in the state an object is held by the finger part provided to the foot, wherein the car is a monocyclic passenger car that a person can ride in.

A walking apparatus that can walk including:

a leg used for walking of the walking apparatus; and an attitude stabilization section for stabilizing an attitude of the walking apparatus.

Thus, it is possible to realize a walking apparatus that can stably perform various movements.

Further it is possible that the attitude stabilization section is a control moment gyro.

Thus, it is possible to appropriately stabilize the attitude of the walking apparatus, even in the case where a large external force that changes the attitude is applied to the walking apparatus.

Further it is possible that a walking apparatus has a plurality of the control moment gyros, wherein the control moment gyro includes a rotatable flywheel, wherein the axial direction of the rotation axis of the flywheels provided to each of the control moment gyros are different to each other.

Further it is possible that a walking apparatus has at least two legs, wherein the leg includes a foot and a plurality of joint portions, wherein the walking apparatus walks by making the feet alternately contact the ground by bending and extending the joint portions.

In this case, it is possible to appropriately perform a walking movement.

Further it is possible that a walking apparatus includes:

a hand that can hold an object; and an arm that is connected to the hand.

In this case, the variation of movements of the walking apparatus further increases.

Further it is possible that the walking apparatus walks by making the feet alternately contact the ground by bending and extending the joint portions, in the state an object is held by the hand.

In this case, it is possible to appropriately carry the object.

Further it is possible to realize a walking apparatus, including:

a leg used for walking of the walking apparatus; and an attitude stabilization section for stabilizing an attitude of the walking apparatus, wherein the attitude stabilization section is a control moment gyro, having a plurality of the control moment gyros, wherein the control moment gyro includes a rotatable flywheel, wherein the axial direction of the rotation axis of the flywheels provided to each of the control moment gyros are different to each other, having at least two legs, wherein the leg includes a foot and a plurality of joint portions, wherein the walking apparatus walks by making the feet alternately contact the ground by bending and extending the joint portions, including a hand that can hold an object, and an arm that is connected to the hand, wherein the walking apparatus walks by making the feet alternately contact the ground by bending and extending the joint portions, in the state an object is held by the hand.

A car having a wheel that is rotatable about a rotation axis including, an attitude control mechanism for controlling an attitude of the car, wherein the wheel has a contacting portion that can contact a ground while the car is moving, and that is located lower than the rotation axis, wherein when an imaginary plane that includes the rotation axis and in which the normal direction is a horizontal direction is a first imaginary plane, an intersection line of the contacting portion and the first imaginary plane is a curved line, wherein among the points on the curved line are included a first point that satisfies a following first condition and a second point that satisfies a following second condition, wherein in the first condition, a second imaginary plane includes the first point and is perpendicular to the first imaginary plane, the second imaginary plane in which the normal direction of the second imaginary plane is a tangential direction of the curved line at the first point, being located lower than the center of gravity of the car, and wherein in the second condition, a third imaginary plane includes the second point and is perpendicular to the first imaginary plane, the third imaginary plane in which the normal direction of the third imaginary plane is a tangential direction of the curved line at the second point, being located upper than the center of gravity of the car.

On the other hand, a car having a wheel that is rotatable about a rotation axis including, an attitude control mechanism for controlling an attitude of the car, wherein the wheel has a contacting portion that can contact a ground while the car is moving, and that is located lower than the rotation\ axis, wherein when an imaginary plane that includes the rotation axis and in which the normal direction is a horizontal direction is a first imaginary plane, an intersection line of the contacting portion and the first imaginary plane has a straight line portion and a curved line portion, wherein among the points on the curved line portion is included a first point that satisfies the following first condition, and wherein in the first condition, a second imaginary plane includes the first point and is perpendicular to the first imaginary plane, the second imaginary plane in which the normal direction of the second imaginary plane is a tangential direction of the curved line portion at the first point, being located lower than the center of gravity of the car.

Thus, it is possible to realize a car that can easily change its attitude to an inclined state, and maintain the attitude in an appropriate state.

Further, it is possible that both ends of the intersection line are adjacent to non-contacting portions that do not contact the ground while the car is moving, and that is provided on the wheel, wherein a center of the intersection line contacts the ground when the car is in an upright state, and wherein the intersection line includes a first curved line portion in which all points on the line are the first points and a second curved line portion in which all points on the line are the second points.

On the other hand, it is possible that both ends of the intersection line are adjacent to non-contacting portions that do not contact the ground while the car is moving, and that is provided on the wheel, wherein a center of the intersection line contacts the ground when the car is in an upright state, wherein the points on the curved line portion are all the first points.

Further, the second curved line portion can be located at both end portions of the intersection line.

On the other hand, the straight line portion can be located at both end portions of the intersection line.

Thus, it is possible to prevent a car from falling down when a large external force is applied to the car.

Further, the second curved line portion can be located at a center portion of the intersection line.

On the other hand, the straight line portion can be located at a center portion of the intersection line.

Thus, the attitude of the car in the upright state can be appropriately maintained.

Further, the attitude control mechanism can be a control moment gyro.

Thus, the attitude of the car can be more appropriately controlled by effectively exerting the attitude control ability of the control moment gyro.

Further, the number of the wheel can be one.

Thus, in the case where the number of the wheel is one, the attitude of the car is apt to become unstable, and the attitude of the car can be changed to the inclined state more easily.

Further, it is possible to realize a car having a wheel that is rotatable about a rotation axis including, an attitude control mechanism for controlling an attitude of the car, wherein the wheel has a contacting portion that can contact a ground while the car is moving, and that is located lower than the rotation axis, when an imaginary plane that includes the rotation axis and in which the normal direction is a horizontal direction is a first imaginary plane, an intersection line of the contacting portion and the first imaginary plane is a curved line, among the points on the curved line are included a first point that satisfies a following first condition and a second point that satisfies a following second condition, both ends of the intersection line are adjacent to non-contacting portions that do not contact the ground while the car is moving, and that is provided on the wheel, a center of the intersection line contacts the ground when the car is in an upright state, the intersection line includes a first curved line portion in which all points on the line are the first points and a second curved line portion in which all points on the line are the second points, the second curved line portion is located at a center portion of the intersection line, the attitude control mechanism is a control moment gyro, the number of the wheel is one, in the first condition, a second imaginary plane includes the first point and is perpendicular to the first imaginary plane, the second imaginary plane in which the normal direction of the second imaginary plane is a tangential direction of the curved line at the first point, being located lower than the center of gravity of the car, and in the second condition, a third imaginary plane includes the second point and is perpendicular to the first imaginary plane, the third imaginary plane in which the normal direction of the third imaginary plane is a tangential direction of the curved line at the second point, being located upper than the center of gravity of the car.

On the other hand, it is possible to realize a car having a wheel that is rotatable about a rotation axis including, an attitude control mechanism for controlling an attitude of the car, wherein the wheel has a contacting portion that can contact a ground while the car is moving, and that is located lower than the rotation axis, when an imaginary plane that includes the rotation axis and in which the normal direction is a horizontal direction is a first imaginary plane, an intersection line of the contacting portion and the first imaginary plane has a straight line portion and a curved line portion, among the points on the curved line portion is included a first point that satisfies the following first condition, and both ends of the intersection line are adjacent to non-contacting portions that do not contact the ground while the car is moving, and that is provided on the wheel, a center of the intersection line contacts the ground when the car is in an upright state, the points on the curved line portion are all the first points, the straight line portion is located at both end portions of the intersection line, the straight line portion is located at a center portion of the intersection line, the attitude control mechanism is a control moment gyro, and the number of the wheel is one, in the first condition, a second imaginary plane includes the first point and is perpendicular to the first imaginary plane, the second imaginary plane in which the normal direction of the second imaginary plane is a tangential direction of the curved line portion at the first point, being located lower than the center of gravity of the car.

Thus, since almost all of the previously described effects can be achieved, the effect of the present invention can be achieved more effectively.

A method of determining a shape of a wheel of a car, the car having a car body, and the wheel that is rotatably provided to the car body; an attitude of the car being restorable to a non-inclined state from an inclined state in which the car body and the wheel are inclined to the side, by control of an attitude control mechanism that controls the attitude in order to restore the attitude of the car; the method including:

determining the attitude in which state is to be restored to the non-inclined state, in order to set an attitude restoring performance of the car; and determining the shape of the wheel, based on a result that has been determined and a parameter showing a control ability of the attitude control mechanism.

By such method of determining the shape of the wheel, it is possible to provide the shape of the wheel so as to improve the performance of the car.

Further, the number of the wheel provided to the car can be one.

Thus, the attitude of the car becomes more likely to be changed to the inclined state, and since the attitude of the car needs to be appropriately restored to the non-inclined state, effect of this invention becomes more significant.

Further, the car can be provided with a control moment gyro having a flywheel that can rotate about its rotation axis, as an attitude control mechanism.

Thus, the shape of the wheel can be appropriately determined, based on the control ability of the control moment gyro.

Further, the rotation axis of the flywheel can be along the rotation axis of the wheel.

Further, it is possible that an intersection line of a contacting portion that can contact a ground while the car is moving, and that is provided to the wheel located on a lower side of the rotation axis of the wheel, and an imaginary plane in which a normal direction is a horizontal direction, and that includes the rotation axis of the wheel, is an arc, wherein when determining the shape of the wheel, a radius of curvature of the arc is determined as the shape of the wheel.

Further, it is possible that the car is provided with a rotation control mechanism that controls a rotation of the wheel in order to restore an attitude of the car from a tilted state in which the car body tilts in a front-to-rear direction, to a non-tilted state, wherein the method includes determining the attitude in which tilted state is to be restored to the non-tilted state, in order to set the attitude restoring performance of the car, and determining an external diameter of the wheel as the shape of the wheel, based on a result that is determined and a parameter showing a control ability of the rotation control mechanism.

Thus, the tilted state attitude can be appropriately restored to the non-tilted state.

Further, when determining the attitude in which state is to be restored to the non-inclined state, the attitude in which inclined state and in which tilted state is to be restored can be determined.

Thus, which inclined state attitude and the tilted state attitude is to be restored becomes clear, and since it is possible to consider the effect of a rotation moment which is generated when the attitude of the car is in the inclined state and in the tilted state, the shape of the wheel can be determined more appropriately.

Further, the parameter showing the control ability of the attitude control mechanism can include a maximum number of rotations of the flywheel, a diameter of the flywheel, and a maximum output of a gimbal motor that controls a rotation of a rotatable gimbal that holds the flywheel.

Further, wherein the rotation control mechanism can be a driving motor for rotating the wheel, and the parameter showing the control ability of the rotation control mechanism can include the maximum output of the driving motor.

In addition, a method of determining a shape of a wheel of a car; the car having a car body, and the wheel that is rotatably provided to the car body; an attitude of the car being restorable to a non-inclined state from an inclined state in which the car body and the wheel are inclined to the side, by control of an attitude control mechanism that controls the attitude in order to restore the attitude of the car; the method including:

determining the attitude in which state is to be restored to the non-inclined state, in order to set an attitude restoring performance of the car; and determining the shape of the wheel, based on a result that has been determined and a parameter showing a control ability of the attitude control mechanism, wherein the number of the wheel provided to the car is one, wherein the car is provided with a control moment gyro having a flywheel that can rotate about its rotation axis, as an attitude control mechanism, wherein the rotation axis of the flywheel is along the rotation axis of the wheel, wherein an intersection line of a contacting portion that can contact a ground while the car is moving, and that is provided to the wheel located on a lower side of the rotation axis of the wheel, and an imaginary plane in which a normal direction is a horizontal direction, and that includes the rotation axis of the wheel, is an arc, wherein when determining the shape of the wheel, a radius of curvature of the arc is determined as the shape of the wheel, wherein the car is provided with a rotation control mechanism that controls a rotation of the wheel in order to restore an attitude of the car from a tilted state in which the car body tilts in a front-to-rear direction, to a non-tilted state, wherein the method includes determining the attitude in which tilted state is to be restored to the non-tilted state, in order to set the attitude restoring performance of the car, and determining an external diameter of the wheel as the shape of the wheel, based on a result that is determined and a parameter showing a control ability of the rotation control mechanism, wherein when determining the attitude in which state is to be restored to the non-inclined state, the attitude in which inclined state and in which tilted state is to be restored is determined, wherein the parameter showing the control ability of the attitude control mechanism includes a maximum number of rotations of the flywheel, a diameter of the flywheel, and a maximum output of a gimbal motor that controls a rotation of a rotatable gimbal that holds the flywheel, wherein the rotation control mechanism is a driving motor for rotating the wheel, and the parameter showing the control ability of the rotation control mechanism includes the maximum output of the driving motor.

Since all of the previously described effects can be achieved by such method, the object of the present invention can be achieved more effectively.

Example of Configuration of a Car

Figure 2:
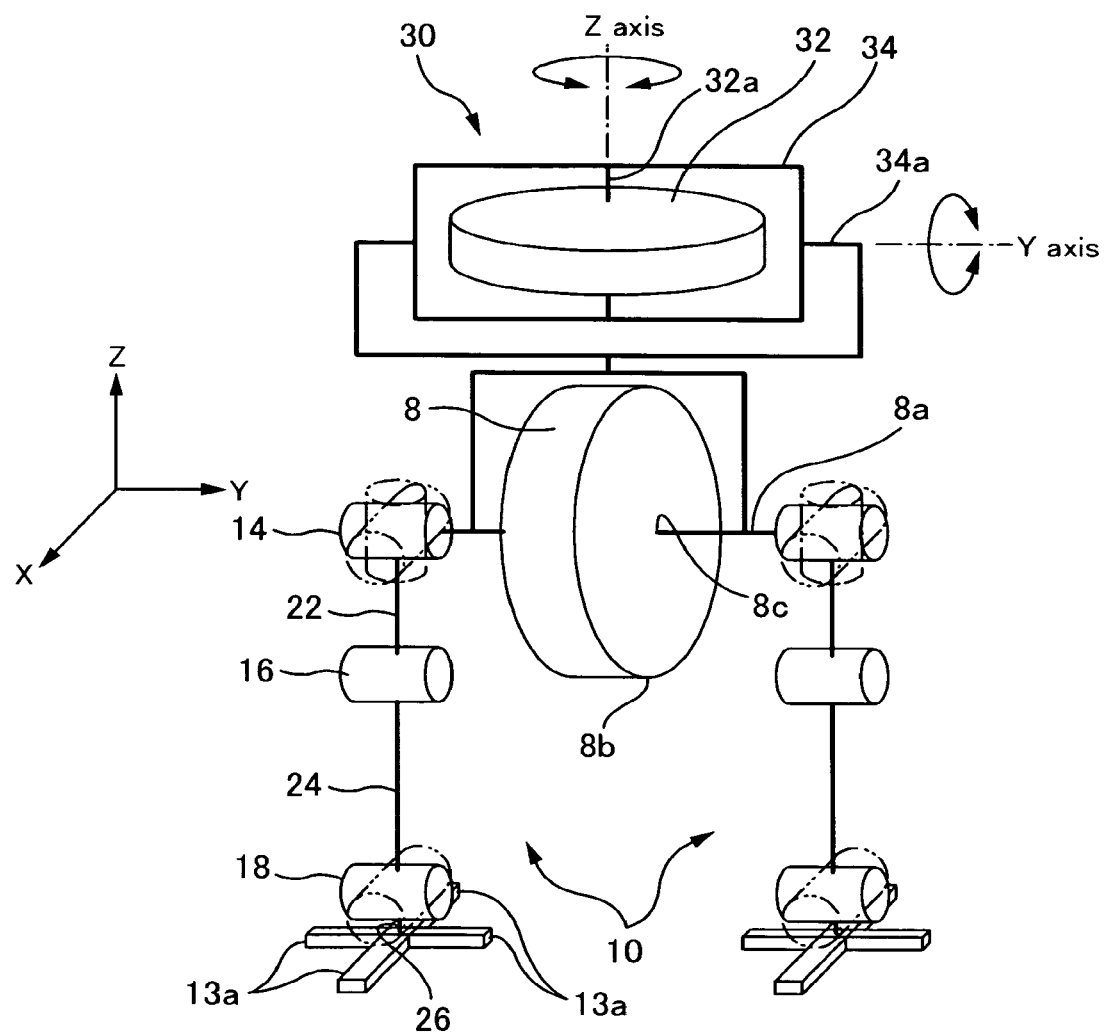
FIG. 2 is a schematic diagram showing the main structural elements of the monocycle 2.
Figure 5A:
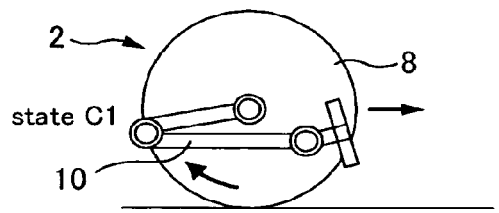
FIGS. 5A to 5G are state transition diagrams for explaining the movement of the monocycle 2 in the case there is an ascending step on the ground.
Figure 5B:
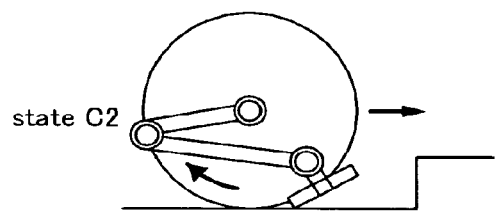
Figure 5C:
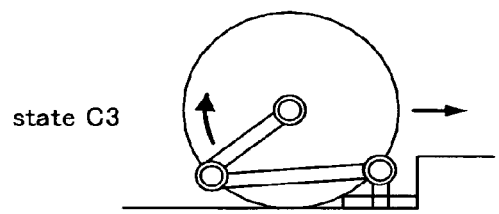
Figure 5D:
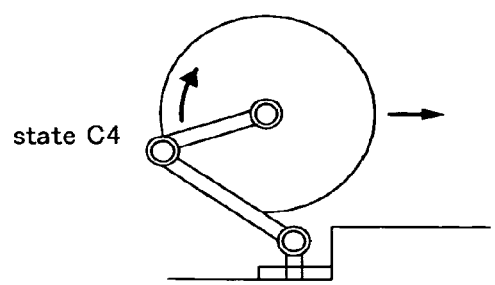
Figure 5E:
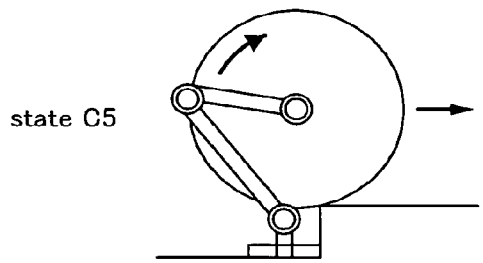
Figure 5F:
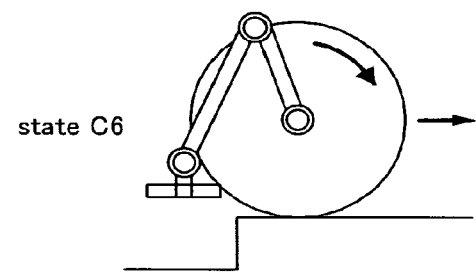
Figure 5G:
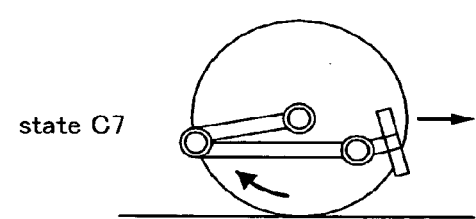
Figure 6A:
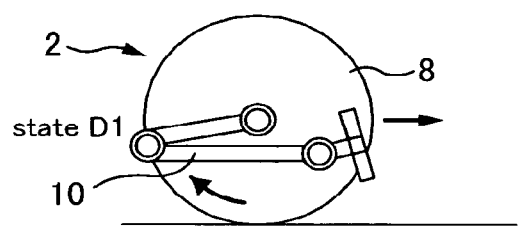
FIGS. 6A to 6G are state transition diagrams for explaining the movement of the monocycle 2 in the case there is a descending step on the ground.
Figure 6E:
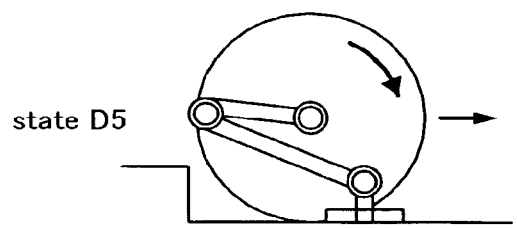
Figure 6B:
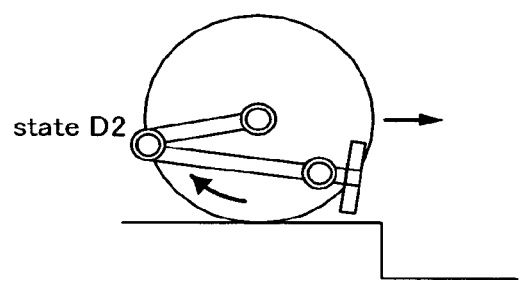
Figure 6F:
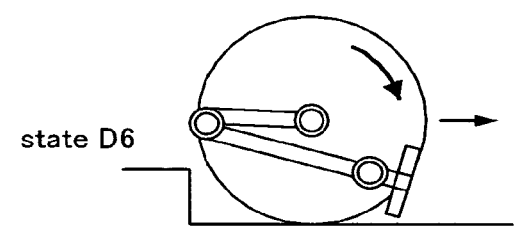
Figure 6C:
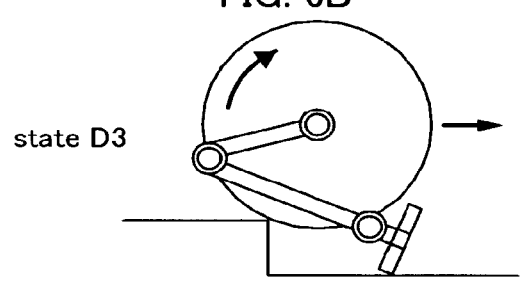
Figure 6G:
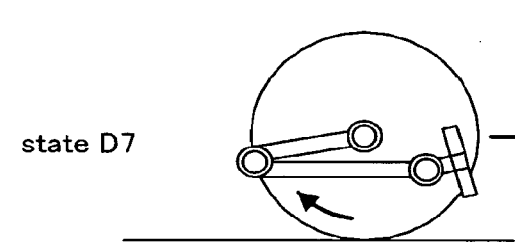
Figure 6D:
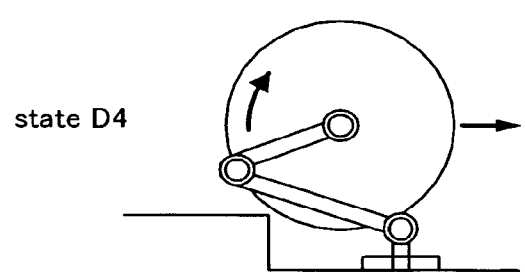
Figure 7A:
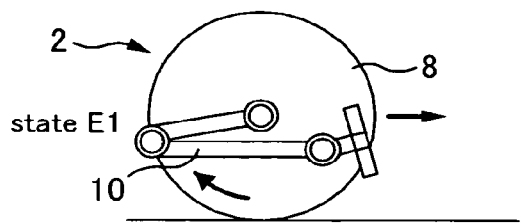
FIGS. 7A to 7G are state transition diagrams for explaining the movement of the monocycle 2 in the case there is a curb on the ground.
Figure 7B:
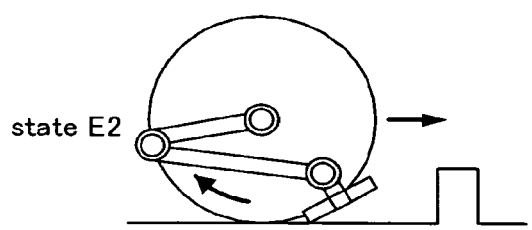
Figure 7C:
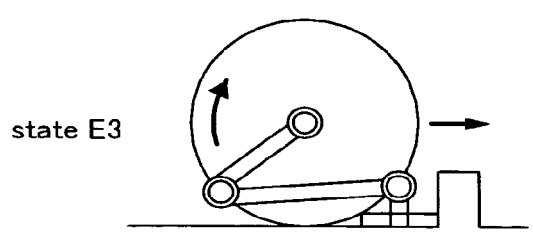
Figure 7D:
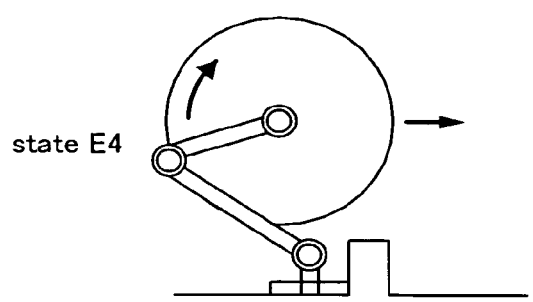
Figure 7E:
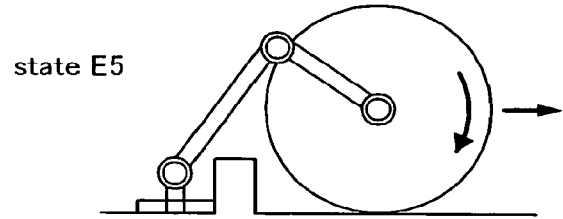
Figure 7F:
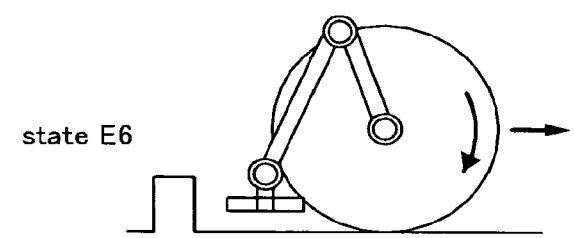
Figure 7G:
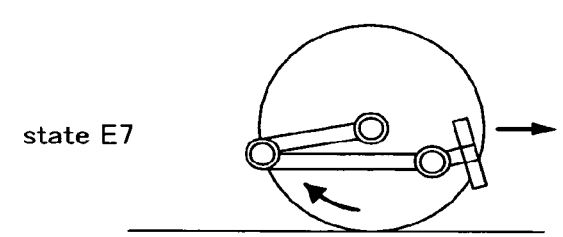
Figure 8A:
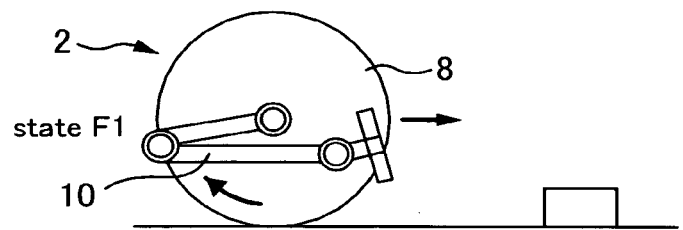
FIGS. 8A to 8D are state transition diagrams for explaining the movement of the monocycle 2 in the case there is an object to be carried on the ground.
Figure 8B:
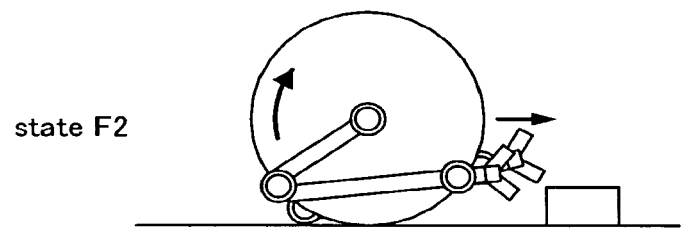
Figure 8C:
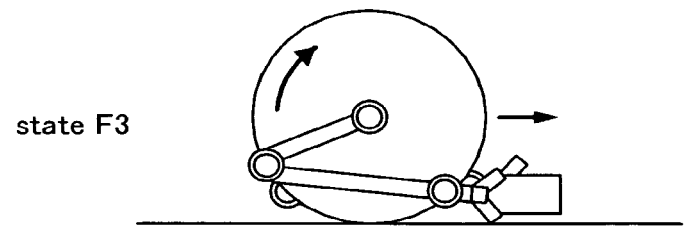
Figure 8D:
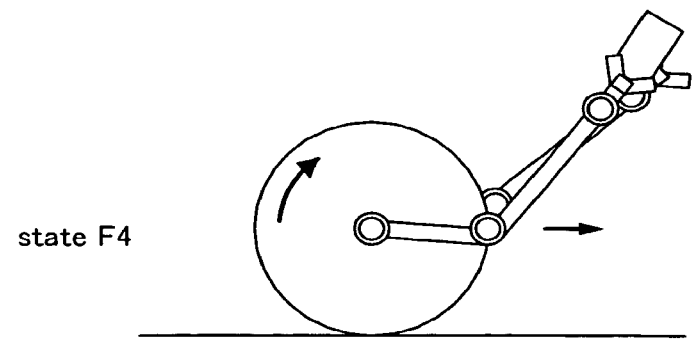

First, an outline of an example of a configuration of a car as an example of a walking apparatus according to this embodiment is described by using FIG. 1 and FIG. 2. Furthermore, in this embodiment, a monocycle 2 with one wheel is described as an example of a car. FIG. 1 is a schematic diagram showing an external configuration of the monocycle 2. FIG. 2 is a schematic diagram showing the main structural elements of the monocycle 2.

Furthermore, coordinate axes are shown in FIG. 1 and FIG. 2. In here, for example, a moving direction of the monocycle 2 (for example, the running direction) is the X axis, the axial direction of a rotation axis 8*a* of a wheel 8 of the monocycle 2 is the Y axis, and the direction from a contact portion 8*b* toward a center position 8*c* of the wheel 8 is the Z axis.

The monocycle 2 has a car body 4, the wheel 8, two legs 10, a control moment gyro 30 (hereinafter, also referred to as CMG which is an abbreviation) as an example of an attitude stabilization section, and a sensor 40 as an example of a detection section.

The car body 4 is a body of the monocycle 2 and the car body 4 contains inside a part of the wheel 8, a CMG 30 and the like. On the other hand, the legs 10 are provided on the outside of the car body 4.

The wheel 8 is configured so that the wheel can rotate around the rotation axis 8*a*, and the monocycle 2 runs by the rotation of the wheel 8. Furthermore, the monocycle 2 is provided with a motor (not shown) and a driving force transfer section (not shown) such as a gear or a belt that is already known for transferring the driving force of the motor to the wheel 8, as a mechanism to rotate the wheel 8.

The leg 10 is for making the monocycle 2 walk and is provided with a foot 13, three joint portions, namely, a first joint portion 14, a second joint portion 16, and a third joint portion 18, and three bone portions, namely, a first bone portion 22, a second bone portion 24, and a third bone portion 26.

The first joint portion 14 is a portion that corresponds to a hip joint in a human leg and the body of the monocycle and the first bone portion 22 are connected via the first joint portion 14. The first joint portion 14 is configured so that it can turn around the X axis, the Y axis and the Z axis (these axes are shown in the first joint portion 14 shown in FIG. 2). On account of this, it is possible to change the direction of the first bone portion 22. The first bone portion 22 is connected to the body of the monocycle via the first joint portion 14 at its one end, on the other hand its other end is connected to the second bone portion 24 via the second joint portion 16.

The second joint portion 16 is a portion that corresponds to a knee in a human leg, and the first bone portion 22 and the second bone portion 24 are connected via the second joint portion 16. The second joint portion 16 is configured so that it can turn about the Y axis (this axis is shown in the second joint portion 16 shown in FIG. 2). On account of this, it is possible to change the direction of the second bone portion 24. The second bone portion 24 is connected to the first bone portion 22 via the second joint portion 16 at its one end, and on the other hand is connected to the third bone portion 26 via the third joint portion 18 at its other end.

The third joint portion 18 is a portion that corresponds to an ankle in a human leg, and the second bone portion 24 and the third bone portion 26 are connected via the third joint portion 18. The third joint portion 18 is configured so that it can turn about the X axis and the Y axis (these axes are shown in the third joint portion 18 shown in FIG. 2). On account of this, it is possible to change the direction of the third bone portion 26. The third bone portion 26 is connected to the second bone portion 24 via the third joint portion 18 at its one end, and on the other hand is connected to the foot 13 at its other end.

The foot 13 is a portion that contacts the ground when the monocycle 2 walks. That is to say, the monocycle 2 walks by making the feet 13 alternately contact the ground by bending and extending the above-mentioned joints portions 14, 16 and 18. In addition, the foot 13 has a finger part 13a, and the finger part 13a is configured so that it can hold an object.

Furthermore, the monocycle 2 is provided with a motor (not shown) for controlling the angle of bend of the above-mentioned joint portions 14, 16 and 18 and operating the finger part 13a, and a driving force transfer section (not shown) such as a gear or a belt which is already known for transferring the driving force of the motor to the joint portions 14, 16, 18 and so on.

The CMG 30 has a function of stabilizing an attitude of the monocycle 2. The CMG 30 is provided with a rotatable flywheel 32 and a rotatable gimbal 34 that holds the flywheel 32. The axial direction of a rotation axis 32a of the flywheel 32 is along a direction from the contacting portion 8b toward the center portion 8c of the wheel 8, that is, the Z axis, and the axial direction of a rotation axis 34a of the gimbal 34 is along the axial direction of the rotation axis 8a of the wheel 8, that is, the Y axis.

The CMG 30 stabilizes the attitude of the monocycle 2 by the flywheel 32 rotating at high speed. That is, the monocycle 2 can maintain its attitude because the flywheel 32 provided to the CMG 30 is rotating at high speed inside, even if an external force of a certain magnitude is applied to the monocycle 2.

Further, the CMG 30 stabilizes the attitude of the monocycle 2 even if a large external force that makes the attitude of the monocycle 2 change is applied.

For example, in the case where an external force that makes the monocycle 2 rotate about the X axis (in other words, makes the monocycle 2 tilt to the ground) is applied and the attitude of the monocycle 2 changes, the monocycle 2 detects this attitude change and rotates the gimbal 34, that holds the wheel 32, about the rotation axis 34a, in a state that the flywheel 32 is rotating at high speed. Thus, a force that makes the monocycle 2 rotate about the X axis is generated, and the monocycle 2 is made to return to the desired position.

In addition, in the case where an external force that makes the monocycle 2 rotate about the Z axis is applied and the attitude of the monocycle 2 changes, the monocycle 2 detects this attitude change and changes the speed of the flywheel 32. By such action due to the flywheel 32 increasing or decreasing in speed, a force that makes the monocycle 2 rotate about the Z axis is generated, and the monocycle 2 is made to return to the desired position.

In addition, in the case where an external force that makes the monocycle 2 rotate about the Y axis is applied and the attitude of the monocycle 2 changes, the monocycle 2 detects this attitude change and changes the rotation speed of the wheel 8 of the monocycle 2 that is running. By such function of the wheel 8 increasing or decreasing in speed, a force that makes the monocycle 2 rotate about the Y axis is generated, and the monocycle 2 is made to return to the desired position. Thus, in this embodiment, in the case where an external force that makes the monocycle 2 rotate about the Y axis is applied and the attitude of the monocycle 2 changes, the monocycle 2 is made to return to the desired attitude without using the function of the CMG 30, however, it is not limited to such. For example, by providing a plurality of the CMG 30 each with the axial directions of the rotation axis 32a of the flywheel 32 that are different to each other, it is possible to make the monocycle 2 return to the desired attitude using the CMG 30, even in the case the attitude of the monocycle 2 changes because an external force that makes the monocycle 2 rotate about the Y axis is applied.

Note that, the monocycle 2 is provided with an attitude sensor (not shown) such as an attitude gyro, and detects above-mentioned attitude change by the attitude sensor. In addition, as shown in FIG. 1, the monocycle 2 is provided with a sensor 40 that is different to the attitude sensor. The sensor 40 has a function for detecting a state of the ground, for example, whether the state of the ground is good or bad (whether the ground is level or not) or whether there are steps or projections and depressions on the ground.

Further, the monocycle 2 is provided with a controller (not shown). The controller is provided with a CPU, a RAM, a ROM, and the like, and the controller controls the wheel 8, the legs 10, the CMG 30, and the like according to an output from the attitude sensor or the sensor 40 and the like.

Movement Example of the Monocycle 2

As mentioned above, the monocycle 2 according to this embodiment is provided with the wheel 8 and the legs 10 and can perform a running movement by the wheel 8 and a walking movement by the legs 10. Further, by combining the movement of the wheel 8 and the movement of the legs 10, the monocycle 2 performs various movements.

Hereinafter, an example of the movement of the monocycle 2 is described using FIG. 3A to FIG. 8D. FIGS. 3A to 3J are state transition diagrams for explaining the example of switching between a running movement and a walking movement in the case the ground is made level and in the case the ground is not made level. FIGS. 4A to 4J are state transition diagrams for explaining the example of switching between the running movement and the walking movement in the case where there are stairs and in the case where there are no stairs. FIGS. 5A to 5G are state transition diagrams for explaining the movement of the monocycle 2 in the case there is an ascending step on the ground. FIGS. 6A to 6G are state transition diagrams for explaining the movement of the monocycle 2 in the case there is a descending step on the ground. FIGS. 7A to 7G are state transition diagrams for explaining the movement of the monocycle 2 in the case there is a curb on the ground. FIGS. 8A to 8D are state transition diagrams for explaining the movement of the monocycle 2 in the case there is an object to be carried on the ground.

Further, in these diagrams, for explicitly showing the running movement by the wheel 8 and the walking movement by the legs 10 of the monocycle 2, only the wheel 8 and the legs 10 are schematically shown, and the car body 4, the CMG 30 and the like are omitted.

Movement of the Monocycle 2 that Successively Executes Running Forward and Walking Forward First, the case where the monocycle 2 performs forward running and forward walking successively is described by using FIGS. 3A to 3J and FIGS. 4A to 4J. The monocycle 2 of this embodiment is able to switch between the running movement by the wheel 8 and the walking movement by the legs 10 according to the state of the ground. As an example where the monocycle 2 performs the forward running and the forward walking successively, an example of switching between the running movement and the walking movement in the case the ground is made level and in the case the ground is not made level, and an example of switching between the running movement and the walking movement in the case there is a step and in the case there is no step are described below.

First, an example of switching between the running movement and the walking movement in the case the ground is made level and in the case the ground is not made level is described by using FIGS. 3A to 3J. Furthermore, it is assumed that the monocycle 2 of this embodiment is provided, in advance, with the information regarding whether the ground is made level or is not made level.

In the first condition A1, it is assumed that the monocycle 2 is running forward in a direction of an arrow on the level ground that is made level (hereafter, it is simply referred to as a level ground). In other words, the wheel 8 rotates in a state that it is contacting the ground, and the running movement is performed by the wheel 8. Furthermore, in the condition A1, the monocycle 2 is running in a state with the legs 10 folded by bending the joint portions.

Next, the monocycle 2 starts preparing for next movement (namely, the walking movement) while performing the running movement by the wheel 8 when a distance from the monocycle 2 to a ground that is not made level (hereafter, it is simply referred to as an unlevel ground) is within a predetermined distance (state A1→state A2→state A3). Namely, the monocycle 2 releases the state that the legs 10 are folded in order to make the feet 13 contact the ground.

After that, the monocycle 2 makes the feet 13 contact the ground, and on the other hand stops the rotation of the wheel 8 as the wheel 8 is separated from the ground (state A3→state A4). Thus, the preparation for the walking movement is completed.

Next, the monocycle 2 walks forward in the direction of the arrow on the unlevel ground (state A4→state A5→state A6→state A7). Namely, the monocycle 2 performs walking by making the feet 13 alternately contact the ground by bending and extending the joint portions, in the state that the wheel 8 is not contacting the ground.

Next, the monocycle 2 switches from the walking movement to the running movement (state A7→state A8) when the monocycle 2 approaches the level land. Namely, the monocycle 2 makes the wheel 8 contact the ground by bending the joint portions, in the state that the feet 13 are contacting the ground. Then, the feet 13 are separated from the ground, and the wheel 8 is rotated.

Then, the monocycle 2 runs forward in the direction of the arrow on the level ground (state A8). Furthermore, the monocycle 2 folds the legs 10 while performing the running movement (state A8→state A9→state A10), and eventually performs the running movement by the wheel 8 in the state that the legs 10 are folded (state A10).

Next, an example of switching between the running movement and the walking movement in the case there are stairs and in the case there are no stairs is described by using FIGS. 4A to 4J. Furthermore, it is assumed that the monocycle 2 according to this embodiment is provided with the information regarding a position and heights of the stairs beforehand.

In the first state B1, it is assumed that the monocycle 2 is running forward on the ground in the direction of the arrow. In other words, the wheel 8 rotates in a state contacting the ground, and the running movement by the wheel 8 is performed. Furthermore, in the condition B1, the monocycle 2 is running in a state that the legs 10 are folded by bending the joint portions.

Next, the monocycle 2 starts preparing for a next movement (namely, the walking movement) while performing the running movement by the wheel 8 when a distance from the monocycle 2 to the stairs is within a predetermined distance (state B1→state B2→state B3). Namely, the monocycle 2 releases the state that the legs 10 are folded in order to make the feet 13 contact the ground.

After that, the monocycle 2 makes the feet 13 touch the ground, and on the other hand stops the rotation of the wheel 8 as the wheel 8 is separated from the ground (state B3→state B4). Thus, the preparation for the walking movement is completed.

Next, the monocycle 2 climbs up the stairs by performing the walking movement (state B4→state B5→state B6→state B7). Namely, the monocycle 2 climbs up the stairs by making the feet 13 alternately contact the stairs by bending and extending the joint portions, in a state that the wheel 8 is not contacting the ground.

Next, the monocycle 2 switches from the walking movement to the running movement when the monocycle 2 finishes going up the stairs (state B7→state B8). Namely, the monocycle 2 makes the wheel 8 contact the ground by bending the joint portions in a state that the feet 13 are contacting the ground. Then, the feet 13 are separated from the ground and the wheel 8 is rotated.

Then, the monocycle 2 runs forward on the ground in the direction of the arrow (state B8). Furthermore, the monocycle 2 folds the legs 10 while performing the running movement (state B8→state B9→state B10) and eventually performs the running movement by the wheel 8 in the state that the legs 10 are folded (state B10).

As mentioned above, the monocycle 2 is able to switch between the running movement by the wheel 8 and the walking movement by the legs 10 according to the state of the ground. Namely, in the case that the ground is in a state that both the running movement and the walking movement can be performed, the monocycle 2 places emphasize on the moving speed and performs the running movement, and in the case the ground condition is in a state that it is difficult to perform the running movement, performs the walking movement. Thus, the monocycle 2 can move efficiently.

Furthermore, in the above description, it is assumed that the monocycle 2 is provided with information regarding the state of the ground (whether the ground is level or unlevel, whether there are stairs or not) beforehand, and switches between the running movement and the walking movement based on the relevant information, however, it is not limited to such. For example, it is possible that the sensor 40 detects the state of the ground, and the monocycle 2 switches between the running movement and the walking movement according to the output from the sensor 40. In this case, the monocycle 2 can move efficiently even if information regarding the ground condition is not provided to the monocycle 2 beforehand.

Furthermore, in the above description, there is described the case when there are ascending stairs, however the monocycle 2 can perform the walking movement when there are stairs and the running movement when there are no stairs, even in the case there are descending stairs.

Movement of the Monocycle 2 in the Case where there is a Step in the Ground

Next, the movement of the monocycle 2 in the case where there is a step in the ground is described. In the case where there is a step in the ground while running by the wheel 8, the monocycle 2 of this embodiment contacts ground with the feet 13 at the time of passing the step. Thus, it becomes possible to prevent the monocycle 2 from getting an impact. As for the example of the movement of the monocycle 2 when there is a step in the ground, the movement of the monocycle 2 when there is an ascending step in the ground and the movement of the monocycle 2 when there is a descending step in the ground are described as below. First, the movement of the monocycle 2 when there is an ascending step in the ground is described by using FIG. 5. Furthermore, it is assumed that the monocycle 2 of this embodiment is provided with information regarding the position or the height of the ascending step beforehand.

In the first state C1, it is assumed that the monocycle 2 is running forward in the direction of the arrow on ground that is even, (hereafter, simply referred to as even ground). Namely, the wheel 8 rotates in a state contacting the ground, and the running movement is being performed by the wheel 8. Furthermore, in the state C1, the monocycle 2 is running in a state that the legs 10 are folded by bending the joint portions.

Next, when the monocycle 2 approaches the ascending step, the monocycle 2 makes the feet 13 contact the ground while performing the running movement by the wheel 8 (state C1→state C2→state C3.) Namely, the monocycle 2 makes the feet 13 touch the ground by releasing the state that the legs 10 are folded.

After that, the monocycle 2 separates the wheel 8 from the ground by lifting the car body 4 by the legs 10, in a state that the feet 13 are contacting the ground (state C3→state C4. Furthermore, the wheel 8 keeps on rotating at this time).

Next, at the time the wheel 8 passes through the ascending step, the monocycle 2 makes the wheel 8 contact the ground (state C4→state C5). Namely, the monocycle 2 makes the wheel 8 contact the ground by bending the joint portions, in a state that the feet 13 are contacting the ground.

Then, the monocycle 2 separates the feet 13 from the ground and continues the running movement (state C5→state C6). Furthermore, the monocycle 2 folds the legs 10 while performing the running movement (state C6→state C7), and eventually performs the running movement by the wheel 8 in a state that the legs 10 are folded (state C7).

As described above, the monocycle 2 makes the feet 13 contact the ground when passing the ascending step. Thus, it is possible to avoid collision with the ascending step, and it is possible to prevent the monocycle 2 from having excessive impact.

Next, the movement of the monocycle 2 when there is a descending step in the ground is described by using FIG. 6. Furthermore, it is assumed that the monocycle 2 of this embodiment is provided with the information regarding the position or the height of the descending step beforehand.

In the first state D1, it is assumed that the monocycle 2 is running forward in the direction of an arrow on the even ground. Namely, the wheel 8 rotates in a state contacting the ground, and the running movement by the wheel 8 is being performed. Furthermore, in the state D1, the monocycle 2 is running in a state with the legs 10 folded by bending the joint portions.

Next, when the monocycle 2 approaches the descending step, the monocycle 2 releases the state that the legs 10 are folded in order to make the feet 13 contact the ground, while performing the running movement by the wheel 8 (state D1→state D2→state D3.)

The monocycle 2 falls at the time of passing the descending step, but at this time, the monocycle 2 makes the feet 13 contact the ground before the wheel 8 (state D3→state D4). Furthermore, the monocycle 2 makes the wheel 8 contact the ground by bending the joint portions in a state that the feet 13 are contacting the ground (state D4→state D5).

Then, the monocycle 2 separates the feet 13 from the ground, and continues the running movement (state D5→state D6). Furthermore, the monocycle 2 folds the legs 10 while performing the running movement (state D6→state D7), and eventually performs the running movement by the wheel 8 in a state that the legs 10 are folded (state D7).

As described above, the monocycle 2 makes the feet 13 contact the ground when passing the descending step. Thus, it becomes possible to prevent the monocycle 2 from having excessive impact when the monocycle 2 passes the descending step and falls on the ground.

Furthermore, in the above description, it is assumed that the monocycle 2 is provided with information regarding the position or the heights of the step beforehand, and the feet 13 are made to contact the ground based on the relevant information, however, it is not limited as such. For example, it is possible that the sensor 40 detects the position or the heights of the step, and the feet 13 are made to contact the ground according to the output from the sensor 40. In such a case, it becomes possible to prevent the monocycle 2 from having excessive impact even if the information regarding the position or the heights of the step is not provided beforehand.

Movement of Monocycle 2 in the Case where there are Projections and Depressions in the Ground Next, the movement of the monocycle 2 in the case there are projections and depressions on the ground is described. The monocycle 2 according to this embodiment makes the feet 13 contact the ground when passing the projections and depressions, in the case there are projections and depressions on the ground when the monocycle 2 is running by the wheel 8. Thus, it becomes possible to prevent the monocycle 2 from having an impact.

Hereinbelow, as for an example of the movement of the monocycle 2 in the case there are projections and depressions on the ground, the movement of the monocycle 2 in the case there is a curb on the ground is described by using FIGS. 7A to 7G. Furthermore, it is assumed that the monocycle 2 of this embodiment is provided with the information regarding the position or the height of the curb beforehand.

In the first state E1, it is assumed that the monocycle 2 is running forward in the direction of the arrow on the even surface. Namely, the wheel 8 rotates in a state contacting the ground and the running movement is being preformed by the wheel 8. Furthermore, in the state E1, the monocycle 2 is running in a state that the legs 10 are folded by bending the joint portions.

Next, when the monocycle 2 approaches the curb, the monocycle 2 makes the feet 13 touch the ground, while performing the running movement by the wheel 8 (state E1→state E2→state E3.) Namely, the monocycle 2 makes the feet 13 contact the ground by releasing the state that the legs 10 are folded.

After that, the monocycle 2 separates the wheel 8 from the ground by lifting the car body 4 with the legs 10, in the state that the feet 13 are contacting the ground (state E3→state E4. Furthermore, the wheel 8 keeps on rotating at that time).

Next, at the time the wheel 8 passes the curb, the monocycle 2 makes the wheel 8 contact the ground (state E4→state E5). Namely, the monocycle 2 makes the wheel 8 contact the ground by bending the joint portions in a state that the feet 13 are contacting the ground.

Then, the monocycle 2 separates the feet 13 from the ground, and continues the running movement (state E5→state E6). Furthermore, the monocycle 2 folds the legs 10 while performing the running movement (state E6→state E7), and eventually performs the running movement by the wheel 8 in a state that the legs 10 are folded (state E7).

As described above, the monocycle 2 makes the feet 13 contact the ground when passing the curb. Thus, it is possible to avoid contacting the curb, and it is possible to prevent the monocycle 2 from having excessive impact.

Furthermore, in the above description, it is assumed that the monocycle 2 is provided with the information regarding the position or the heights of the curb beforehand, and the feet 13 are made to contact the ground according to the relevant information, however, it is not limited as such. For example, it is possible that the sensor 40 detects the position or the heights of the curb, and the monocycle 2 makes the feet 13 contact the ground according to the output from the sensor 40. In such a case, it becomes possible to prevent the monocycle 2 from having excessive impact, even if the information regarding the position or the heights of the curb is not provided beforehand.

Furthermore, in the above description, the case where the projections and depressions is a curb (a projection) is described, however, for example, even in the case the projections and depressions is a recess (a depression) the monocycle 2 can avoid contacting the recess by making the feet 13 contact the ground when passing the recess.

Movement of the Monocycle 2 in the Case where there is an Object to be Carried on the Ground Next, a movement of the monocycle 2 in the case there is an object to be carried on the ground is described. The monocycle 2 of this embodiment can hold the object to be carried which is an example of an object by the finger parts 13a provided to the feet 13, and can perform the running movement by the wheel 8 while holding the object to be carried. Hereafter, the movement of the monocycle 2 in the case there is an object to be carried on the ground is described using FIG. 8. Furthermore, it is assumed that the monocycle 2 of this embodiment is provided with information regarding the position or the size of the object to be carried beforehand.

In the first state F1, it is assumed that the monocycle 2 is running forward in the direction of the arrow on the even surface. In other words, the wheel 8 rotates in a state that it is contacting the ground, and the running movement is performed by the wheel 8. Furthermore, in the state F1, the monocycle 2 is running in a state with the legs 10 folded in by bending the joint portions.

Next, when a distance from the monocycle 2 to the object to be carried is within a predetermined distance, the monocycle 2 starts preparing for a next movement (namely, the movement of holding an object to be carried) while performing the running movement by the wheel 8 (state F1→state F2). Namely, in order to hold the object to be carried, the monocycle 2 releases the state that the legs 10 are folded in, and slows down by reducing the rotation speed of the wheel 8.

Next, when the monocycle 2 approaches the object to be carried, the monocycle 2 holds the object to be carried by the finger parts 13a which are provided to the feet 13 (state F2→state F3). Namely, the monocycle 2 holds the object to be carried by using the legs 10 as arms.

After that, the monocycle 2 lifts the object to be carried, speeds up by increasing the rotation speed of the wheel 8, and continues the running movement while holding the object to be carried (state F3→state F4).

As mentioned above, the monocycle 2 can hold the object to be carried by the finger parts 13a, and can perform the running movement by the wheel 8 while holding the object to be carried. Thus, it is possible for the monocycle 2 to carry the object to be carried appropriately.

Furthermore, in the above description, it is assumed that the monocycle 2 is provided with information regarding the position or the height of the object to be carried beforehand, and holds the object to be carried according to the information, however, it is not limited as such. For example, it is possible that the sensor 40 detects the position or the height of the object to be carried and the monocycle 2 holds the object to be carried according to the output from the sensor 40.

A typical traditional car is provided with a rotatable wheel and runs in a predetermined traveling direction by rotating the wheel. Such a car can make a turn by changing a direction of the wheel and can back up by rotating the wheel in an opposite direction, however, the diversity of those movements is limited.

On the other hand, since the car of this embodiment is provided with the legs 10 for walking in addition to the wheel 8, it is possible to perform various types of movements as described above by using the wheel 8 and the legs 10.

Furthermore, when the car performs the various movements as described above, a situation of which the altitude of the car becomes unstable is apt to occur, however, the car of this embodiment is provided with the CMG 30 as an attitude stabilization section, and for this reason, it is possible to perform the various movements as described above with stability. In other words, by providing the car with the CMG 30, the variation of the movements that can be performed without making the attitude of the car unstable can be expanded.

Other Embodiments

A car according to this invention is described as above, based on the above-mentioned embodiment, however, the foregoing embodiment is for the purpose of elucidating the present invention, and is not to be interpreted as limiting the present invention. The invention can of course be altered and improved without departing from the gist thereof, and includes its equivalents.

Furthermore, in the embodiment, the CMG 30 is taken as an example of the attitude stabilization section and described, however, it is not limited as such. As the other attitude stabilization section, a wheel that simply rotates at a certain speed (and in which rotation speed cannot be controlled) or a wheel (generally referred to as a reaction wheel and so on) in which the rotation speed can be controlled can be mentioned, and these can be provided to the car.

However, the embodiment (namely, the CMG 30) is more preferable in the respect that the attitude of the car can be appropriately stabilized, even in the case where a large external force, to the car, that makes the car change its attitude is applied to a car.

Furthermore, in the embodiment, it is assumed that the CMG 30 is provided with the rotatable flywheel 32, and the axial direction of the rotation axis 32a of the flywheel 32 is along the direction from the contacting portion 8b toward the center portion 8c of the wheel 8 (the Z axis), however, it is not limited as such. For example, it is possible that the axial direction of the rotation axis 32a of the flywheel 32 is along the movement direction of the car (the X axis), or the axial direction of the rotation axis 8a of the wheel 8 (the Y axis).

Furthermore, in the embodiment, it is assumed that the number of the wheel 8 is one, however, it is not limited as such, and the number of the wheel 8 can be plural. Namely, in the embodiment, the monocycle 2 is described as an example of the car, however, it is not limited as such, for example, this invention can be applied to a two-wheeled vehicle, a three-wheeled vehicle, a four-wheeled vehicle and so on.

However, in the case the number of the wheel 8 is one, the attitude of the car is apt to become unstable comparing with the case in which the number of the wheel 8 is plural. Therefore, in the case the number of the wheel 8 is one, the above-mentioned effect of the CMG 30, namely, the effect of making the car perform the various movements with stability is exerted more effectively, and in that respect, the above-mentioned embodiment is more efficient.

In addition, the car can be the monocyclic passenger car that a human can ride in.

In such case, the monocyclic passenger car with great convenience is realized because the monocyclic passenger car can perform various movements.

Furthermore, in the embodiment, it is assumed that the car includes two legs 10, and the legs 10 are provided with the feet 13 and a plurality of the joint portions, performs walking by making the feet 13 alternately contact the ground by bending and extending the joint portions, however, it is not limited as such. Namely, the legs 10 can have any structure as long as it includes the function of making the car walk. For example, the leg 10 does not always need to include a plurality of the joint portions.

However, in the respect that the walking movement can be performed appropriately, the above-mentioned embodiment is more preferable.

Furthermore, in the embodiment, it is assumed that the number of the legs 10 is two, however, it is not limited as such and the number can be three or more.

Furthermore, in the embodiment, it is assumed that the foot 13 has the finger part 13*a* which can hold an object, however, it is not limited as such. For example, it is possible that the foot 13 may not have the finger part 13*a*.

However, in the respect that variation of the movement of the car (the aforementioned movement of carrying an object, the movement of removing an object that is an obstruction and so on) increases, the above-mentioned embodiment is more preferable.

Figure 9:
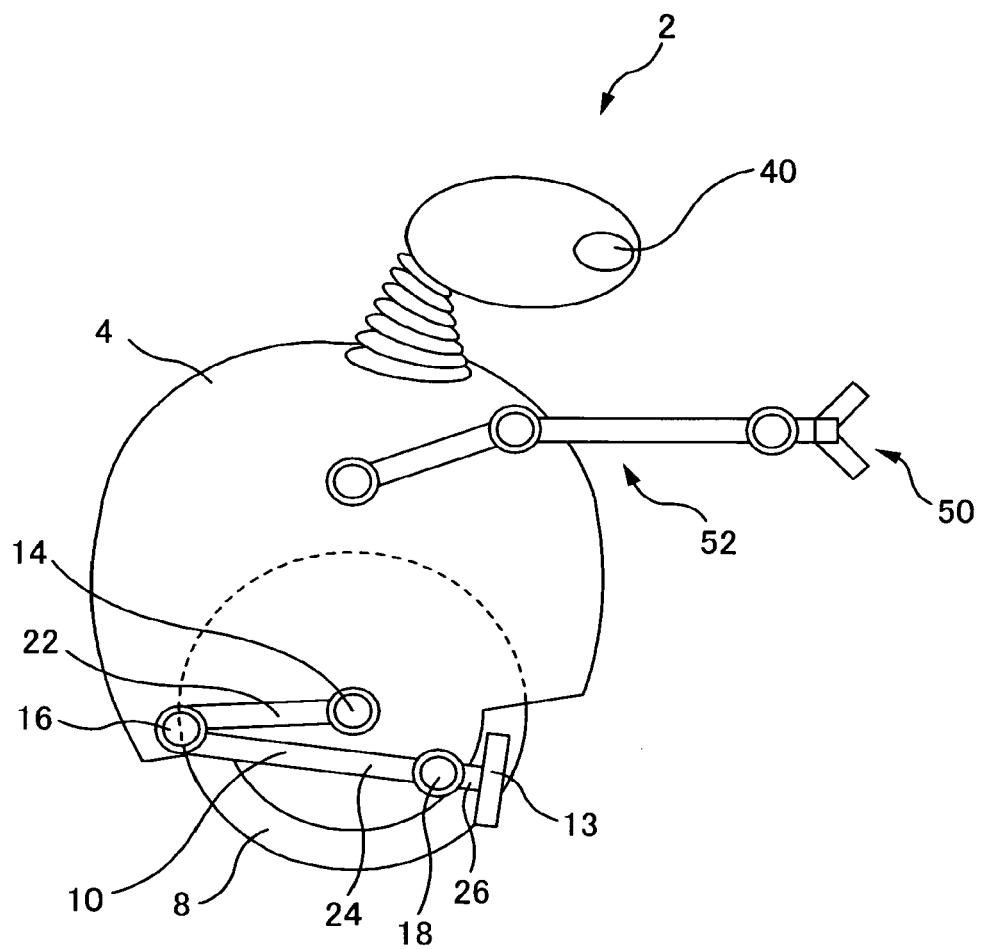
FIG. 9 is a schematic diagram showing an external configuration of the monocycle 2 in other embodiment.

Furthermore, it can be assumed that the car includes a hand that can hold an object and an arm that is connected to the hand. For example, as described in FIG. 9, the leg 10 is not provided with the finger part for holding an object, and instead, a hand 50 that can hold an object and an arm 52 that is connected to the hand 50 can be included.

In such case, since it is possible to operate the hand 50 that can hold an object separate from the movement of the leg 10, the variation of the movement of the car will increase much more.

For example, it is possible to not only run by rotating the wheel 8 while holding an object by the hand 50, but it is also possible to walk by making the feet 13 alternately contact the ground by bending and extending the joint portions in the state that the hand 50 is holding an object.

Furthermore, in the embodiment, it is assumed that the car runs by making the wheel 8 rotate in a state that the legs 10 are folded by bending the joint portions, however, it is not limited as such. For example, it can be assumed that the car runs in a state that the legs 10 are not folded.

However, in respect that the possibility of the legs 10 hampering the running movement of the car decreases, the above-mentioned embodiment is more preferable.

Furthermore, in the embodiment, it is assumed that the car walks by making the feet 13 alternately contact the ground by bending and extending the joint portions, in the state that the wheel 8 is not contacting the ground, however, it is not limited as such. For example, the car can walk in the state that the wheel 8 is contacting the ground.

However, in respect that the possibility of the wheel 8 hampering the walking movement of the car decreases, the above-mentioned embodiment is more preferable.

Furthermore, in the above description, as examples of the movement of the car, the movement of the monocycle 2 that successively executes running forward and walking forward, the movement of the monocycle 2 in the case there is a step in the ground, the movement of the monocycle 2 in the case there are projections and depressions on the ground, and the movement of the monocycle 2 in the case there is an object to be carried on the ground are explained, however, the movement of the car is not limited as such.

For example, the car can change directions by rotating the gimbal 34 of the CMG 30 while running forward, and also can turn around on the spot by changing the rotation speed of the flywheel 32 when it stops.

Example of Configuration of a Car

Figure 10:
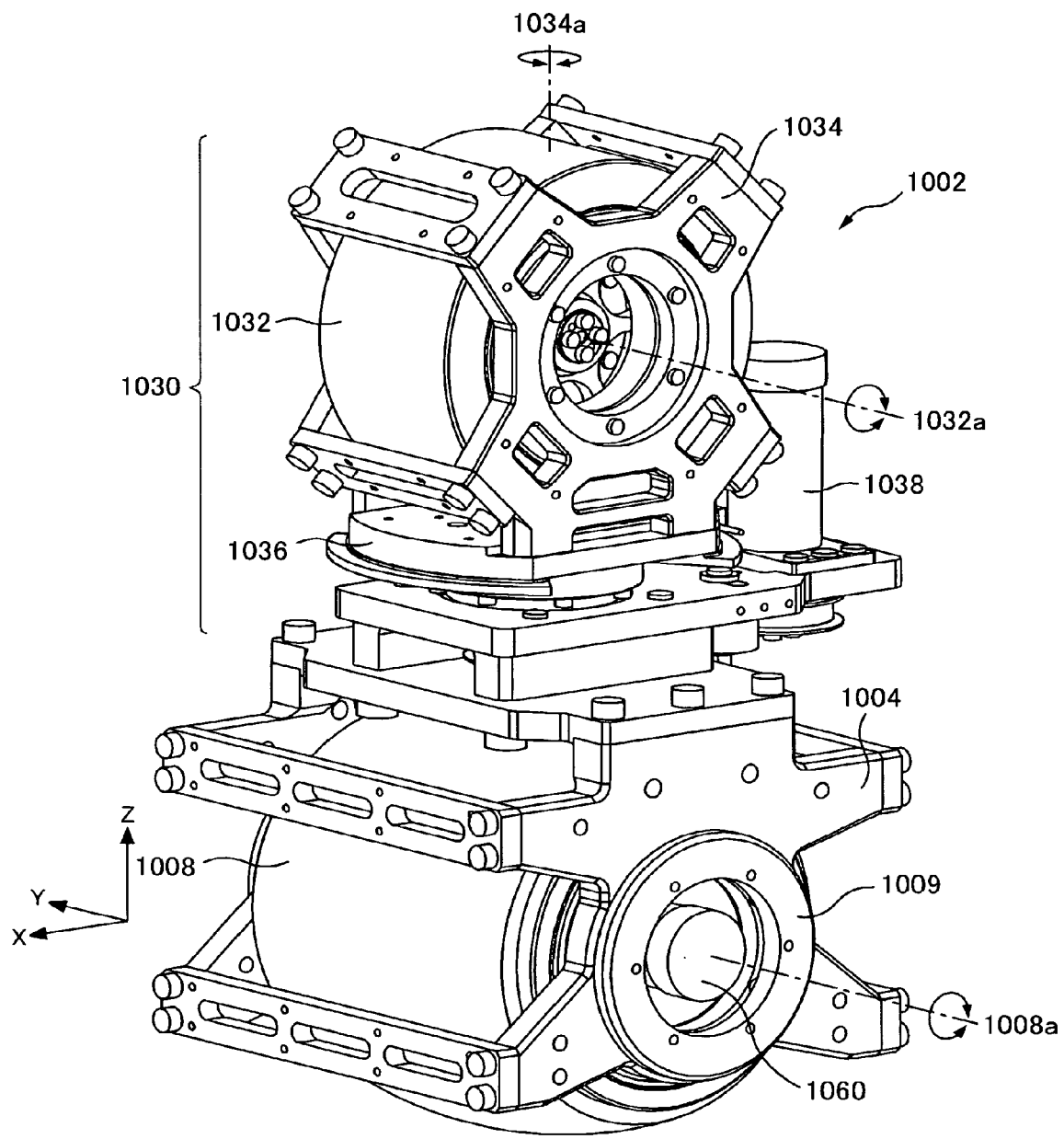
FIG. 10 is a perspective view showing an external configuration of a monocycle 1002.
Figure 11:
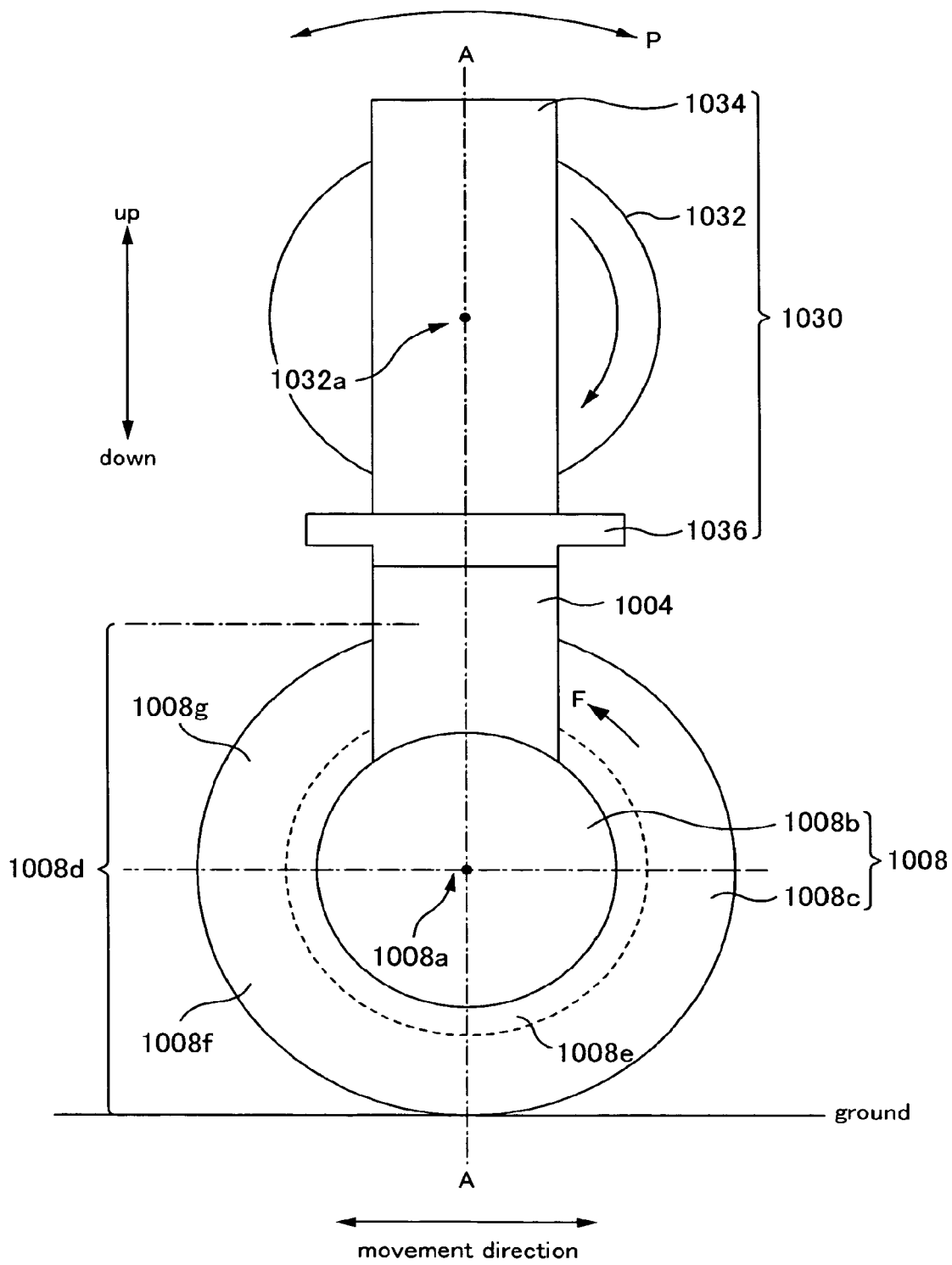
FIG. 11 is a schematic diagram showing a side surface of main structural elements of the monocycle 1002.
Figure 12:
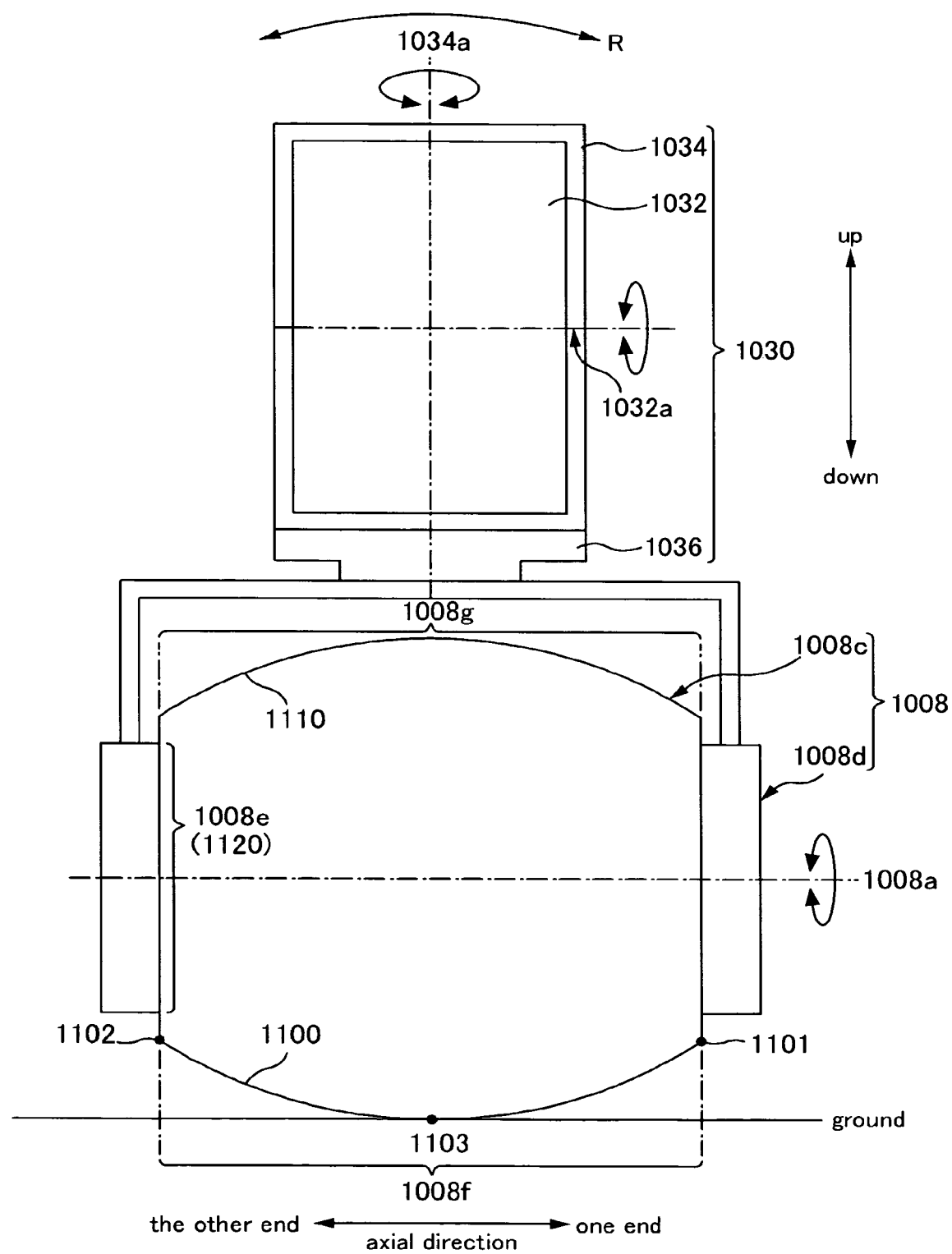
FIG. 12 is a schematic cross-sectional view of the main structural elements of the monocycle 1002 shown in FIG. 11 cut at a cross-section A-A in FIG. 11.
Figure 13:
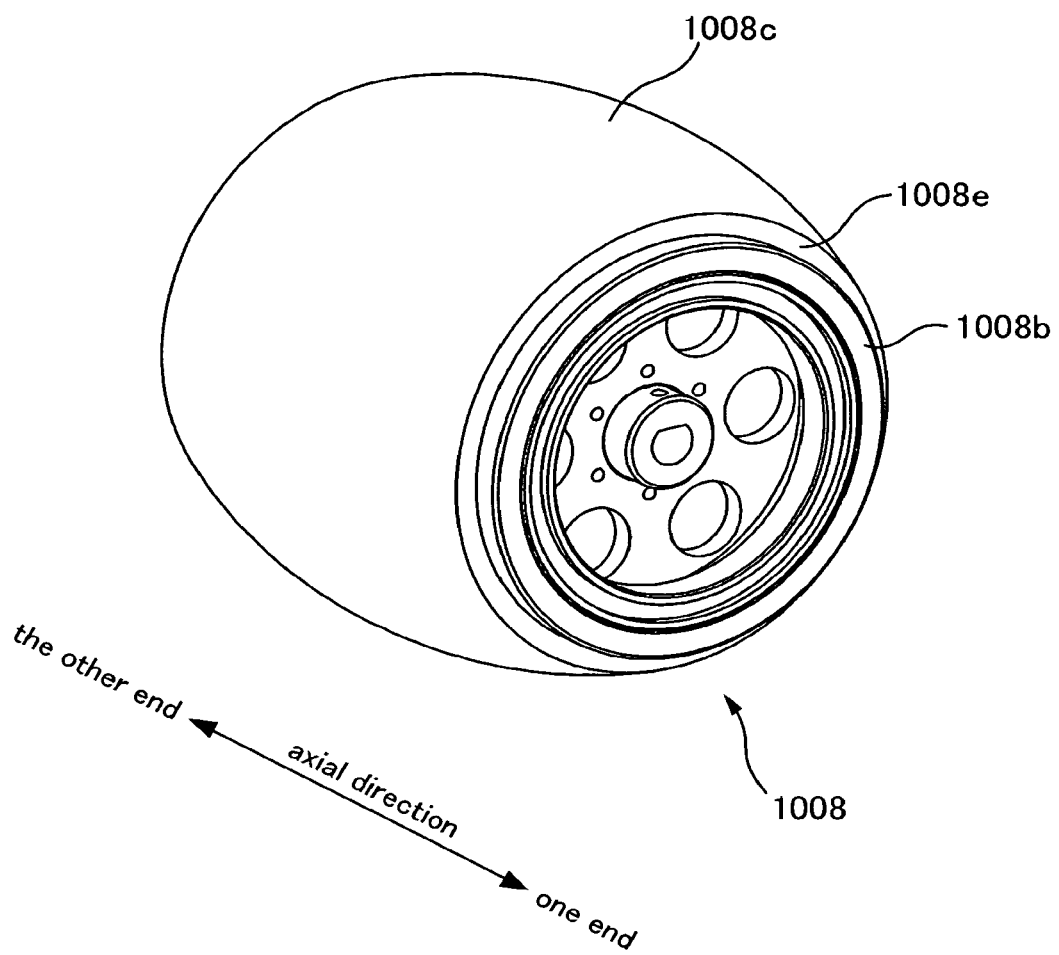
FIG. 13 is a perspective view of a wheel 1008.

First, an outline of an example of a configuration of a car according to this embodiment is described by using FIG. 10 to FIG. 13. Furthermore, in this embodiment, a monocycle 1002 with one wheel is described as an example of a car. FIG. 10 is a perspective view showing an external configuration of the monocycle 1002. FIG. 11 is a schematic diagram showing the side of main structural elements of the monocycle 1002. FIG. 12 is a schematic cross-sectional view of the main structural elements of the monocycle 1002 shown in FIG. 11 cut at a cross-section A-A in FIG. 11. FIG. 13 is a perspective view of a wheel 1008.

Furthermore, coordinate axes are shown in FIG. 10. Here, as one example, a movement direction of the monocycle 1002 (for example, a running direction) is an X axis, an axial direction of a rotation axis 1008*a* of the wheel 1008 of the monocycle 1002 is a Y axis, and a vertical direction of the monocycle 1002 is a Z axis. Furthermore, in FIG. 11, the movement direction of the monocycle 1002 (namely, the X axis direction in FIG. 10) and the vertical direction of the monocycle 1002 (namely, the Z axis direction in FIG. 10) are shown by arrows. Furthermore, the axial direction of the rotation axis 1008*a* of the wheel 1008 of the monocycle 1002 (namely, the Y axis direction in FIG. 10) and the vertical direction of the monocycle 1002 (namely, the Z axis direction in FIG. 10) are shown by arrows in FIG. 12. Furthermore, in FIG. 13, the axial direction of the rotation axis 1008*a* of the wheel 1008 is shown by an arrow.

Furthermore, the monocycle 1002 with an attitude in the upright state is shown in FIG. 10 to FIG. 12. Note that, hereafter, the upright state refers to a state in which the axial direction of the rotation axis 1008*a* of the wheel 1008 and the axial direction of a rotation axis 1032*a* of a flywheel 1032 are in a horizontal direction, and the axial direction of a rotation axis 1034*a* of a gimbal 1034 is in a vertical direction.

As shown in FIG. 10, the monocycle 1002 has a car body 1004, the wheel 1008, and a control moment gyro 1030 (hereinafter, also referred to as CMG, which is an abbreviation) as an example of the attitude control mechanism.

The car body 1004 is a metal structure and contains a part of the wheel 1008 inside and supports the wheel 1008 so that it can rotate. Furthermore, at an end portion of the car body 1004, in a direction along the rotation axis 1008*a* of the wheel 1008, a counterbalance 1009 is provided for adjusting the position of a center of gravity M of the monocycle 1002 (refer to FIG. 14). As described in FIG. 10, this counterbalance 1009 is a ring-shaped metal weight. The counterbalance 1009 is attached to the car body 1004, with the center of the counterbalance 1009 positioned above the rotation axis 1008a. Furthermore, in this embodiment, it is assumed that the counterbalance 1009 is provided at the end portion of the car body 1004 in the direction along the rotation axis 1008a, however, it is not limited as such. For example, it is possible that the counterbalance 1009 is provided inside an inner pipe 1008b of the wheel 1008 which is described later.

The wheel 1008 can rotate about the rotation axis 1008a, and the monocycle 1002 runs by the rotation of the wheel 1008. As shown in FIG. 13, the wheel 1008 is provided with the metal inner pipe 1008b and a rubber portion 1008c that covers the outer peripheral surface of the inner pipe 1008b, at a center portion of the inner pipe 1008b in the axial direction (namely, the axial direction of the rotation axis 1008a of the wheel 1008). Furthermore, the length of the inner pipe 1008b in the axial direction is longer than that of the rubber portion 1008c in the axial direction, and both ends of the inner pipe 1008b in the axial direction are supported by the car body 1004, so that they can rotate about the rotation axis 1008a. On the other hand, as shown in FIG. 13, the rubber portion 1008c is in the shape of a round barrel shape and has a larger external diameter than the inner pipe 1008b. The external diameter of the rubber portion 1008c becomes shorter from the center portion to the end portion in the axial direction. Furthermore, an internal motor 1060 is provided inside the inner pipe 1008b as a mechanism for rotating the wheel 1008.

The wheel 1008 is provided with a contacting portion 1008d that can contact the ground while the monocycle 1002 is moving. As shown in FIG. 11, in this embodiment, the entire peripheral surface of the rubber portion 1008c is the contacting portion 1008d. Namely, as shown in FIG. 12, the contacting portion 1008d extends from one end portion to the other end portion in the axial direction of the peripheral surface of the rubber portion 1008c. The monocycle 1002 runs by the wheel 1008 rotating in a state in which the contacting portion 1008d is contacting the ground, and for example, when the wheel 1008 rotates in a rotation direction shown by symbol F in FIG. 11, the monocycle 1002 moves forward. Furthermore, the contacting portion 1008d has a first contacting portion 1008f as the contacting portion 1008d that is located lower than the rotation axis 1008a, and a second contacting portion 1008g as the contacting portion 1008d that is located upper than the rotation axis. Therefore, the first contacting portion 1008f is contacting the ground during the operation of the monocycle 1002. Furthermore, as a matter of course, a part corresponding to the first contacting portion 1008f and a part corresponding to the second contacting portion 1008g of the wheel 1008 changes according to the rotation of the wheel 1008.

Even in the case where the attitude of the monocycle 1002 inclines so that it rotates about the X axis (so that it rotates in the direction shown by symbol R in FIG. 12), and the attitude of the monocycle 1002 is in a state in which the one end portion or the other end portion of the first contacting portion 1008f in the axial direction is contacting the ground, the attitude of the monocycle 1002 can be restored to the upright state by the attitude control ability of the CMG 1030, that is described later, being exerted.

On the other hand, as shown in FIG. 12, non-contacting portions 1008e that do not contact the ground during the operation of the monocycle 1002 are provided on both end surfaces of the rubber portion 1008c in the axial direction. Then, the non-contacting portion 1008e is adjacent to the contacting portion 1008d. Namely, in the case where the attitude of the monocycle 1002 inclines more than a state in which the one end portion or the other end portion of the first contacting portion 1008f in the axial direction is contacting the ground, the attitude control ability of the CMG 1030 cannot restore the attitude of the monocycle 1002 to the upright state.

Furthermore, in this embodiment, it is assumed that the contacting portion 1008d is the entire peripheral surface of the rubber portion 1008c, however, it is not limited to such. The range of the contacting portion 1008d, namely, the position of the boundary between the contacting portion 1008d and the non-contacting portion 1008e depends on the attitude control ability of the CMG 1030. For example, in the case where a CMG 1030 with lower attitude control ability than the CMG 1030 in this embodiment is provided to the monocycle 1002, the range of the contacting portion 1008d becomes narrow, and the boundary between the contacting portion 1008d and the non-contacting portion 1008e is located at inner sides than both end portions in the axial direction of the peripheral surface of the rubber portion 1008c.

Here, in the case where an imaginary plane that includes the rotation axis 1008a of the wheel 1008, and in which the normal direction is a horizontal direction (namely, the movement direction of the monocycle 1002 shown in FIG. 11) is a first imaginary plane (a plane that includes a line shown by symbol A and that is perpendicular to a paper surface in FIG. 11), a first intersection line 1100 as an intersection line of the first contacting portion 1008f and the first imaginary plane is a curved line as shown in FIG. 12. Furthermore, of course, a second intersection line 1110 as an intersection line of the second contacting portion 1008g and the first imaginary plane is also a curved line, and the first intersection line 1100 and the second intersection line 1110 are almost symmetric with respect to the rotation axis 1008a of the wheel. On the other hand, a third intersection line 1120 as an intersection line of the non-contacting portion 1008e and the first imaginary plane is a straight line. In addition, one end 1101 and the other end 1102 of the first intersection line 1100 are respectively adjacent to the third intersection line 1120, namely, the non-contacting portion 1008e. In addition, a center 1103 of the first intersection line 1100 is at a position which contacts the ground when monocycle 1002 is in the upright state. Furthermore, the details of the shape of the first intersection line 1100 are explained in the paragraph of "An example of a shape of the first intersection line 1100" which is described later.

As shown in FIG. 10 and the like, the CMG 1030 is provided at the upper side of the car body 1004. The CMG 1030 is provided with a wheel that rotates at high speed (referred to as a flywheel) 1032, a gimbal 1034 for holding the flywheel 1032, a turn table 1036 for supporting the gimbal 1034 and that rotates about the rotation axis 1034a integrally with the gimbal 1034, and a gimbal motor 1038 for transferring a driving force to the turn table 1036 to make the gimbal 1034 and the turn table 1036 rotate. Furthermore, the axial direction of the rotation axis 1032a of the wheel 1032 is a direction that is along the axial direction of the rotation axis 1008a of the wheel 1008 (namely, the Y axis direction in FIG. 10), and the axial direction of the rotation axis 1034a of the gimbal 1034 is a direction that intersects the rotation axis 1008a (namely, the Z axis direction in FIG. 10). In addition, the driving force for rotating the gimbal 1034 is transferred from the gimbal motor 1038 to the turn table 1036 by a belt pulley mechanism, and the gimbal 1034 rotates about the rotation axis 1034a integrally with the turn table 1036 by the driving force. However, the mechanism for transferring the driving force to the gimbal 1034 is not limited to such, and for example, a gear and the like can transfer the driving force.

The CMG 1030 can control the attitude of the monocycle 1002. For example, in the case where a large external force that makes the attitude of the monocycle 1002 change its attitude is applied to the monocycle 1002, and the attitude of the monocycle 1002 changes to the inclined state, the CMG 1030 can restore the attitude of the monocycle 1002 from the inclined state to the upright state by the attitude control ability being exerted.

For example, when an external force that rotates the monocycle 1002 about the X axis is applied, the attitude of the monocycle 1002 changes to the state in which it is inclined so as to rotate in the direction shown by symbol R in FIG. 12. When this attitude change is detected, in order to restore the attitude of the monocycle 1002 to the upright state, the gimbal 1034 that holds the flywheel 1032 rotates about the rotation axis 1034a integrally with the turn table 1036, in the state in which the flywheel 1032 is rotating at high speed. Thus, the axial direction of the rotation axis 1032a of the flywheel 1032 changes, and by the so-called a gyro effect, the force that rotates the monocycle 1002 about the X axis (namely, the force that rotates the monocycle 1002 in an opposite direction to the direction that the monocycle 1002 has rotated by the external force) is generated, and the attitude of the monocycle 1002 can be restored to the upright state by the relevant force.

In addition, in the case where an external force that rotates the monocycle 1002 about the Z axis is applied, and the attitude of the monocycle 1002 has changed, the speed of the flywheel 1032 changes. By the action of the increase or the decrease in speed of the flywheel 1032, a force that makes the monocycle 1002 rotate about the Z axis is generated, and the attitude of the monocycle 1002 can be restored to the desired state (namely, the state before the monocycle 1002 rotates about the Z axis).

On the other hand, in the case where an external force that makes the monocycle 1002 rotate about Y axis is applied, the attitude of the monocycle 1002 changes to the state in which it is inclined so as to rotate in the direction shown by symbol P in FIG. 11. When the attitude change is detected and the attitude of the monocycle 1002 is to be restored to the upright state, the rotation speed of the wheel 1008 changes. Namely, in this embodiment, the attitude of the monocycle 1002 in the state in which it is inclined so as to rotate about the Y axis, is restored to the upright state, not by the attitude control ability of the CMG 1030, but by the action of the increase or decrease in speed of the wheel 1008. By the change of the rotation speed of the wheel 1008, a force that rotates the monocycle 1002 about the Y axis (namely, the force that rotates the monocycle 1002 in an opposite direction to the direction that the monocycle 1002 has rotated by the external force) is generated. Thus, the attitude of the monocycle 1002 can be restored from the inclined state to the upright state. Thus, in this embodiment, in the case where the external force that makes the monocycle 1002 rotate about the Y axis is applied and the attitude of the monocycle 1002 changes, the attitude of the monocycle 1002 is restored to the upright state by changing the rotation amount of the wheel 1008. However, it is not limited to such. For example, by providing a plurality of the CMG 1030 each with different axial directions of the rotation axis 1032a of the flywheel 1032, even in the case where the external force that makes the monocycle 1002 rotate about the Y axis is applied, and the attitude of the monocycle 1002 changes, it is possible to restore the attitude of the monocycle 1002 to the upright state by using the attitude control ability of the CMG 1030.

Note that, the monocycle 1002 is provided with an attitude sensor (not shown) such as an attitude gyro, and detects the above-mentioned attitude change by the attitude sensor. Further, the monocycle 1002 is provided with a main controller (not shown). The main controller is provided with a CPU, a RAM, a ROM, and the like, and the main controller controls the wheel 1008, the CMG 1030, and the like according to an output from the attitude sensor.

An Example of the First Intersection Line

Figure 14:
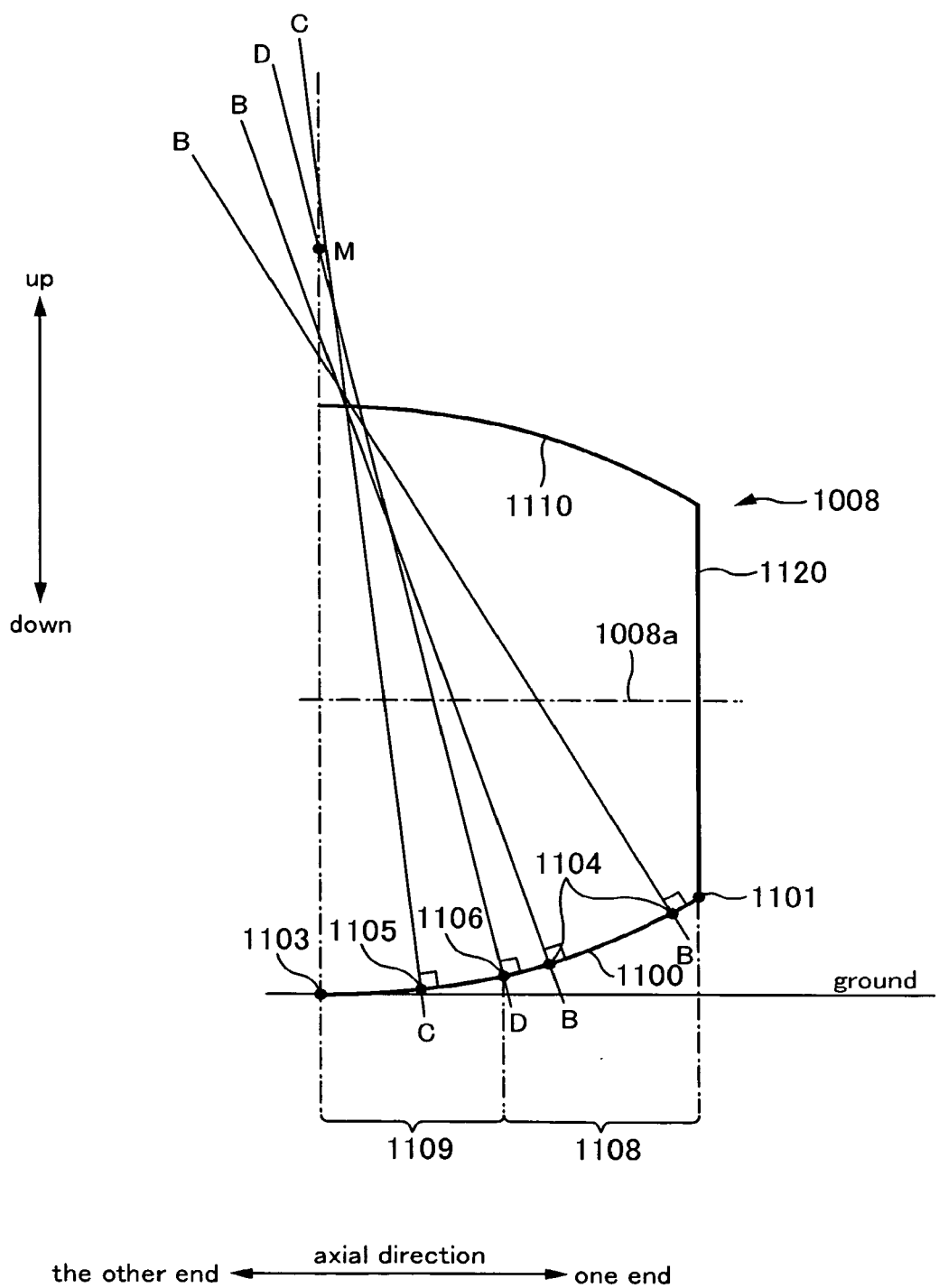
FIG. 14 is a diagram for describing a first intersection line 1100 as the shape of a first contacting portion 1008*f*.

Next, an example of the first intersection line 1100 is described by using FIG. 14.

FIG. 14 is a diagram for describing the shape of the first intersection line 1100 as the shape of the first contacting portion 1008f. In FIG. 14, there are shown the first intersection line 1100, the second intersection line 1110, the third intersection line 1120, and a center of gravity of the monocycle 1002 (shown by symbol M in FIG. 14) when the attitude of the monocycle 1002 is in the upright state. In FIG. 14, the vertical direction of the monocycle 1002 and the axial direction of the rotation axis 1008a of the wheel 1008 are shown by arrows. For convenience of explanation, the descriptions of the car body 1004, the CMG 1030 and the like are omitted in FIG. 14.

Regarding the first intersection line 1100 in this embodiment, when it is assumed that a line which passes through a center 1103 of the first intersection line 1100 and intersects the rotation axis 1008a of the wheel 1008 (namely, a line that correspond to the rotation axis 1034a of the gimbal 1034 in FIG. 12) is a center line, a shape of a portion at one end side (hereafter, referred to as one end side) in the axial direction of the rotation axis 1008a from the center line and a shape of a portion of the other end side (hereafter, referred to as the other end side) in the axial direction from the center line are almost axisymmetrical. Therefore, only the shape of the one end portion of the first intersection line is described hereafter.

As mentioned above, the first intersection line 1100 is a curved line, and among the points on the curved line are included a first point 1104 and a second point 1105. When describing the positional relationship between the first point 1104 and the second point 1105, and a center of gravity M of the monocycle 1002, the first point 1104 is a point that meets following first condition, while the second point 1105 is a point that meets following second condition.

In the first condition, a second imaginary plane includes the first point 1104 and is perpendicular to the first imaginary plane, the second imaginary plane (in FIG. 14, a plane that includes the line B-B and that is perpendicular to the paper plane) having the normal direction of the second imaginary plane as a tangential direction of the curved line (that is, the first intersection line 1100) at the first point 1104, being located lower than the center of gravity M of the monocycle 1002, and in the second condition, a third imaginary plane includes the second point 1105 and is perpendicular to the first imaginary plane, the third imaginary plane (in FIG. 14, a plane that includes the line C-C, and that is perpendicular to the paper plane) having the normal direction of the third imaginary plane as a tangential direction of the curved line (that is, the first intersection line 1100) at the second point 1105, being located upper than the center of gravity M of the monocycle 1002.

In this embodiment, the center of gravity M of the monocycle 1002 is located on the first imaginary plane when the attitude of the monocycle 1002 is in the upright state, however, it is not limited to such. For example, it is possible that the center of gravity M is located forward (rearward) than the first imaginary plane of the monocycle 1002. Furthermore, it is assumed that the center of gravity M of this embodiment is located at the upper side than the second intersection line 1110 (namely, above the wheel 1008) when the attitude of the monocycle 1002 is in the upright state, however, it is not limited to such. For example, it is possible that the center of gravity M is located between the first intersection line 1100 and the second intersection line 1110 when the attitude of the monocycle 1002 is in the upright state. Furthermore, the center of gravity M is located on the imaginary line that passes through the center 1103 of the first intersection line 1100, and intersects the rotation axis 1008*a* of the wheel 1008 (namely, the center line of the first intersection line 1100).

The first intersection line 1100 is provided with a first curved line portion 1108 of which every point on the line is the first point 1104, and a second curved line portion 1109 of which every point on the line is the second point 1105. Furthermore, in this embodiment, the second curved line portion 1109 is provided immediately adjacent to the center 1103 of the curved line, namely, in the center portion of the first intersection line 1100 as shown in FIG. 14. On the other hand, the first curved line portion 1108 is provided to both end portions of the curved line, and one end portion of the first curved line portion 1108 is adjacent to the second curved line portion 1109.

On the other hand, a third point 1106 exists on a boundary between the first curved line portion 1108 and the second curved line portion 1109. The third point 1106 is neither the first point 1104 nor the second point 1105. When describing the positional relationship between the third point 1106 and the center of gravity M of the monocycle 1002, the third point 1106 is a point that satisfies a following third condition.

In the third condition, a fourth imaginary plane includes the third point 1106 and is perpendicular to the first imaginary plane, the fourth imaginary plane (in FIG. 14, a plane that includes line D-D, and that is perpendicular to the paper plane) having the normal direction of the fourth imaginary plane as a tangential direction of the curved line at the third point 1106, passing through the center of gravity M of the monocycle 1002.

In this embodiment, since the center of gravity M is on the center line of the first intersection line 1100, the center 1103 also can be the third point 1106.

Furthermore, the shape of the first intersection line as described above can be expressed by using, for example, hyperbolic functions or the like with a distance from the center 1103 of the first intersection line 1100 as a variable.

Effectiveness of the Car in this Embodiment

As described above, the monocycle 1002 according to this embodiment is a monocycle 1002 having the wheel 1008 that can rotate about the rotation axis 1008*a*, and is provided with the CMG 1030 for controlling the attitude of the monocycle 1002. The wheel 1008 has the first contacting portion 1008*f* that is located lower than the rotation axis 1008*a* and that can contact the ground during the movement of the monocycle 1002. When an imaginary plane that includes the rotation axis 1008*a* and in which the normal direction is a horizontal direction is the first imaginary plane, the first line of intersection 1100 of the first contacting portion 1008*f* and the first imaginary plane is a curved line, and among the points on the curved line are included the first point 1104 that satisfies the following first condition and the second point 1105 that satisfies the following second condition.

In the first condition, a second imaginary plane includes the first point 1104 and is perpendicular to the first imaginary plane, the second imaginary plane in which the normal direction of the second imaginary plane is a tangential direction of the curved line at the first point 1104, being located lower than the center of gravity M of the monocycle 1002.

In the second condition, a third imaginary plane includes the second point 1105 and is perpendicular to the first imaginary plane, the third imaginary plane in which the normal direction of the third imaginary plane is a tangential direction of the curved line at the second point 1105, being located upper than the center of gravity M of the monocycle 1002.

By the way, as described in the paragraph of the Related Art, the attitude of the monocycle 1002 needs to be able to change according to the movement of the monocycle 1002. For example, when the monocycle 1002 is performing a turning movement, a direction changing movement and so on, the attitude of the monocycle 1002 needs to be inclined. In addition, the maneuverability of the monocycle 1002 improves as the attitude of the monocycle 1002 becomes easier to be inclined. For this reason, it is preferable that the first contacting portion 1008*f* provided to the wheel 1008 is a shape in which the attitude of the monocycle 1002 can be easily changed to an inclined state.

On the other hand, the attitude of the monocycle 1002 needs to be appropriately controlled by the CMG 1030. For example, the attitude of the monocycle 1002 in the inclined state needs to be appropriately restored to the upright state under the control of the CMG 1030. However, the attitude control ability of the CMG 1030 has a limit, and there is a possibility of the attitude of the monocycle 1002 not being maintained in an appropriate state, depending on the shape of the first contacting portion 1008*f*. Therefore, the shape of the first contacting portion 1008*f* needs to be a shape that takes into account the limit of the attitude control ability of the CMG 1030, in order to maintain the attitude of the monocycle 1002 in the appropriate state.

The monocycle 1002 according to this embodiment is for solving such problems. Hereinafter, the effectiveness of the car in this embodiment is described referring to FIG. 15 to FIG. 9.

Figure 15:
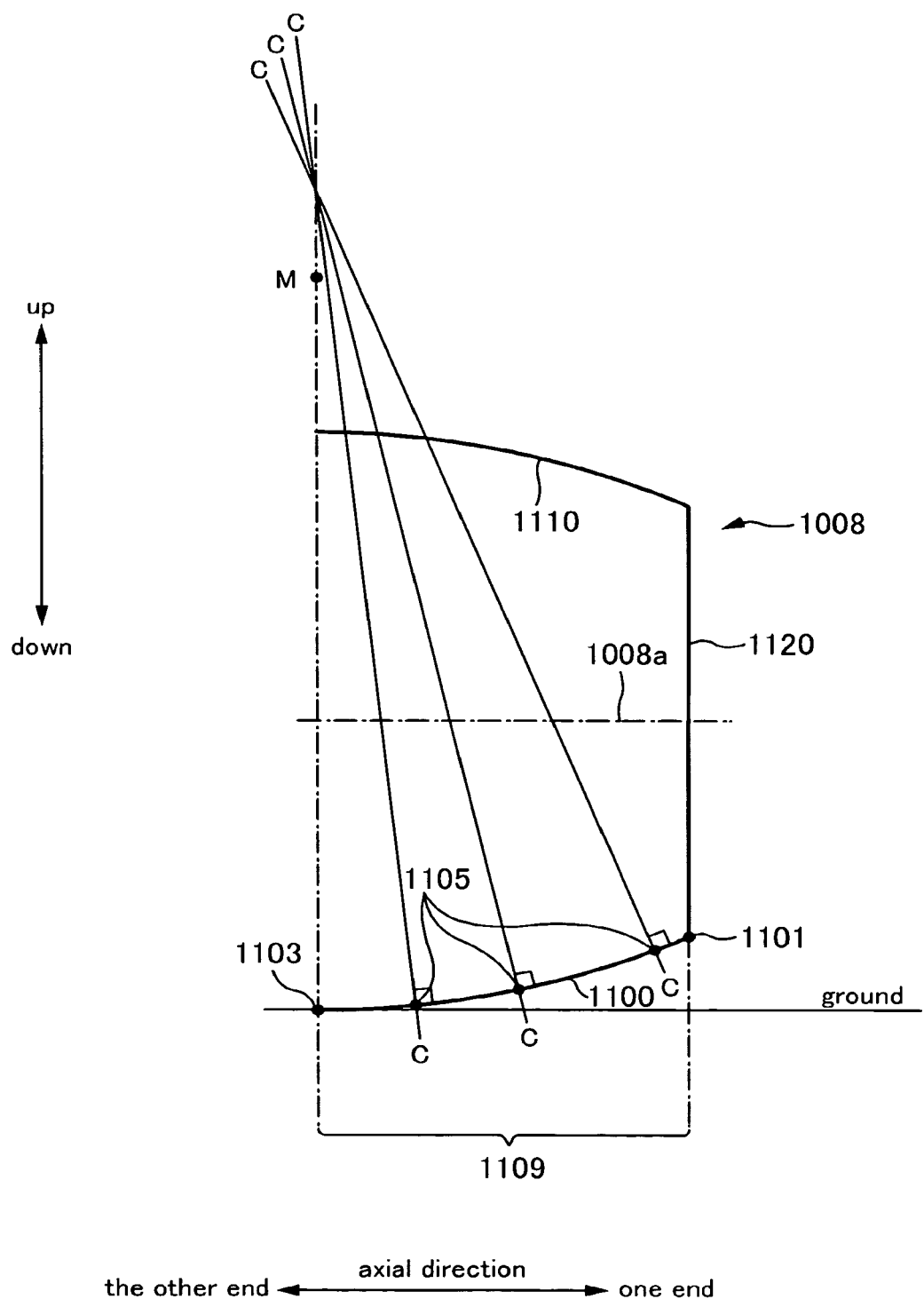
FIG. 15 is a diagram showing the shape of the first intersection line 1100 in which a second point 1105 is included but a first point 1104 is not included in the points on the first intersection line 1100.
Figure 16:
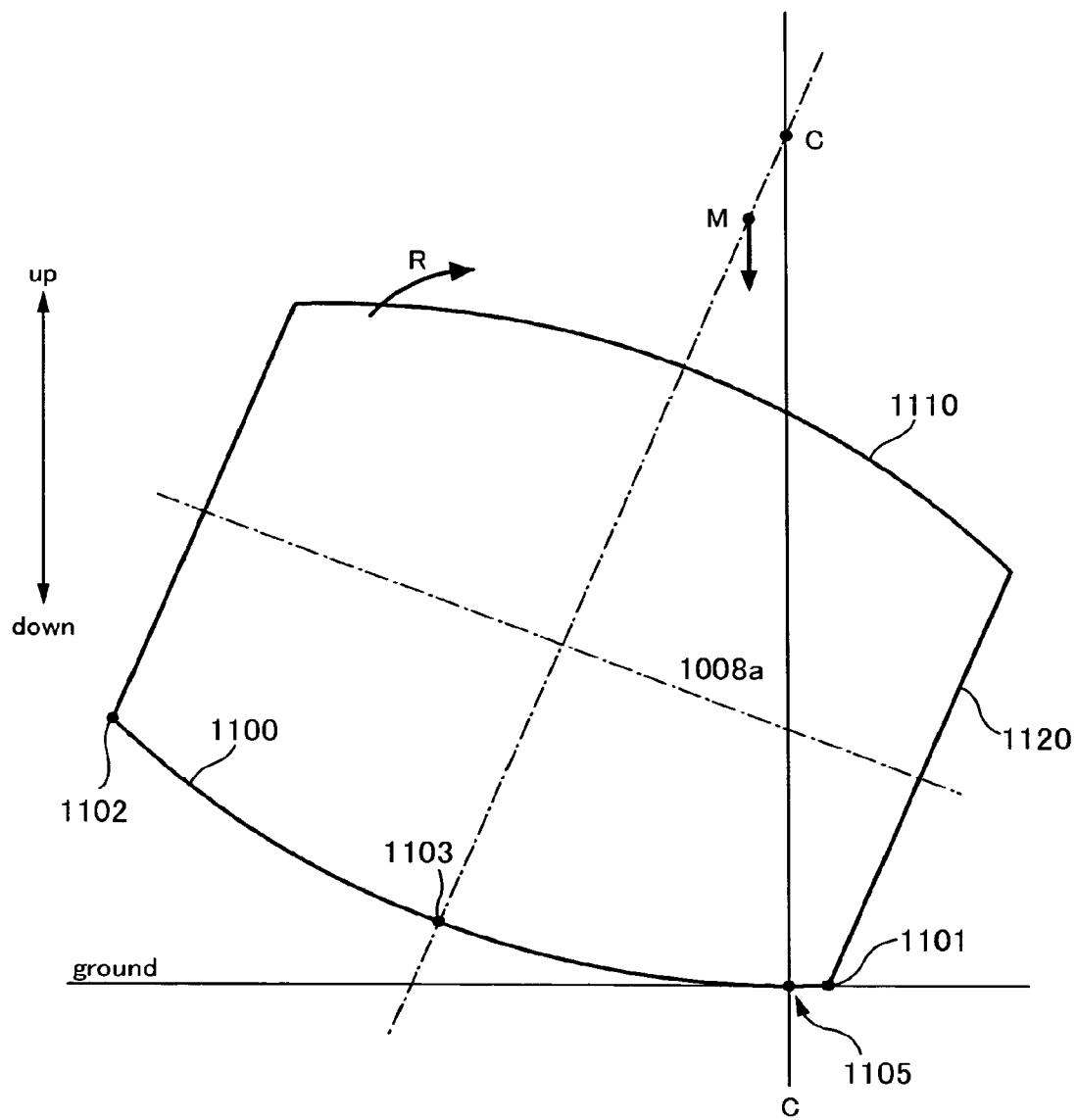
FIG. 16 is a diagram for describing the attitude of the monocycle 1002, when the monocycle 1002 provided with the first contacting portion 1008*f* that has the first intersection line 1100 shown in FIG. 15 is inclining so as to rotate about an X axis.
Figure 17:
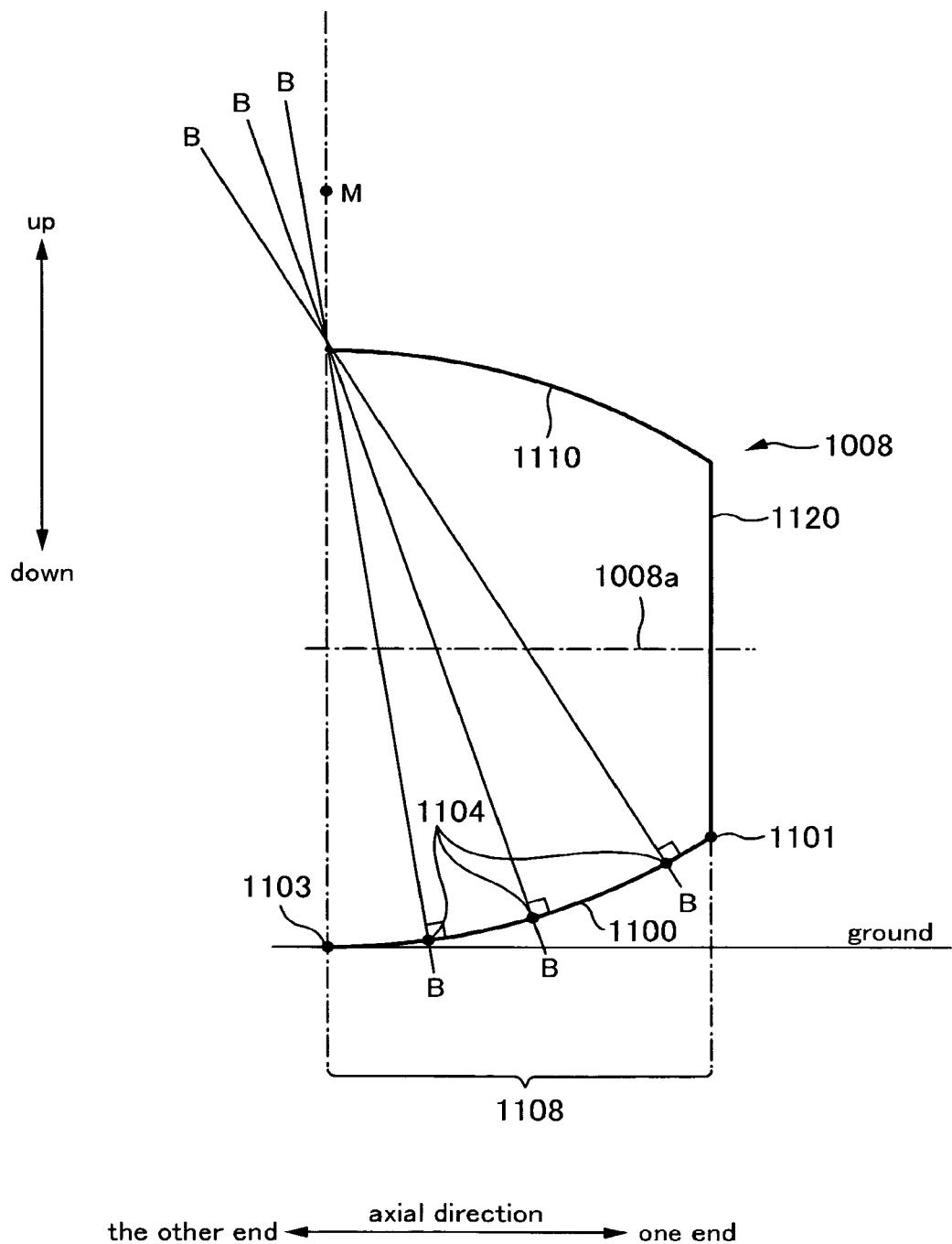
FIG. 17 is a diagram showing the shape of the first intersection line 1100 in which the first point 1104 is included but the second point 1105 is not included in the points on the first intersection line 1100.
Figure 18:
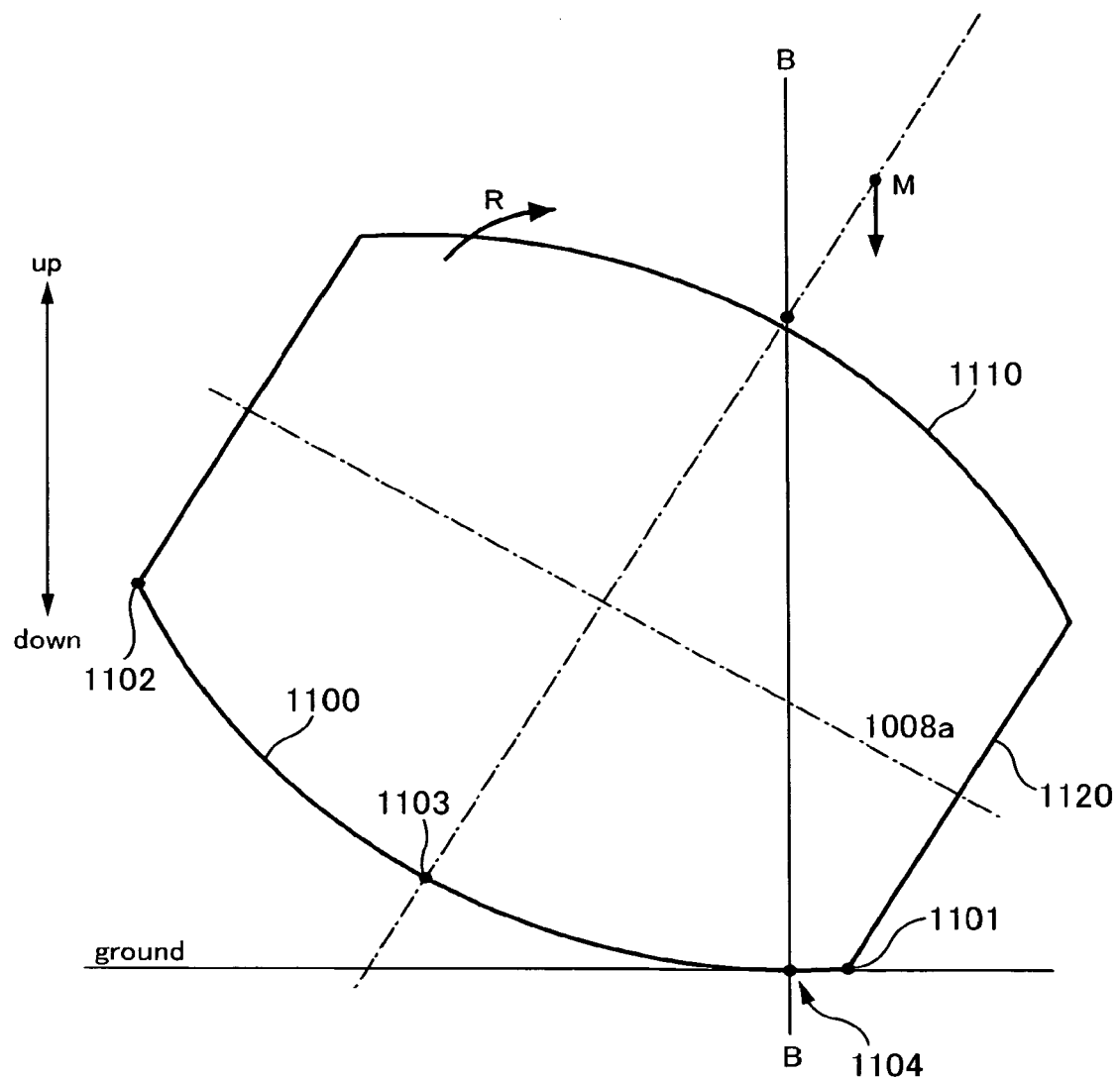
FIG. 18 is a diagram for describing the attitude of the monocycle 1002, when the monocycle 1002 provided with the first contacting portion 1008*f* that has the first intersection line 1100 shown in FIG. 17 is inclined so as to rotate about the X axis.

FIG. 15 is a diagram showing the shape of the first intersection line 1100 of the first contacting portion 1008*f* in which the second point 1105 is included but the first point 1104 is not included in the points on the first intersection line 1100, as an example of a comparative example of this embodiment. FIG. 16 is a diagram for describing the attitude of the monocycle 1002, when the monocycle 1002 provided with the first contacting portion 1008*f* that has the first intersection line 1100 in FIG. 15 is inclining so as to rotate in the direction shown in symbol R in FIG. 16. FIG. 17 is a diagram showing the shape of the first intersection line 1100 in which the first point 1104 is included but the second point 1105 is not included in the points on the first intersection line 1100, as an example of a comparative example to this embodiment, as similar to FIG. 15. FIG. 18 is a diagram for describing the attitude of the monocycle 1002 when the monocycle 1002 provided with the first contacting portion 1008*f* having the first intersection line 1100 shown in FIG. 17 is inclined so as to rotate in the direction shown by symbol R in FIG. 17. Furthermore, in FIG. 15 and FIG. 17, the axial direction of the rotation axis 1008*a* of the wheel 1008 and the vertical direction of the monocycle 1002 are shown by arrows. In FIG. 16 and FIG. 18, the vertical direction of the monocycle 1002 is shown by an arrow. Moreover, in the first intersection line 1100 shown in FIG. 15 and FIG. 17, as similar to the first intersection line 1100 shown in FIG. 14, the shape of the portion of the one end side and the shape of the portion of the other end side are almost axisymmetrical. Therefore, only the shape of the one end side in the first intersection line 1100 is described hereafter. Further, in FIG. 15 to FIG. 18, the description of the car body 1004, the CMG 1030 and the like are omitted for convenience of explanation.

As the shape of the first contacting portion 1008f of the wheel 1008, there can be a shape in which the first intersection line 1100 of the first contacting portion 1008f is a shape which includes the second point 1105 but does not include the first point 1104 as the points located on the first intersection line 1100, namely, as shown in FIG. 15, the shape in which the portion except the center 1103 in the first intersection line 1100 is the second curved line portion 1109, and in which the first curved line portion 1108 is not included. Here, in the case where the first contacting portion 1008f having the first intersection line 1100 in this shape is provided to the monocycle 1002, for example, when the attitude of the monocycle 1002 inclines so as to rotate in the direction shown by symbol R in FIG. 16, the first contacting portion 1008f contacts the ground at the second point 1105. At this time, as shown in FIG. 16, gravity that acts on the center of gravity M of the monocycle 1002 provides the monocycle 1002 with rotation moment (shown by an arrow in FIG. 16) that rotates the monocycle 1002 in an opposite direction to direction R. Namely, the first contacting portion 1008f having the first intersection line 1100 shown in FIG. 15 is in a shape such that even if the attitude of the monocycle 1002 is changed from the upright state to the inclined state by rotating in the direction R, the attitude of the monocycle 1002 can be restored to the upright state without using the CMG 1030. In other words, in the case where the first contacting portion 1008f in such a shape is provided to the monocycle 1002, the attitude of the monocycle 1002 is less likely to be in an inclined state. Then, it becomes difficult for the monocycle 1002 to perform the turning movement, the direction changing movement and the like, and the maneuverability of the monocycle 1002 also decreases.

Therefore, as described above, it is preferable that the shape of the first contacting portion 1008f is such that the attitude of the monocycle 1002 can be easily changed to the inclined state. Then, as the shape in which the attitude of the monocycle 1002 can be easily changed to the inclined state, there can be considered a shape in which the first intersection line 1100 of the first contacting portion 1008f includes the first point 1104 and does not include the second point 1105 as the points located on the first intersection line 1100, namely, as shown in FIG. 17, the shape in which the portion except the center 1103 of the first intersection line 1100 is the first curved line portion 1108 and does not include the second curved line portion 1109. In the case where the first contacting portion 1008f having the first intersection line 1100 in this shape is provided to the monocycle 1002, for example, if the attitude of the monocycle 1002 inclines so as to rotate in the direction shown by symbol R in FIG. 18, the first contacting portion 1008f contacts the ground at the first point 1104. At this time, as shown in FIG. 18, gravity that acts on the center of gravity M of the monocycle 1002 provides the monocycle 1002 with rotation moment (shown by an arrow in FIG. 18) that further rotates the monocycle 1002 in direction R. Namely, the shape of the first contacting portion 1008f having the first intersection line 1100 shown in FIG. 17 is different from the shape shown in FIG. 15, and is in a shape in which the attitude of the monocycle 1002 is more likely to be in an inclined state. Then, the maneuverability of the monocycle 1002 improves.

However, the attitude control ability of the CMG 1030 has a limit. When a portion, that is in the first contacting portion 1008f having the first intersection line 1100 shown in FIG. 17, is contacted to the ground, the CMG 1030 can not appropriately control the attitude of the monocycle 1002. For example, as in this embodiment, in the case where the CMG 1030 is provided as the attitude control mechanism, when the center portion of the first contacting portion 1008f contacts the ground, the CMG 1030 cannot appropriately control the attitude of the monocycle 1002. Specifically, the attitude of the monocycle 1002 changes from the upright state to the slightly inclined state so as to rotate about the X axis, and the CMG 1030 performs control to restore the attitude of the monocycle 1002 to the upright state. Under such circumstances, due to the effects of noise when controlling, the limit of the resolution of the CMG 1030 and the like, the CMG 1030 becomes unable to appropriately control the attitude of the monocycle 1002, and thus, the monocycle 1002 vibrates so as to rotate about the X axis.

On the contrary, the first intersection line 1100 of the first contacting portion 1008f according to this embodiment includes both the first point 1104 and the second point 1105 as the points located on the first intersection line 1100. Namely, there coexist in the first contacting portion 1008f, a portion which applies a moment that restores the monocycle 1002 to the upright state when contacted to the ground (hereafter, referred to as upright moment generating portion) and a portion which provides a moment to make the monocycle 1002 fall down when contacted to the ground (hereafter, referred to as falling moment generating portion). Then, as in this embodiment, in the case where both end portions of the first intersection line 1100 are the first curved line portions 1108, both end portions of the first contacting portion 1008f become the falling moment generating portions. As a result, as long as both end portions of the first contacting portion 1008f are contacting the ground, the attitude of the monocycle 1002 can be easily changed to the inclined state. In this regard, the shape of the first contacting portion 1008f according to this embodiment is common with the shape shown in FIG. 17. On the other hand, the shape of the first contacting portion 1008f according to this embodiment is different from the shape shown in FIG. 17 in respect that the center portion of the first intersection line 1100 of the first contacting portion 1008f is the second curved line portion 1109. Namely, the center portion of the first contacting portion 1008f is the upright moment generating portion. As a result, the attitude of the monocycle 1002 in the upright state is appropriately maintained. Specifically, in the case where the center portion of the first intersection line 1100 is the first curved line portion 1108, namely, in the case where the center portion of the first contacting portion 1008f is the falling moment generating portion, vibration of the monocycle 1002 occurs and the CMG 1030 becomes unable to appropriately restore the attitude of the monocycle 1002 to the upright state, as described above. Here, by replacing the falling moment generating portion to the upright moment generating portion for the center portion of the first contacting portion 1008f, when the attitude of the monocycle 1002 is near the upright state, the moment that restores the attitude of the monocycle 1002 to the upright state is generated, and the attitude of the monocycle 1002 can be restored to the upright state by this moment. As a result, the vibration of the monocycle 1002 is suppressed, and the attitude of the monocycle 1002 is appropriately maintained to the upright state.

Therefore, since the monocycle 1002 according to this embodiment is provided with the first contacting portion 1008f having the shape mentioned above, the attitude of the monocycle 1002 can easily be changed to the inclined state, and it is possible to maintain the attitude of the monocycle 1002 in the appropriate state.

A Modified Example of the First Intersection Line 1100

In the above-mentioned embodiment, explanation was given regarding the case where the second curved line portion 1109, in which all the points on the line are the second points 1105, is located at the center portion of the first intersection line 1100, and the first curved line portion 1108, in which all the points on the line are the first points 1104, is located at both end portions of the first intersection line 1100 (hereafter, referred to as the present example). However, the shape of the first intersection line 1100 is not limited to such, and other examples can be considered. In this paragraph, other examples of shapes of the first intersection line 1100 (hereafter, referred to as a first modified example, and a second modified example) are explained. Moreover, in the first intersection line 1100 according to each of the modified examples, as similar to the first intersection line 1100 according to this example, a shape of a portion at one end side and a shape of a portion at the other end side are almost axisymmetric. Therefore, only the shape of the one end portion in the first intersection line 1100 is described hereafter.

A First Modified Example of the First Intersection Line 1100

Figure 19:
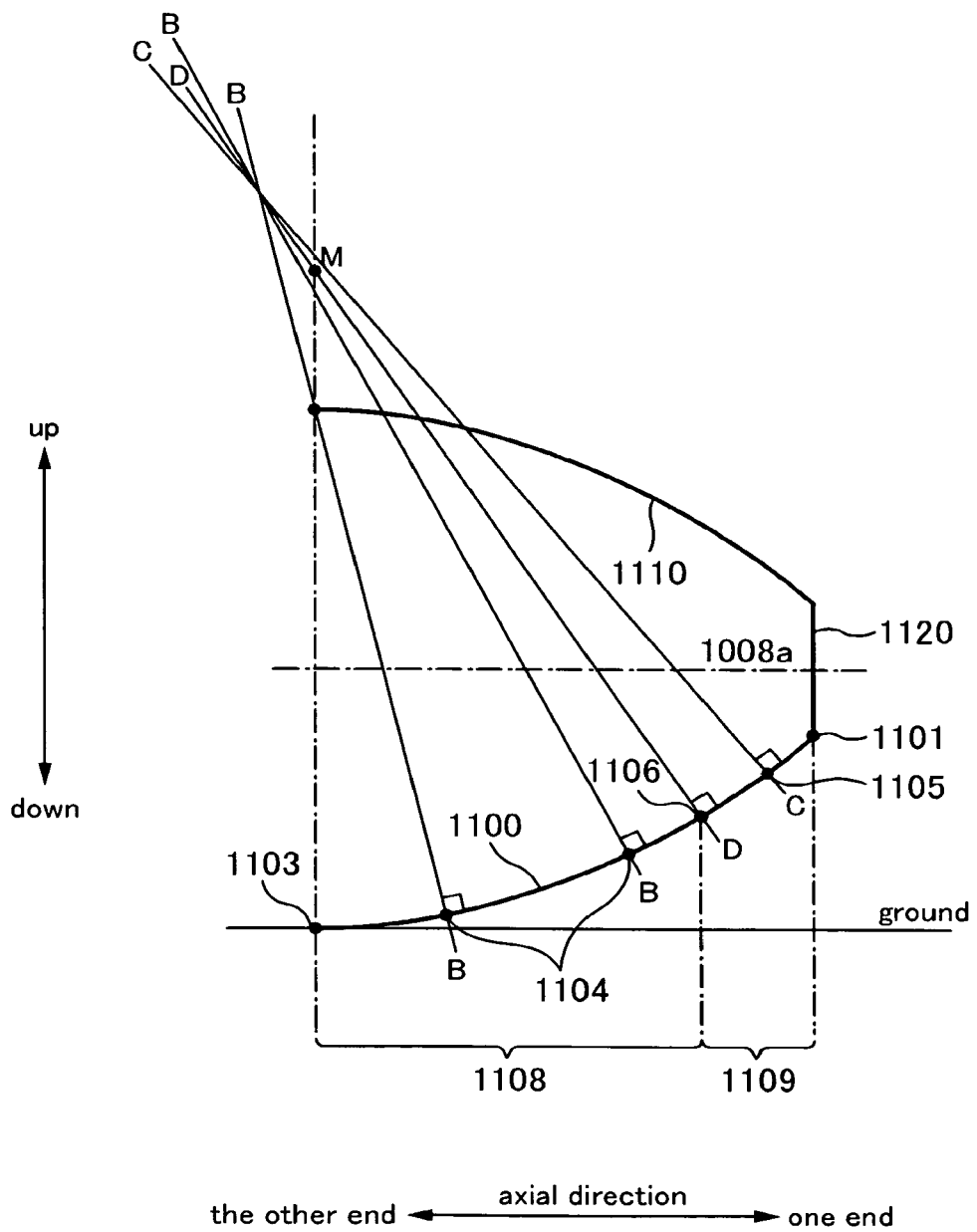
FIG. 19 is a diagram for describing the shape of the first intersection line 1100 in the first contacting portion 1008*f* according to a first modified example.
Figure 20:
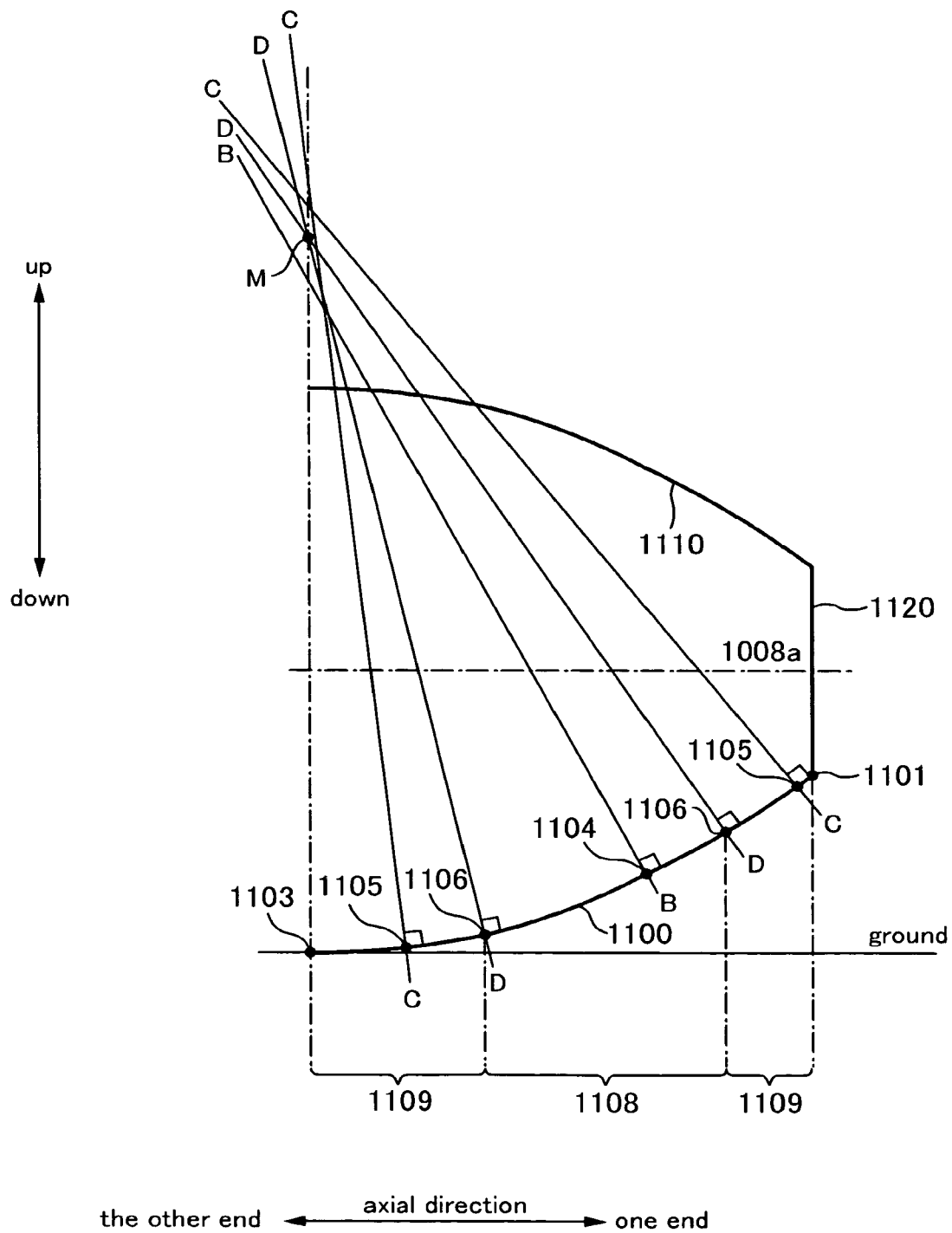
FIG. 20 is a diagram that corresponds to FIG. 14 and FIG. 19, and shows the shape of the first intersection line 1100 provided with a second curved line portion 1109 at the center portion and both end portions.

First, a first modified example is described by using FIG. 19 and FIG. 20. FIG. 19 is a diagram for describing the shape of the first intersection line 1100 in the first contacting portion 1008$f$ according to the first modified example. FIG. 20 will be described later. Further, in FIG. 19 and FIG. 20, the axial direction of the rotation axis 1008$a$ of the wheel 1008 and the vertical direction of the monocycle 1002 are shown by arrows. Further, for the convenience of explanation, description of the car body 1004, the CMG 1030 and the like are omitted in FIG. 19 and FIG. 20.

As shown in FIG. 19, since the center portion of the first intersection line 1100 in the first contacting portion 1008$f$ according to the present modified example is the first curved line portion 1108, as long as the center portion of the first contacting portion 1008$f$ is contacting the ground, the attitude of the monocycle 1002 can be easily changed to the inclined state. In this regard, the shape of the first contacting portion 1008$f$ according to this modified example is common with the shape shown in FIG. 17, however, it is different from the shape shown in FIG. 17 in the respect that both end portions of the first intersection line 1100 are the second curved line portion 1109. As a result, it is possible to prevent the monocycle 1002 from falling down. Specifically, since both end portions of the first contacting portion 1008$f$ are near to the boundary between the first contacting portion 1008$f$ and the non-contacting portion 1008$e$, in the case where both end portions of the first contacting portion 1008$f$ are the falling moment generating portions, when an external force and the like that makes the monocycle 1002 incline further is applied to the monocycle 1002 that is in a state in which both end portions are contacting the ground, there is a possibility that the monocycle 1002 may fall down. Here, by replacing the falling moment generating portion with the upright moment generating portion for both end portions of the first contacting portion 1008$f$, in the case where both end portions of the first contacting portion 1008$f$ are contacting the ground, the moment that restores the attitude of the monocycle 1002 to the upright state is generated, so that the monocycle 1002 is prevented from falling down.

Further, as shown in FIG. 20, the first intersection line 1100 can be provided with the second curved line 1109 at the center portion and both end portions of the first intersection line 1100. FIG. 20 is a diagram that corresponds to FIG. 14 and FIG. 19, and shows the shape of the first intersection line 1100 provided with the second curved line portion 1109 at the center portion and both end portions. In the case where the first intersection line 1100 is in a shape shown in FIG. 20, an effect regarding embodiments in this example (namely, an effect of appropriately maintaining the attitude of the monocycle 1002 in the upright state) and an effect regarding embodiments of the first modified example (namely, an effect of preventing the monocycle 1002 from falling down) are exerted.

A Second Modified Example of the First Intersection Line 1100

Figure 21:
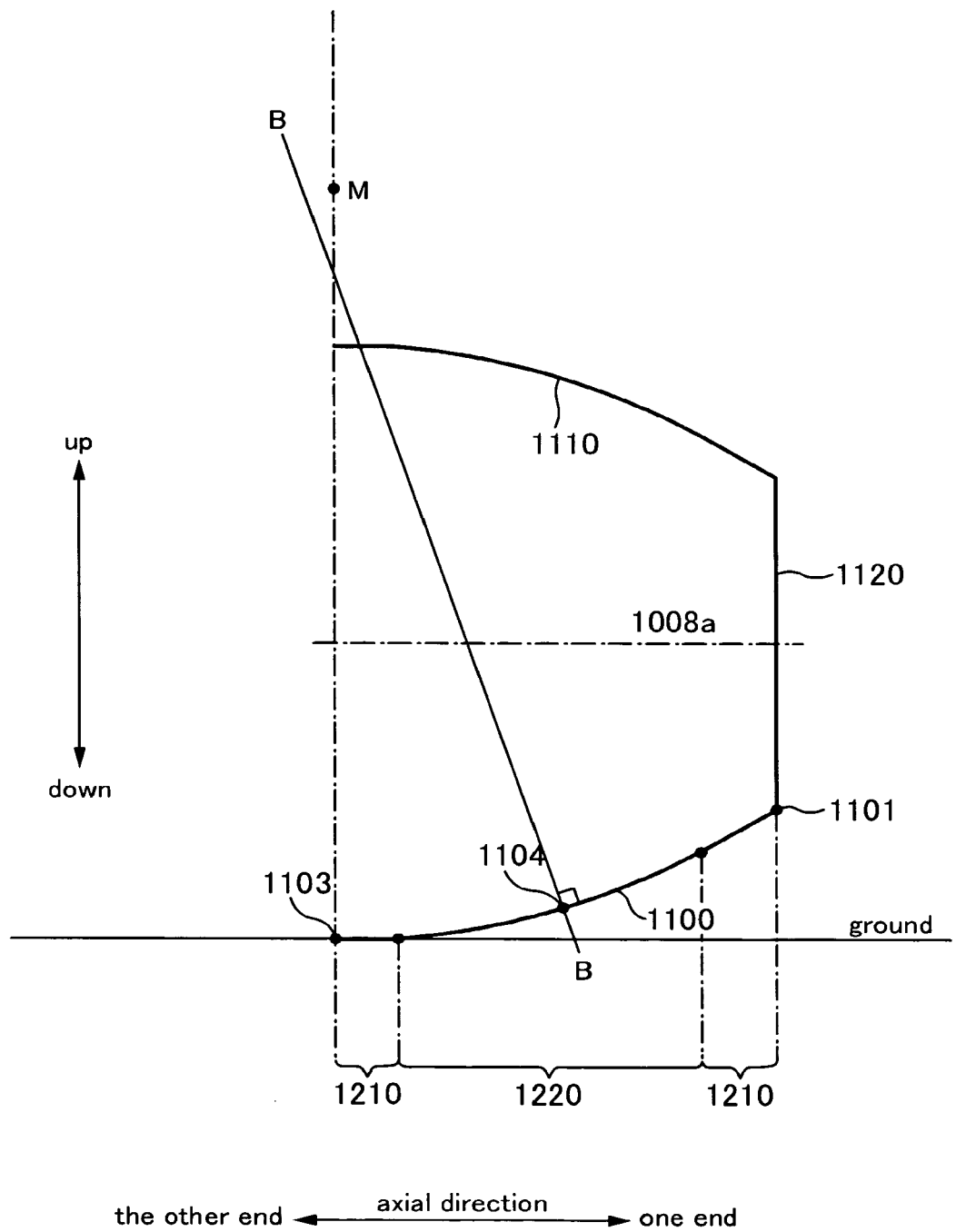
FIG. 21 is a diagram that describes the shape of the first intersection line 1100 of the first contacting portion 1008*f* according to the second modified example, and corresponds to FIG. 20.
Figure 22:
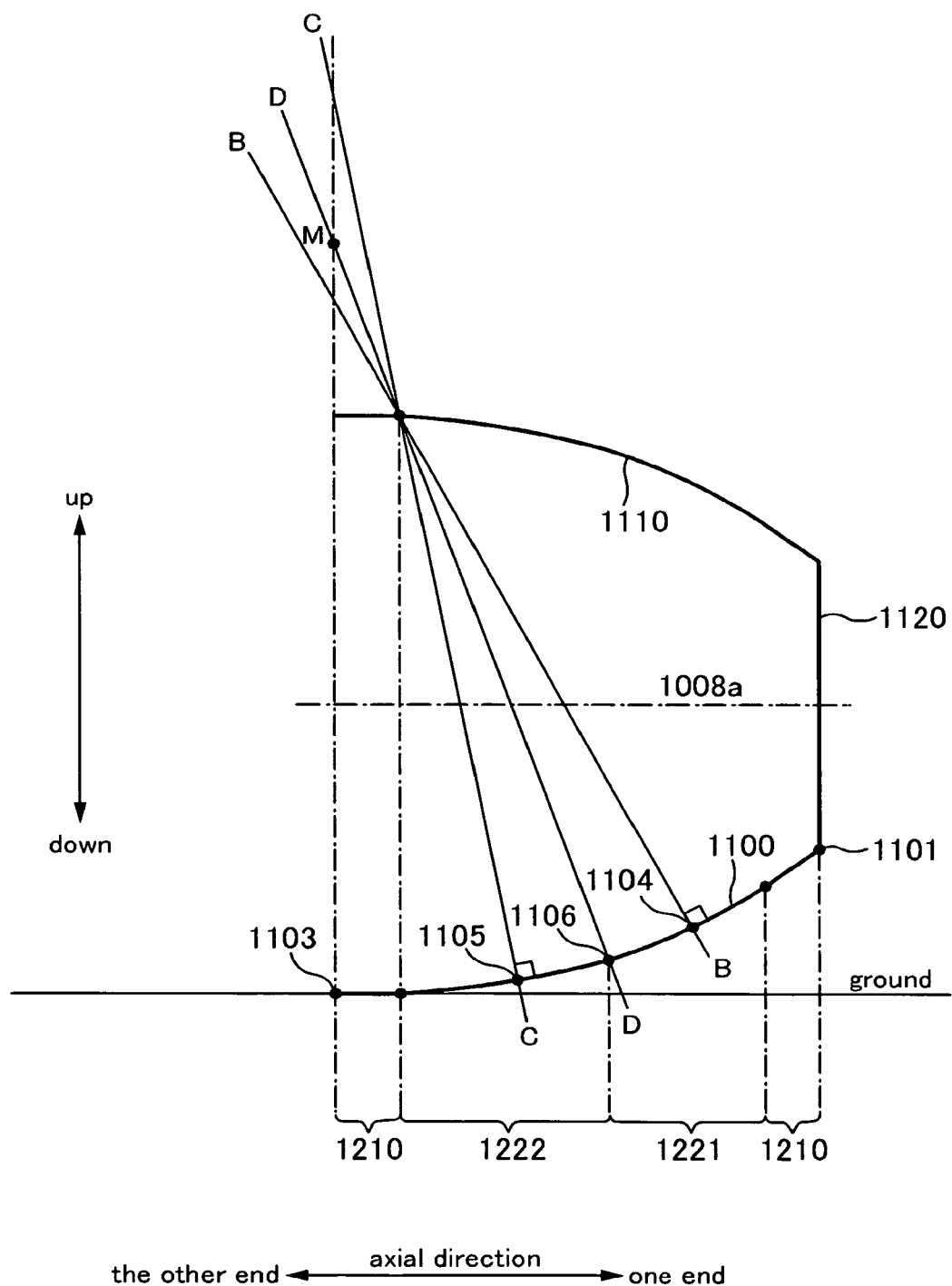
FIG. 22 is a diagram for describing the shape of the first intersection line 1100 provided with a straight line portion 1210, a third curved line portion 1221, and a fourth curved line portion 1222.

Next, a second modified example is described by using FIG. 21 and FIG. 22. FIG. 21 is a diagram that describes the shape of the first intersection line 1100 of the first contacting portion 1008$f$ according to the second modified example, and corresponds to FIG. 20. FIG. 22 is described later on. Note that, in FIG. 21 and FIG. 22, the axial direction of the rotation axis 1008$a$ of the wheel 1008 and the vertical direction of the monocycle 1002 are shown by arrows. For convenience of explanation in FIG. 21 and FIG. 22, description of the car body 1004, the CMG 1030 and the like are omitted.

In the embodiment of the present example and the first modified example, the first intersection line 1100 is a curved line, and it is provided with the first curved line portion 1108 and the second curved line portion 1109. Here, the second curved line portion 1109 corresponds to the upright moment generating portion in the first contacting portion 1008$f$. As described above, in the case where the upright moment generating portion is located in the center portion of the first contacting portion 1008$f$, the monocycle 1002 can appropriately maintain its attitude in the upright state. On the other hand, in the case where the upright moment generating portion is located on both end portions of the first contacting portion 1008$f$, it is possible to prevent the monocycle 1002 from falling down. However, the shape of the first intersection line 1100 that exerts these effects is not limited to the case in which the first intersection line 1100 is provided with the second curved line portion 1109. For example, it is possible that the first intersection line 1100 is provided with the straight line portion 1210 as the portion which has the same effect as the effect of the second curved line portion 1109. In other words, in the case where the first contacting portion 1008$f$ has a portion corresponding to the straight line portion 1210, and this portion is contacting the ground, the attitude of the monocycle 1002 maintains the state in which this portion is contacting the ground. Therefore, in this example or in the first modified example, by replacing the second curved line portion 1109 with the straight line portion 1210, the effect of the monocycle 1002 appropriately maintaining the attitude in the upright state, and the effect of preventing the monocycle 1002 from falling down are exerted. In addition, as shown in FIG. 21, in the embodiment of the second modified example, the first intersection line 1100 is provided with the curved line portion 1220, other than the straight line portion 1210. Then, the points on the curved line portion 1220 are all the first points 1104. Namely, the curved line portion 1220 corresponds to the first curved line portion 1108 in this example. Therefore, since the straight line portion 1210 in the second modified example has the same effect as the second curved line portion 1109 according to this embodiment, the attitude of the monocycle 1002 in the embodiment of the second modified example can be easily changed to the inclined state and the attitude can be appropriately controlled. Furthermore, in the embodiment of the second modified example, as shown in FIG. 21, the straight line portion 1210 is provided at both end portions and the center portion of the first intersection line 1100. In such a case, as similar to the first modified example, the effect of preventing the monocycle 1002 from falling down and the effect of the monocycle 1002 appropriately maintaining the attitude in the upright state are both exerted.

As above-mentioned, it is assumed that the first intersection line 1100 according to the second modified example has the straight line portion 1210 and the curved line portion 1220, and the straight line portion 1210 is provided at both end portions and the center portion of the first intersection line 1100, however, it is not limited as such. For example, the straight line portion can be provided in either the center portion or both end portions of the first intersection line 1100. However, in respect that the effect of preventing the monocycle 1002 from falling down and the effect of the monocycle 1002 appropriately maintaining the attitude in the upright state are both exerted, the embodiment of the second modified example is more preferable.

In addition, in the second modified example, it is assumed that all points on the curved line portion 1220 are the first points 1104, however, it is not limited as such. For example, as shown in FIG. 22, it is possible that the second point 1105 is included in the points on the curved line portion 1220. Namely, there can be a case where the curved line portion 1220 is provided with the third curved line portion 1221 in which all points on the line are the first points 1104 (namely, a portion that corresponds to the first curved line portion 1108 in this example) and the fourth curved line portion 1222 in which all points on the line are the second points 1105 (namely, a portion that corresponds to the second curved line portion 1109 in this example). In addition, FIG. 22 is a diagram for describing the shape of the first intersection line 1100 provided with the straight line portion 1210, the third curved line portion 1221, and the fourth curved line portion 1222. In the embodiment of the second modified example, as shown in FIG. 22, the straight line portion 1210, the fourth curved line portion 1222, the third curved line portion 1221, and the straight line portion 1210 are provided on the first intersection line 1100 in this order, from the center portion of the first intersection line 1100. In the monocycle 1002 that has the first contacting portion 1008f in such shape, the effect of preventing the monocycle 1002 from falling down and the effect of the monocycle 1002 appropriately maintaining the attitude in the upright state are both exerted.

Other Embodiments

A car according to this invention is described as above based on the above-mentioned embodiment, however, the foregoing embodiment is for the purpose of elucidating the present invention, and is not to be interpreted as limiting the present invention. This invention can of course be altered and improved without departing from the gist thereof, and includes its equivalents.

Furthermore, in the above embodiment, the CMG 1030 is described as an example of the attitude control mechanism, however, it is not limited as such. As other attitude control mechanisms, a wheel (generally referred to as a reaction wheel) in which the rotation speed can be controlled and the like can be mentioned, and these can be provided to the monocycle 1002. However, even in the case where a large external force that makes the monocycle 1002 change its attitude is applied to the monocycle 1002, the attitude of the monocycle 1002 can be appropriately controlled. Thus, by effectively exerting the attitude control ability of the CMG 1030, the attitude of the monocycle 1002 can be appropriately controlled. In this respect, the above embodiment is more preferable.

Furthermore, in the above embodiment, the CMG 1030 is provided with the rotatable flywheel 1032, and the axial direction of the rotation axis 1032a of the flywheel 1032 is along the vertical direction of the monocycle 1002 (the Z axis), however, it is not limited as such. For example, it is possible that the axial direction of the rotation axis 1032a of the flywheel 1032 is along the movement direction of the car (X axis), or is along the axial direction of the rotation axis 1008a of the wheel 1008 (Y axis).

Furthermore, in the above embodiment, it is assumed that the number of the wheel 1008 is one, however, it is not limited as such and the number of the wheel 1008 can be more than one. Namely, in the above embodiment, the monocycle 1002 is described as an example of the car, however, it is not limited as such, for example, this invention can be applied to a two-wheeled vehicle, a three-wheeled vehicle, a four-wheeled vehicle and the like. However, in the case where the number of the wheel 1008 is one, since the attitude of the car is apt to become unstable compared to the case in which the number of the wheel 1008 is more than one, the attitude of the car can be more easily changed to the inclined state. In that respect, the above-mentioned embodiment is more preferable.

Example of Configuration of a Car

Figure 23:
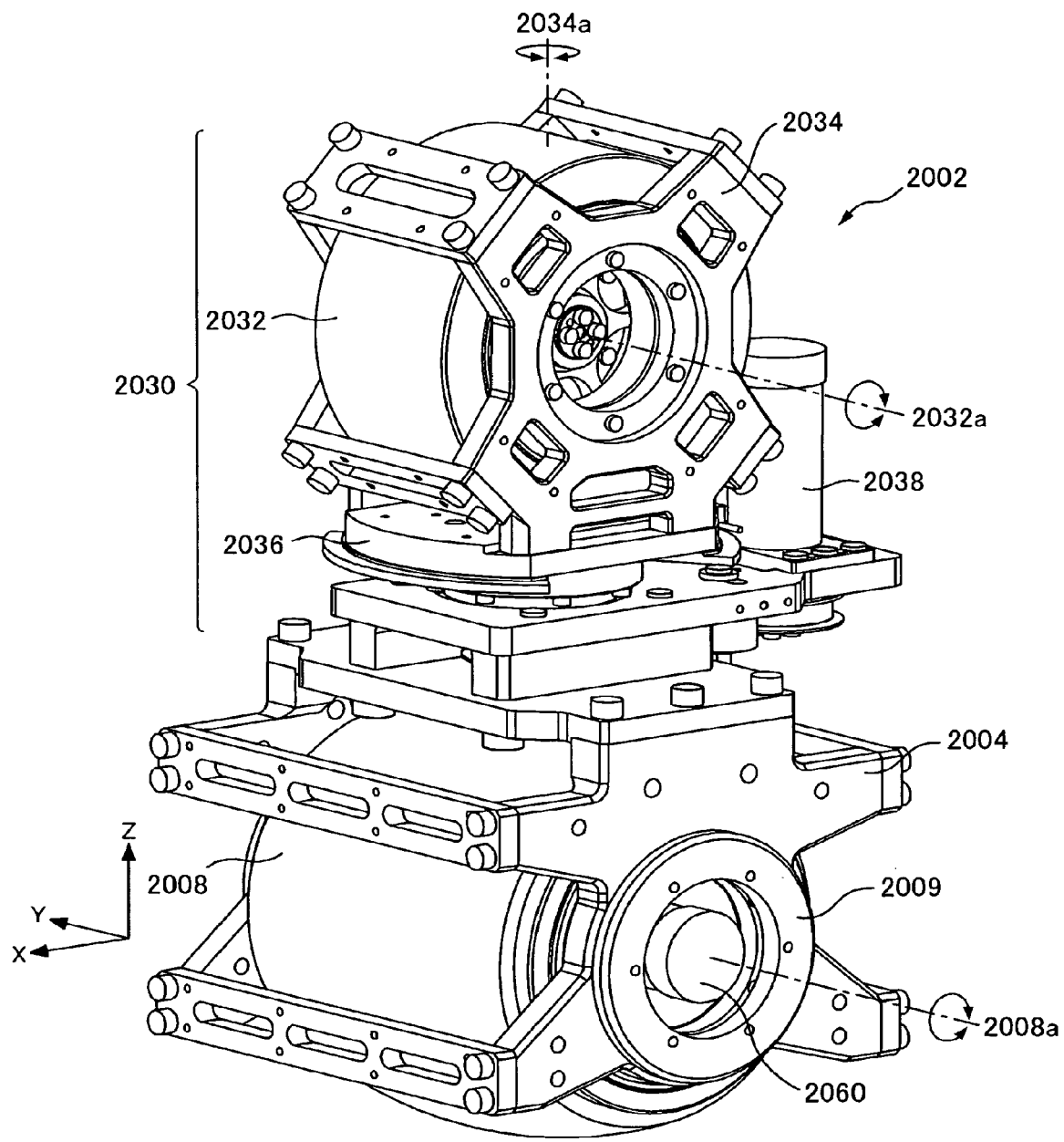
FIG. 23 is a perspective view showing an external configuration of a monocycle 2002.
Figure 24:
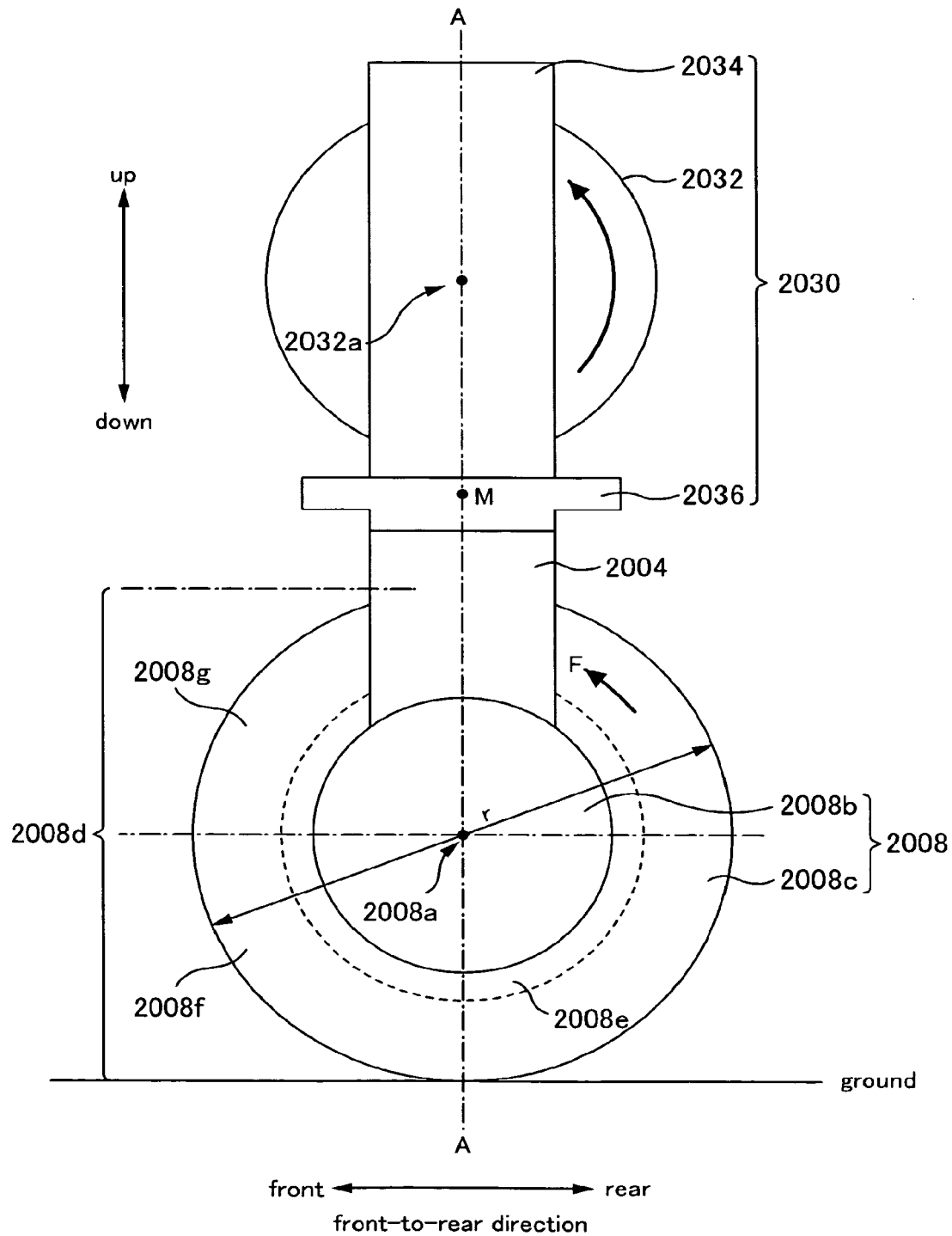
FIG. 24 is a diagram schematically showing sides of main structural elements of the monocycle 2002.
Figure 25:
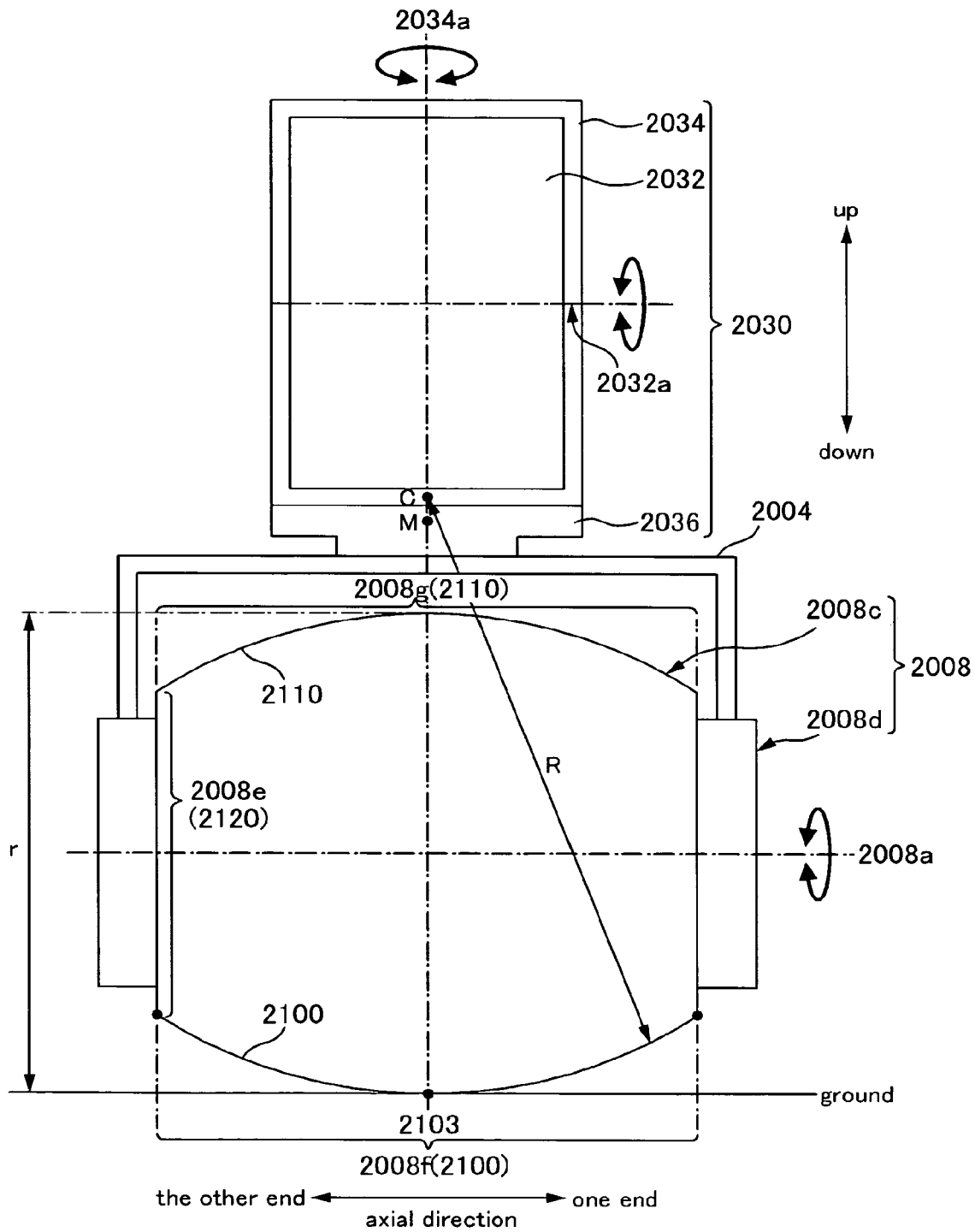
FIG. 25 is a schematic cross-sectional view of the main structural elements of the monocycle 2002 shown in FIG. 24, cut at a cross-section shown by reference character A-A in FIG. 24.
Figure 26:
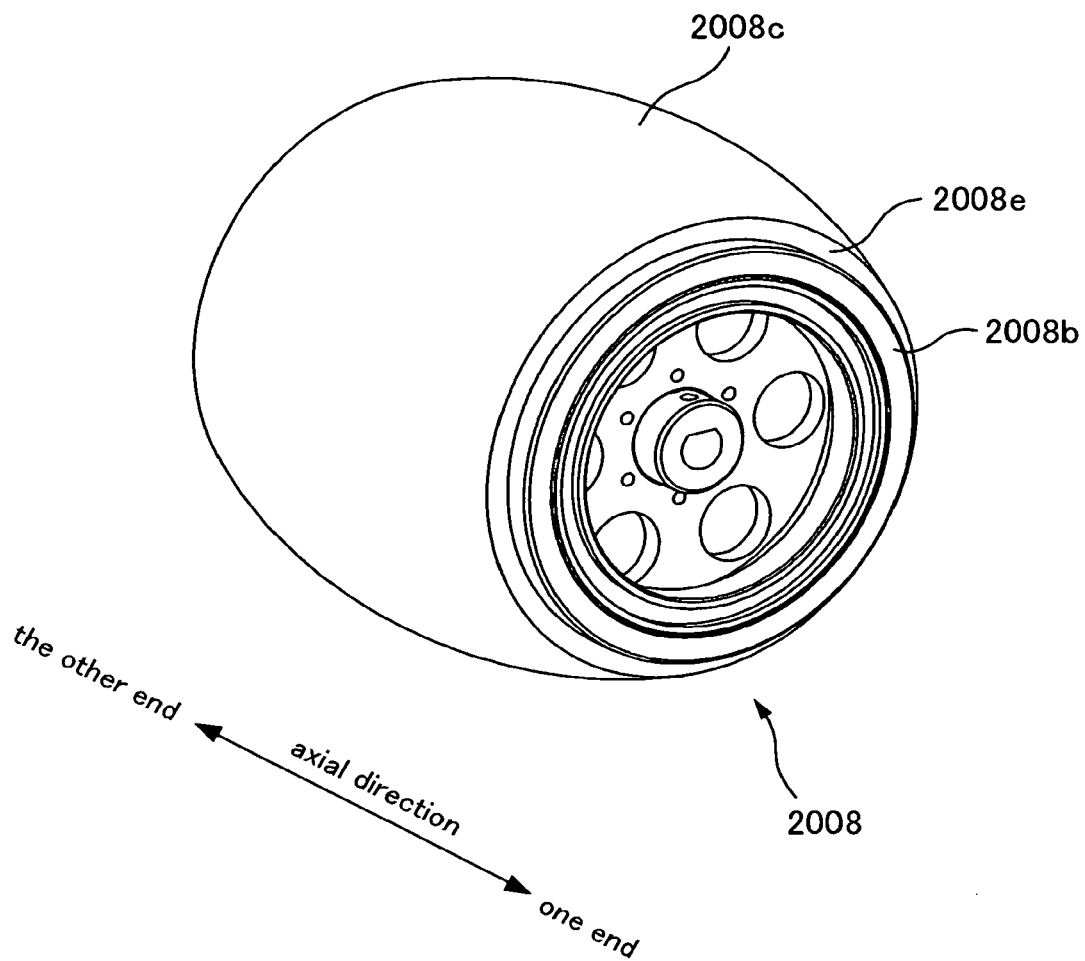
FIG. 26 is a perspective view of a wheel 2008.

Next, an outline of an example of a configuration of a car according to this embodiment is described by using FIG. 23 to FIG. 26. Furthermore, in this embodiment, a monocycle 2 with one wheel is described as an example of the car. FIG. 23 is a perspective view showing an external configuration of the monocycle 2002. FIG. 24 is a schematic diagram showing the side of a car body 2004, a wheel 2008, a control moment gyro 2030 (hereafter, also referred to as CMG which is an abbreviation) and the like provided to the monocycle 2002 as main structural elements of the monocycle 2002. FIG. 25 is a schematic cross-sectional view of the main structural elements of the monocycle 2002 shown in FIG. 24 cut at a cross-section shown by reference character A-A in FIG. 24. FIG. 26 is a perspective view of the wheel 2008.

Furthermore, coordinate axes are shown in FIG. 23. Here, as one example, a front-to-rear direction of the monocycle 2002 is an X axis, an axial direction of a rotation axis 2008a of the wheel 2008 provided to the monocycle 2002 is a Y axis, and a vertical direction of the monocycle 2002 is a Z axis. Furthermore, in FIG. 24, the front-to-rear direction of the monocycle 2002 (namely, the X axis direction in FIG. 23) and the vertical direction of the monocycle 2002 (namely, the Z axis direction in FIG. 23) are shown by arrows. Furthermore, the axial direction of the rotation axis 2008a of the wheel 2008 (namely, the Y axis direction in FIG. 23) and the vertical direction of the monocycle 2002 (namely, the Z axis direction in FIG. 23) are shown by arrows in FIG. 25. Furthermore, in FIG. 26, the axial direction of the rotation axis 2008a of the wheel 2008 is shown by an arrow.

Note that, hereafter, an inclined state refers to a state in which the car body 2004 and the wheel 2008 (to be more accurate, the car body 2004, the CMG 2030, and the wheel 2008) incline to the side, namely, a state in which the car body 2004 and the wheel 2008 incline so as to rotate about the X axis. Furthermore, a tilted state refers to a state in which the car body 2004 (to be more accurate, the car body 2004 and the CMG 2030) tilts in the front-to rear direction, namely, a state in which the car body 2004 tilts so as to rotate about the Y axis. Also, an upright state refers to a state in which the rotation axis 2008a of the wheel 2008 is along a horizontal direction (namely, a non-inclined state), and at the same time a rotation axis 2034a of a gimbal 2034 is along the vertical direction (namely, a non-tilted state). Furthermore, the attitude of the monocycle 2002 shown in FIG. 23 to FIG. 25 is the attitude in the upright state.

As shown in FIG. 23, the monocycle 2002 has the wheel 2008, the car body 2004, the CMG 2030 as an example of an attitude control mechanism, and an internal motor 2060 as an example of a driving motor which is a rotation control mechanism.

The wheel 2008 is provided rotatably about the rotation axis 2008a to the car body 2004, described later. As shown in FIG. 26, the wheel 2008 is in the shape of a round barrel shape. The wheel 2008 is provided with a metal inner pipe 2008b, and a rubber portion 2008c that covers the outer peripheral surface of the inner pipe 2008b at a center portion in the axial direction of the inner pipe 2008b (namely, the axial direction of the rotation axis 2008a of the wheel 2008). Furthermore, the length of the inner pipe 2008b in the axial direction is longer than that of the rubber portion 2008c in the axial direction, and both end portions of the inner pipe 2008b in the axial direction are supported rotatably about the rotation axis 2008a by the car body 2004. On the other hand, the external diameter of the rubber portion 2008c is larger than the external diameter of the inner pipe 2008b. Furthermore, the external diameter of the wheel 2008 (more accurately, the external diameter of the rubber portion 2008c) becomes shorter from the center portion to the end portion in the axial direction. Namely, in this embodiment, the external diameter at the center in the axial direction is the largest external diameter of the wheel 2008 (shown by reference character "r" in FIG. 25). Furthermore, the internal motor 2060 described later is provided inside the inner pipe 2008b. The wheel 2008 rotates by the driving force being transferred from the internal motor 2060.

Further, the wheel 2008 is provided with a contacting portion 2008d that can contact the ground while the monocycle 2002 is moving. As shown in FIG. 24 and FIG. 25, in this embodiment, the contacting portion 2008d is the entire peripheral surface of the rubber portion 2008c. Namely, the peripheral surface of the rubber portion 2008c can contact the ground from a one end portion to the other end portion in the axial direction. The monocycle 2002 runs by rotating the wheel 2008 in a state in which the contacting portion 2008d is contacting the ground, and for example, when the wheel 2008 rotates in a rotation direction shown by reference character F in FIG. 24, the monocycle 2002 moves forward. Furthermore, the contacting portion 2008d has a first contacting portion 2008f as an example of the contacting portion 2008d that is located on a lower side of the rotation axis 2008a and that can contact the ground while the monocycle 2002 is moving, and a second contacting portion 2008g as the contacting portion 2008d that is located on an upper side of the rotation axis 2008a. Furthermore, as a matter of course, a part corresponding to the first contacting portion 2008f and a part corresponding to the second contacting portion 2008g of the wheel 2008 change according to the rotation of the wheel 2008.

On the other hand, as shown in FIG. 25, non-contacting portions 2008e that do not contact the ground during the operation of the monocycle 2002 are provided on both end surfaces in the axial direction of the rubber portion 2008c. The non-contacting portions 2008e are adjacent to the contacting portion 2008d. Namely, in the case where the car body 2004 and the wheel 2008 incline to the side more than the state in which the one end portion or the other end portion of the first contacting portion 2008f in the axial direction is contacting the ground, the attitude of the monocycle 2002 cannot be restored to the non-inclined state.

Here, in the case where an imaginary plane that includes the rotation axis 2008a of the wheel 2008, and in which the normal direction is the horizontal direction (namely, the front-to-rear direction of the monocycle 2002 shown in FIG. 24) is a first plane (in FIG. 24, a plane that includes a line shown by reference character A-A, and that is perpendicular to the paper surface), a shape of a first intersection line 2100 that is a line of intersection of the first plane and the first contacting portion 2008f is an arc with a radius of curvature R, as shown in FIG. 25 (refer to FIG. 25). Furthermore, when it is assumed that an imaginary line which passes through a center 2103 of the first intersection line 2100 and intersects the rotation axis 2008a of the wheel 2008 (namely, an imaginary line that coincides with the rotation axis 2034a of the gimbal 2034 in FIG. 25) is a center line of the first intersection line 2100, a shape of a portion of the first intersection line 2100 at the one end side in the axial direction and a shape of a portion of the first intersection line 2100 of the other end side are almost axisymmetrical, with the center line as a boundary. Furthermore, in this embodiment, a center of curvature C of the arc is located approximately on the center line (refer to FIG. 25). Furthermore, as a matter of course, a second intersection line 2110 that is an intersection line of the second contacting portion 2008g and the first plane is also an arc. Furthermore, a third intersection line 2120 that is an intersection line of the non-contacting portion 2008e and the first plane is a straight line.

The car body 2004 is a metal structure and contains a part of the wheel 2008 inside and supports the wheel 2008 so that it can rotate. Furthermore, at the one end surface of the car body 2004 in the longitudinal direction (namely, a direction along the rotation axis 2008a of the wheel 2008), a counterbalance 2009 is provided for adjusting the position of a center of gravity of the monocycle 2002 (shown by reference character M in FIG. 24 and FIG. 25). As described in FIG. 23, this counterbalance 2009 is a ring-shaped metal weight. As shown in FIG. 24 and FIG. 25, by mounting the counterbalance 2009 on the monocycle 2002, the center of gravity M of the monocycle 2002 in this embodiment is located approximately on the first plane, and at the same time it is located approximately on the center line of the first intersection line 2100 (namely, on the Z axis). Furthermore, in this embodiment, it is assumed that the counterbalance 2009 is provided at the end portion of the car body 2004 in the direction along the rotation axis 2008a, however, it is not limited as such. For example, it is possible that the counterbalance 2009 is provided inside the inner pipe 2008b of the wheel 2008.

The CMG 2030 is for controlling the attitude of the monocycle 2002 in order to restore it, and as shown in FIG. 23 and the like, it is mounted on the upper portion of the car body 2004. The CMG 2030 is provided with a wheel 2032 that rotates at high speed (commonly referred to as a flywheel), the gimbal 2034 that holds the flywheel 2032 and that is rotatable about the rotation axis 2034a, a turn table 2036 that supports the gimbal 2034 and that rotates about the rotation axis 2034a integrally with the gimbal 2034, and a gimbal motor 2038 that controls rotation of the gimbal 2034. Furthermore, in a steady state, the rotation axis 2032a of the flywheel 2032 is along the rotation axis 2008a of the wheel 2008, namely, the Y axis shown in FIG. 23, and the rotation axis 2034a of the gimbal 2034 intersects the rotation axis 2008a (in other words, is along the Z axis in FIG. 23). Then, the flywheel 2032 rotates in a predetermined rotation direction (the direction shown by an arrow in FIG. 24), in the state that it is rotatably supported by the gimbal 2034, by the driving force being transferred from a driving mechanism not shown. Furthermore, the gimbal motor 2038 and the turn table 2036 are coupled by a belt, and when the driving force is transferred from the gimbal motor 2038 to the turn table 2036 by a belt pulley mechanism, the gimbal 2034 and the turn table 2036 integrally rotate about the rotation axis 2034a.

However, the mechanism for transferring the driving force to the gimbal 2034 is not limited to the belt pulley mechanism, and for example, a gear and the like can transfer the driving force.

The CMG 2030 according to this embodiment is provided with a control ability to restore the attitude of the monocycle 2002 from the inclined state to the non-inclined state. That is, the monocycle 2002 according to this embodiment can restore its attitude from the inclined state to the non-inclined state by the control of the CMG 2030. For example, when an external force that inclines the car body 2004 and the wheel 2008 to the side (namely, that rotates the car body 2004 and the wheel 2008 about the X axis) is applied to the monocycle 2002 that is in the upright state attitude, the attitude of the monocycle 2002 changes from the upright state to the inclined state. When this attitude change is detected, in order to restore the attitude of the monocycle 2002 to the upright state, the gimbal 2034 that holds the flywheel 2032 rotates about the rotation axis 2034a integrally with the turn table 2036, in the state that the flywheel 2032 is rotating at high speed. Thus, when the axial direction of the rotation axis 2032a of the flywheel 2032 changes, by the so-called gyro effect, the moment that rotates the car body 2004 and the wheel 2008 about the X axis (namely, the moment that restores the attitude of the monocycle 2002 from the inclined state to the non-inclined state) is generated, and by this moment the attitude of the monocycle 2002 can be restored from the inclined state to the non-inclined state.

Furthermore, the CMG 2030 according to this embodiment is provided with a control ability that restores the attitude of the monocycle 2002 to the original state from the state that it is changed so as to rotate about the Z axis. For example, in the case where an external force that rotates the car body 2004 and the wheel 2008 about the Z axis is applied, and the attitude of the monocycle 2002 has changed, the speed of the flywheel 2032 changes. By the increase or the decrease in speed of the flywheel 2032, the moment that makes the car body 2004 and the wheel 2008 rotate about the Z axis is generated, and by the moment the attitude of the monocycle 2002 can be restored to a desired state (namely, the state before the car body 2004 and the wheel 2008 starts to rotate about the Z axis).

The internal motor 2060 is a driving motor for rotating the wheel 2008. Further, the internal motor 2060 is provided with an ability to control a number of rotations of the wheel 2008, for restoring the attitude of the monocycle 2002 from the tilted state to the non-tilted state. That is, the monocycle 2002 according to this embodiment can restore its attitude from the tilted state to the non-tilted state, by the internal motor 2060 controlling the number of rotations of the wheel 2008. For example, when an external force that inclines the car body 2004 in the front-to-rear direction (namely, that rotates the car body 2004 about the Y axis) is applied to the monocycle 2002 in the upright state attitude, the attitude of the monocycle 2002 changes from the upright state to the tilted state. When this attitude change is detected, the rotation speed of the wheel 2008 increases or decreases, by the control of the internal motor 2060. By the change of the rotation speed of the wheel 2008, the moment that makes the car body 2004 rotate about the Y axis (namely, the force that restores the attitude of the monocycle 2002 from the tilted state to the non-tilted state) is generated, and by this moment, the attitude of the monocycle 2002 can be restored from the tilted state to the non-tilted state.

Note that, the monocycle 2002 is provided with an attitude sensor (not shown) such as an attitude gyro, and detects the above-mentioned attitude change by the attitude sensor. Further, the monocycle 2002 is provided with a main controller (not shown). The main controller is provided with a CPU, a RAM, a ROM, and the like, and the main controller controls the wheel 2008, the CMG 2030, and the like according to an output from the attitude sensor.

Method of Determining the Shape of Wheel 2008

Previously, the shape of the wheel 2008 had been determined from the viewpoint of, for example, versatility, manufacturability, design, and the like. However, the shape of the wheel 2008 influences the performance of the monocycle 2002, and in particular, whether or not the attitude of the monocycle 2002 in the inclined state is restored to the non-inclined state depends on the shape of the wheel 2008. Therefore, in the case where the wheel 2008 with a shape that was determined from the above viewpoint is provided to the monocycle 2002, there is a possibility that the attitude of the monocycle 2002 in the inclined state can not be appropriately restored to the non-inclined state by the control of the CMG 2030, and it becomes difficult to improve the performance of the monocycle 2002.

Figure 27:
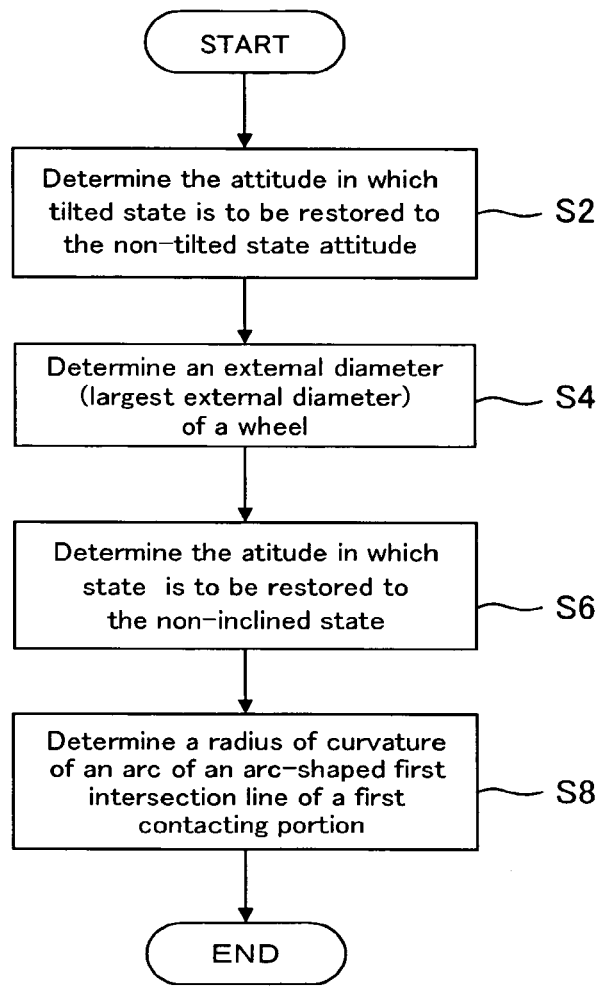
FIG. 27 is a flowchart showing a method of determining a shape of the wheel 2008.
Figure 28:
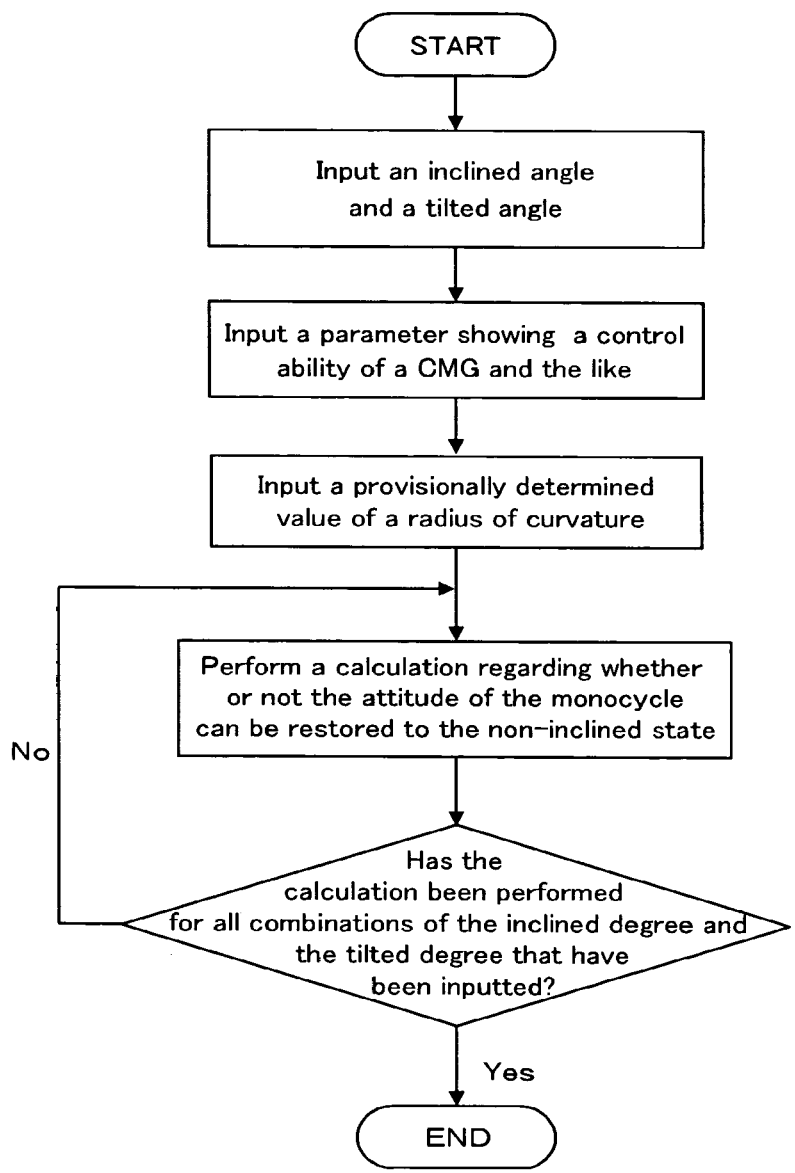
FIG. 28 is a flowchart of a numerical calculation performed for determining a radius of curvature R of a first intersection line 2100 which is an arc.
Figure 29A:
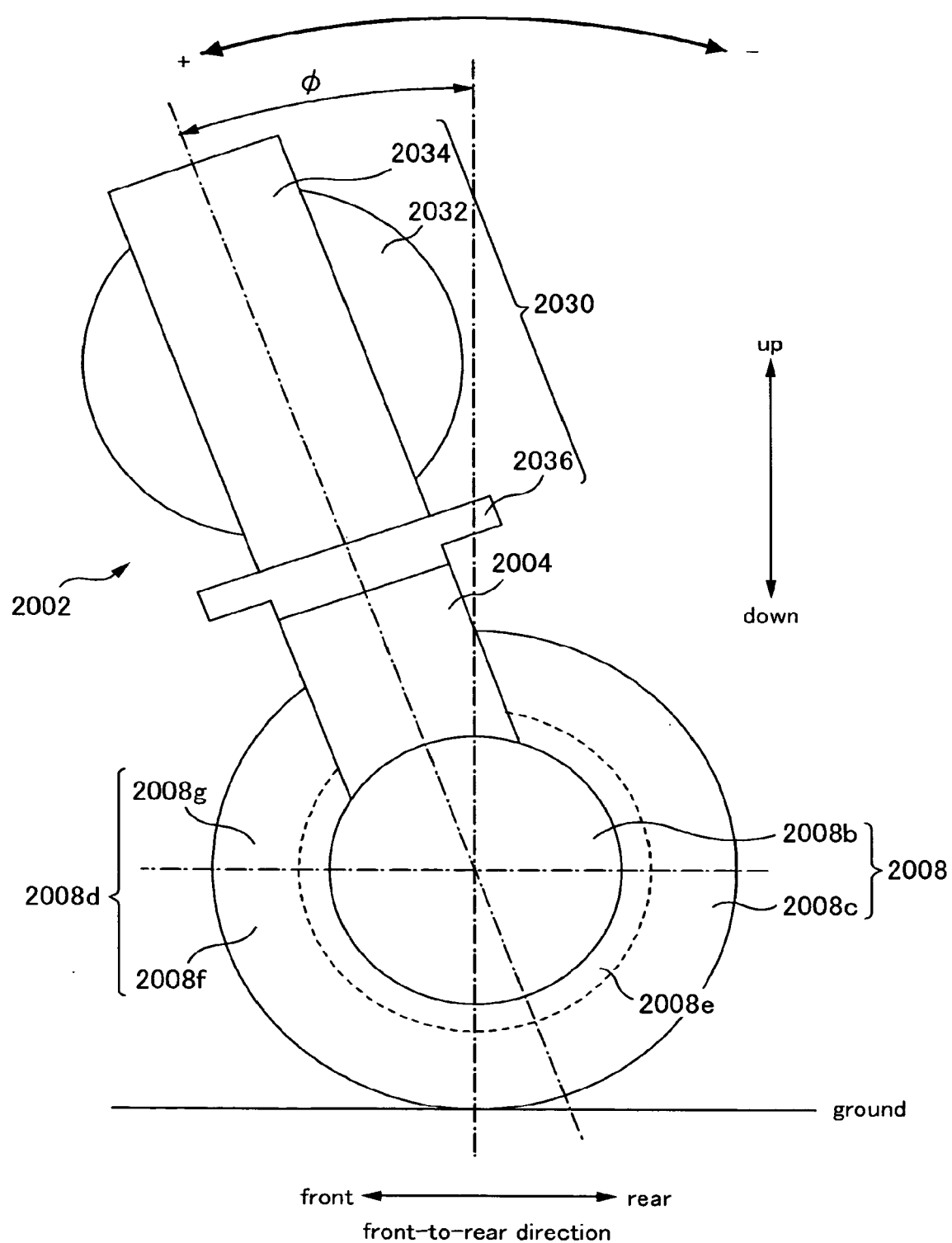
FIG. 29A shows the monocycle 2002 with its attitude changed from an upright state, and is an explanatory diagram regarding a tilted angle when the attitude of the monocycle 2002 is in a tilted state.
Figure 29B:
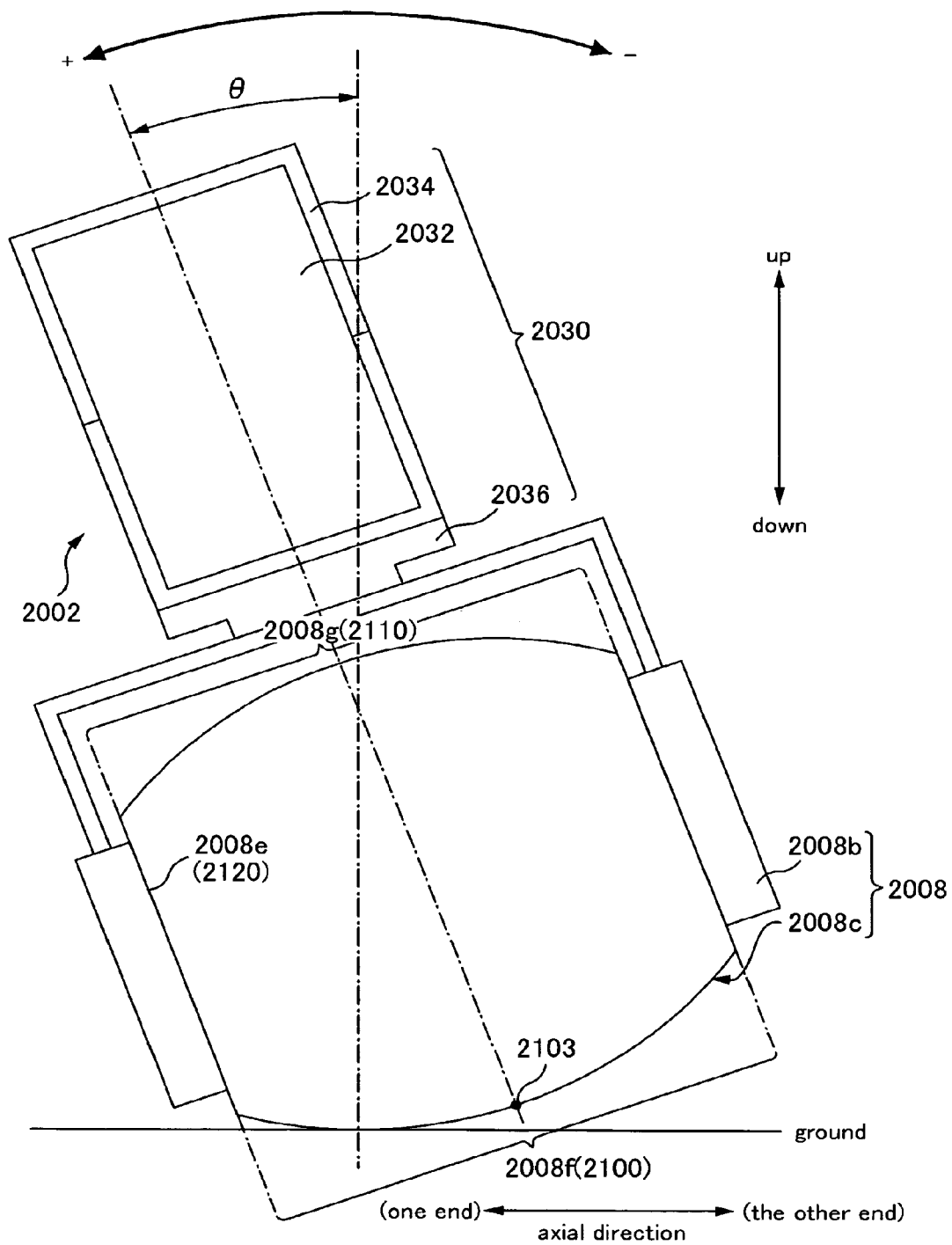
FIG. 29B shows the monocycle 2002 with its attitude changed from the upright state, and is an explanatory diagram regarding an inclined angle when the attitude of the monocycle 2002 is in an inclined state.
Figure 30:
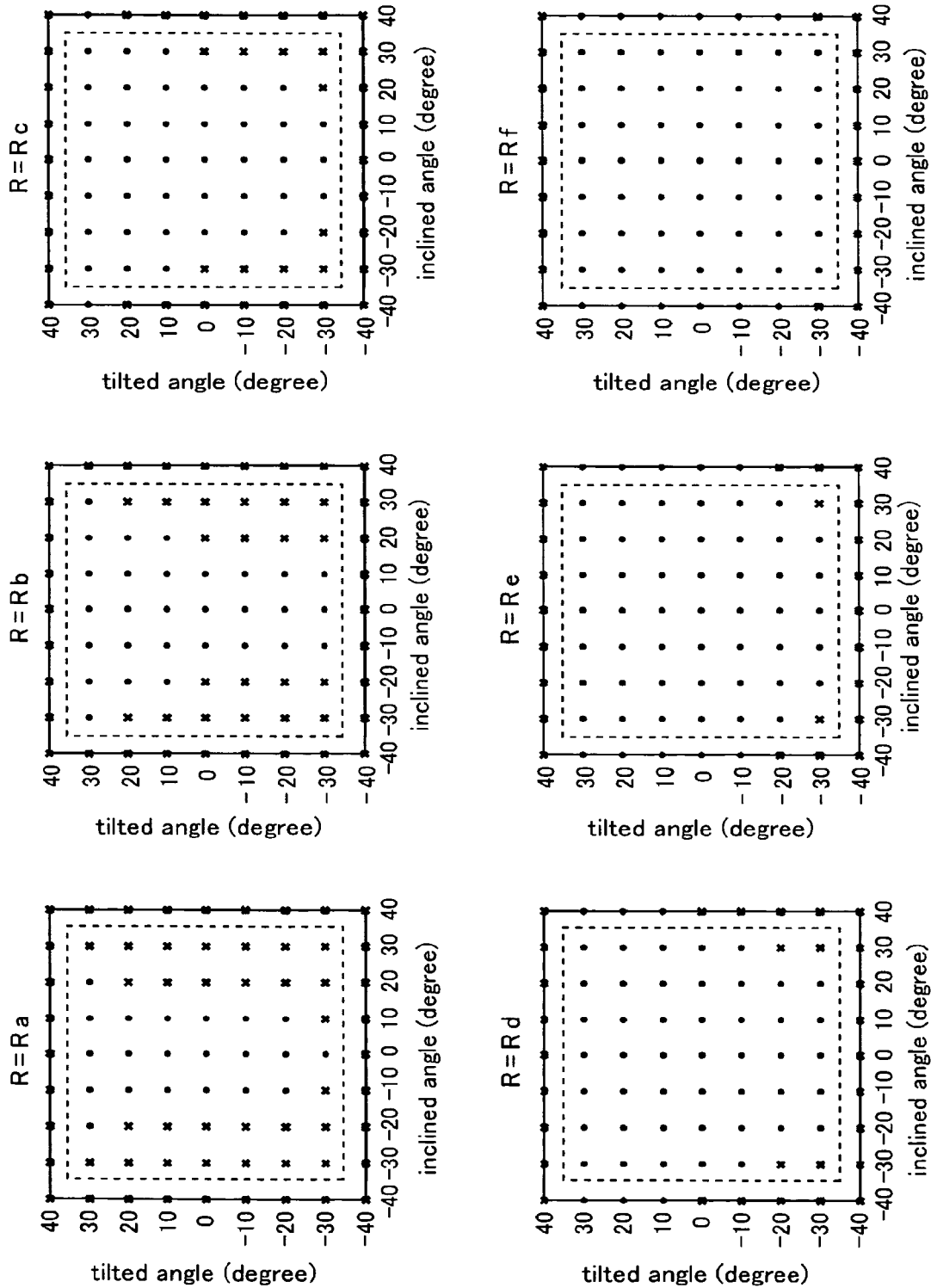
FIG. 30 is a diagram for explaining calculation results obtained by the numerical calculations performed for determining the radius of curvature R.
Figure 31:
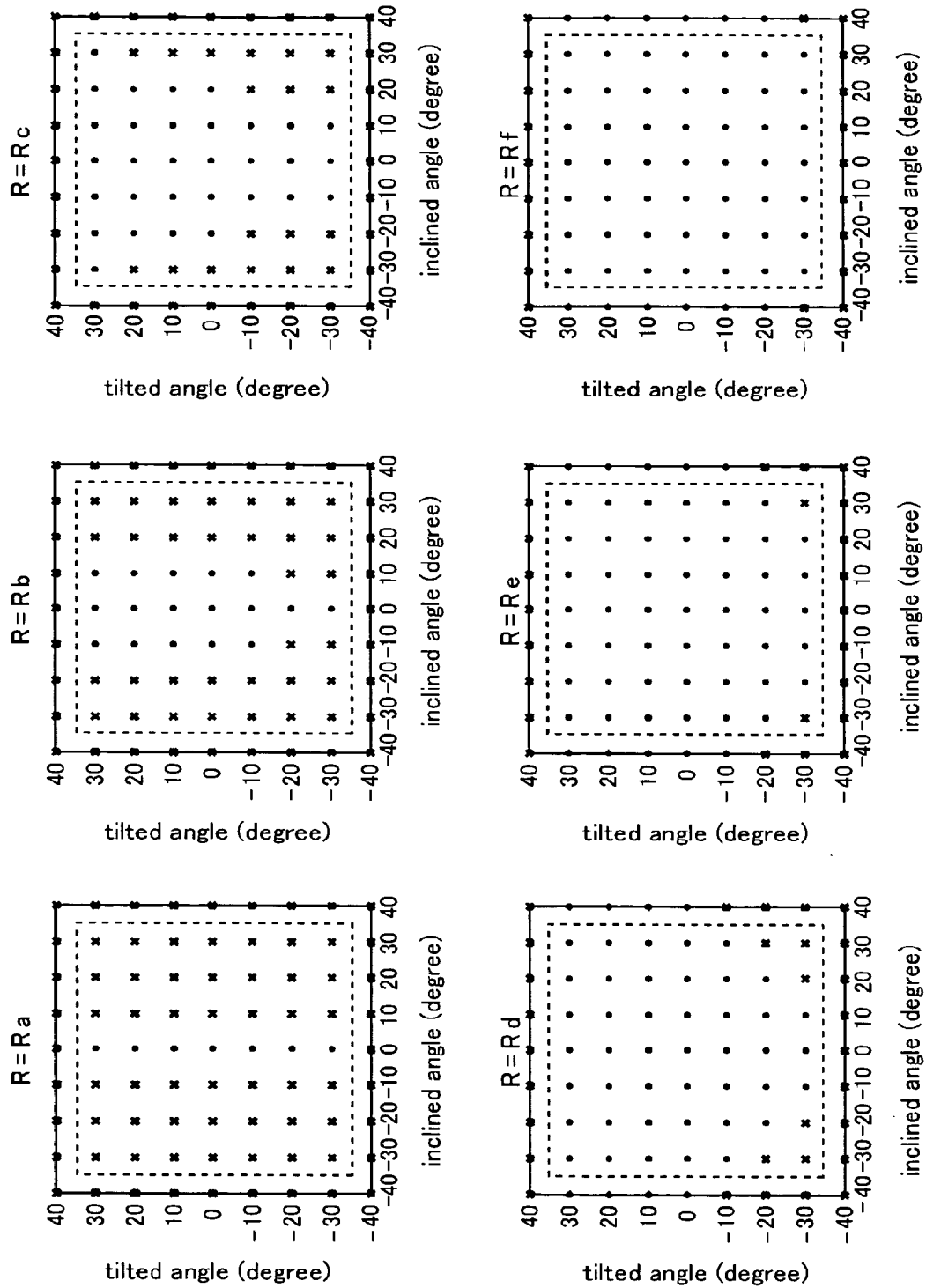
FIG. 31 is a drawing that corresponds to FIG. 30, and shows the results of the numerical calculations performed by changing the maximum number of rotations of a flywheel 2032, that is inputted at the time of the numerical calculations shown in FIG. 30.
Figure 32:
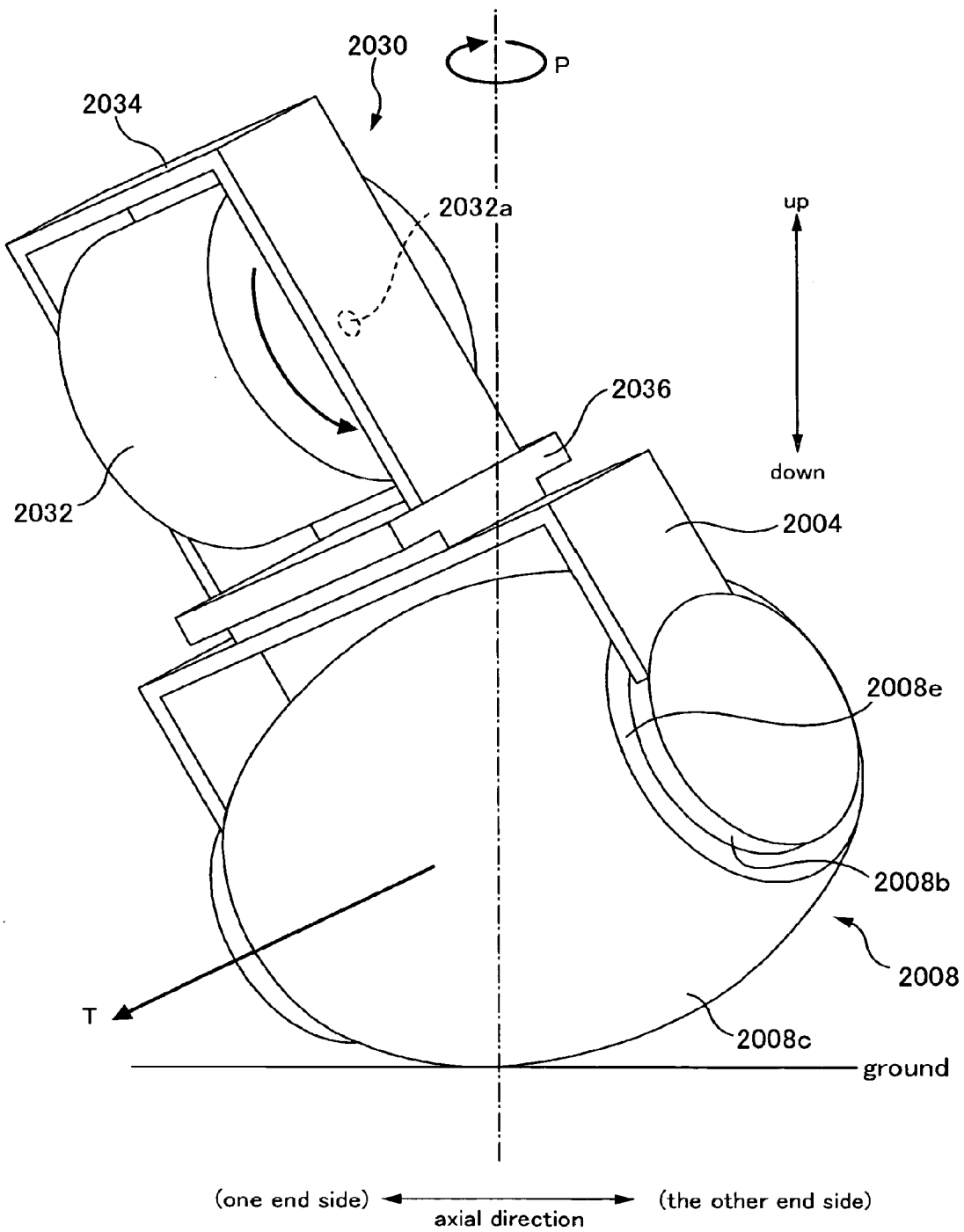
FIG. 32 is a diagram describing a rotation moment which is generated when the attitude of the monocycle 2002 is in the inclined state and in the tilted state.

In this paragraph, a method of determining the shape of the wheel 2008 by considering the attitude restoring performance and the control ability of the CMG 2030 described above, in order to improve the performance of the monocycle 2002 is described by using FIG. 27 to FIG. 32. FIG. 27 is a flowchart showing the method of determining the shape of the wheel 2008. FIG. 28 is a flowchart of a numerical calculation for determining the radius of curvature R of the first intersection line 2100 which is an arc. FIG. 29A and FIG. 29B are diagrams for describing the state of the attitude of the monocycle 2002. FIG. 29A is a drawing that corresponds to FIG. 24, and it is for describing the tilted angle when the attitude of the monocycle 2002 is in the tilted state. Also, FIG. 29B is a drawing that corresponds to FIG. 25, and it is for describing the inclined angle when the attitude of the monocycle 2002 is in the inclined state. FIG. 30 is a drawing for describing the calculation results achieved by the numerical calculations for determining the radius of curvature R, and it is a graph showing the calculation results when the value of the radius of curvature R is provisionally determined as Rb. FIG. 31 is a drawing that corresponds to FIG. 30. FIG. 31 shows calculation results in the case where the maximum number of rotations of the flywheel 2032 is changed to a value that is half the maximum number of rotations that is input when obtaining the calculation results shown in FIG. 30. FIG. 32 is a drawing that describes the rotation moment which is generated when the attitude of the monocycle 2002 is in the inclined state and also in the tilted state. Furthermore, in FIG. 29A, the front-to rear direction of the monocycle 2002 and the vertical direction of the monocycle 2002 in the upright state are each shown by arrows. Further, in FIG. 29B, the axial direction of the rotation axis 2008a of the wheel 2008 of the monocycle 2002 and the vertical direction of the monocycle 2002 in the upright state are each shown by arrows. Further, in the graphs shown in FIG. 30 and FIG. 31, the vertical axis indicates the tilted angle, and the horizontal axis indicates the inclined angle, respectively. Further, plots on the coordinates of the graphs show whether or not the attitude of the monocycle 2002 can be restored to the non-inclined state, from the state shown at the coordinates. Among the plots, a black round plot indicates that the attitude of the monocycle 2002 can be restored to the non-inclined state, and a cross plot indicates that the attitude cannot be restored to the non-inclined state, respectively. Further, each of the graphs shown in FIG. 30 and FIG. 31 shows the calculation results when the provisionally determined value of the radius of curvature R is changed to Ra, Rb, Rc, Rd, Re, and Rf, and the sizes of the provisionally determined values Ra, Rb, Rc, Rd, Re, and Rf become larger in this order. Further, in FIG. 32, the axial direction of the rotation axis 2008a of the wheel 2008 of the monocycle 2002 and the vertical direction of the monocycle 2002 in the upright state are each shown by arrows.

Hereafter, each step in the method of determining the shape of the wheel 2008 is described.

Step of Determining which Tilted State Attitude is to be Restored to the Non-Tilted State Attitude In determining the shape of the wheel 2008, first, in order to set the attitude restoring performance of the monocycle 2002, the attitude in which tilted state is to be restored to the non-tilted state attitude is determined (S2). The result that is determined is illustrated by the tilted angle (the angle shown by reference character $\phi$ in FIG. 29A) when the car body 2004 tilts in the front-to-rear direction. For example, when the tilted angle $\phi$ is determined as 30 degrees, an attitude restoring performance of the monocycle 2002 is set so that even if the car body 2004 tilts so as to rotate 30 degrees about the Y axis, the attitude of the monocycle 2002 can be restored to the non-inclined state. Further, as shown in FIG. 29A, with the attitude in the non-tilted state as a reference (namely, considering that the tilted angle $\phi$ is 0 degrees), the tilted angle when the car body 2004 tilts forward is regarded as a positive angle, and the tilted angle when the car body 2004 tilts backward is regarded as a negative angle.

Step of Determining the Largest External Diameter of the Wheel

Next, as a shape of the wheel 2008, the external diameter of the wheel 2008 at the center of the rotation axis 2008a in the axial direction, namely the largest external diameter r of the wheel 2008 is determined (S4). The largest external diameter r is determined based on the determination result of step S2 that determines the attitude in which tilted state is to be restored to the non-tilted state, described above. Namely, since the largest external diameter r affects whether the attitude restoring performance that has been set will be achieved or not, the largest external diameter r is determined so that the attitude in the tilted state in which its tilted angle $\phi$ is a value that indicates the determination result, can be restored to the non-tilted state. On the other hand, when determining the largest external diameter r, a parameter showing the control ability of the internal motor 2060 is considered. The parameter includes a maximum output of the internal motor 2060. Namely, whether or not the car body 2004 can restore its attitude from the tilted state that is tilted by the tilted angle $\phi$ indicating the above determination result, to the non-tilted state, also depends on the maximum output of the internal motor 2060 that controls the number of the rotations of the wheel 2008. Thus, even if the wheel 2008 with the same largest external diameter r is provided to the monocycle 2002, the tilted state that can be restored to the non-tilted state will differ if the maximum output of the internal motor 2060 differs. Therefore, by determining the largest external diameter r, based on the determination result and the maximum output of the internal motor 2060, it becomes possible to restore the attitude from the tilted state to the non-tilted state, when the car body 2004 tilts at the tilted angle $\phi$ showing the determination result. Namely, by the monocycle 2002 being provided with the wheel 2008 having the largest external diameter r that is determined by such determination method, the attitude restoring performance of the monocycle 2002 that has been set will be achieved. Furthermore, for example, it is possible to apply a well known calculation method as the calculation method of the largest external diameter r, and a value that is calculated by inputting to the calculation method the tilted angle $\phi$ showing the determination result and the maximum output of the internal motor 2060 is adopted as the largest external diameter r.

Step of Determining an Attitude in which State is to be Restored to the Non-Inclined State Next, in order to set the attitude restoring performance of the monocycle 2002, the attitude in which state is to be restored to the non-inclined state is determined (S6). Specifically, the attitude in which inclined state and in which tilted state is to be restored, is determined. Then, the determination results are expressed by the tilted angle $\phi$ in the case where the car body 2004 tilts in the front-to-rear direction, and by the inclined angle in the case where the car body 2004 and the wheel 2008 incline in the horizontal direction (the angle shown by reference character $\theta$ in FIG. 29B). For example, in the case where the tilted angle $\phi$ is determined as 30 degrees, and the inclined angle is determined as 20 degrees, the attitude restoring performance of the monocycle 2002 is set so that the attitude of the monocycle 2002 in the state that the car body 2004 is tilted so as to rotate 30 degrees about the Y axis, and the car body 2004 and the wheel 2008 are inclined so as to rotate 20 degrees about the X axis, can be restored to the non-inclined state. Further, as shown in FIG. 29B, with the attitude of the monocycle 2002 in the non-inclined state as a reference (namely, considering that the inclined angle $\theta$ is 0 degree), the inclined angle when the car body 2004 and the wheel 2008 incline to the one end side in the axial direction of the rotation axis 2008a of the wheel 2008 (to be more accurate, the axial direction of the rotation axis 2008a when the attitude of the monocycle 2002 is in the upright state) is regarded as a positive angle, and the inclined angle when the car body 2004 and the wheel 2008 incline to the other end side is regarded as a negative angle.

Step of Determining Radius of Curvature of an Arc

Next, as a shape of the wheel 2008, with respect to the first intersection line 2100 that is an arc, the radius of curvature R of the arc is determined (S8). This radius of curvature R is determined, based on the determination results of step S6 that determine the attitude in which inclined state and in which tilted state is to be restored to the non-inclined state, and the parameter that shows the control ability of the CMG 2030 which affects whether the attitude restoring performance is achieved or not. In the case where the wheel 2008 having the radius of curvature R determined by such determination method is provided to the monocycle 2002, the monocycle 2002 can appropriately restore its attitude to the non-inclined state by the control of the CMG 2030, even in the case where the attitude of the monocycle 2002 changes to the state shown by the determination result. Further, in this embodiment, when determining the radius of curvature R, the numerical calculation shown in FIG. 28 is performed regarding the state of the attitude of the monocycle 2002 that can be restored to the non-inclined state. Hereafter, the procedure of the numerical calculation is described.

First, in order to determine to which state the numerical calculation is to be performed on, a value regarding the inclined state and the tilted state which is an object of the numerical calculation is inputted. Specifically, the inclined angle $\theta$ as the value showing the inclined state, and the tilted angle $\phi$ as the value showing the tilted state are inputted respectively. Further, in this embodiment, the input value of the inclined angle $\theta$, and input value of the tilted angle $\phi$ are both in the range of 40 degrees to −40 degrees, and are values in 10 degree increments.

Next, the parameter showing the control ability of the CMG 2030 and the like is inputted. Further, in this embodiment, the parameter showing the control ability of the CMG 2030 includes the maximum number of rotations of the flywheel 2032, the diameter of the flywheel 2032, the maximum output of the gimbal motor 2038 and the like.

Next, when performing the numerical calculation, the value of the radius of curvature R is provisionally determined, and the provisionally determined value of the radius of curvature R is inputted.

After the input mentioned above is performed, based on the inputted value, the calculation regarding whether or not the attitude in the inclined state and the tilted state which is inputted is to be restored to the non-inclined state, is performed. Specifically, it is decided whether or not the attitude in a state that is shown by a combination of the inclined angle θ inputted as the value showing the inclined state, and the tilted angle φ inputted as the value showing the tilted state, can be restored to the non-inclined state, within the range of the control ability of the CMG 2030 provided to the monocycle 2002.

As shown in FIG. 28, the calculation in this embodiment is repeatedly performed until it is decided whether or not the attitude of the monocycle 2002 can be restored, in respect to all combinations of the inclined angle θ and the tilted angle φ. When the calculations regarding all the combinations are finished, the numerical calculations are completed, and the graphs shown in FIG. 30 are obtained as the calculation results. For example, in the case where the numerical calculation is performed by provisionally determining the value of the radius of curvature R as Ra, the graph shown in the left side of the upper row in FIG. 30 is obtained. Further, as shown in FIG. 30, when the provisionally determined value of the radius of curvature R is changed, different calculation results can be obtained, regarding the state that can be restored to the non-inclined state. On the other hand, as shown in FIG. 31, as an example of the parameter showing the control ability of the CMG 2030, in the case where the number of rotations of the flywheel 2032 has changed, the calculation results become different. This means that, regarding the attitude of the monocycle 2002, the inclined state and the tilted state that can be restored to the non-inclined state depends on the radius of curvature R of the first intersection line 2100, and the control ability of the CMG 2030. Further, such a relationship is expressed by an equation of motion regarding variations of the attitude of the monocycle 2002, with the radius of curvature R, the parameter showing the control ability of the CMG 2030, and the like as variables. By solving the equation of motion by the numerical calculations, it is possible to decide whether or not the attitude in each state that is shown by the determination result can be restored to the non-inclined state.

From the calculation results obtained by the numerical calculations, the provisionally determined value of the radius of curvature R, when the state in which it is decided that the attitude of the monocycle 2002 can be restored to the non-inclined state (namely, in FIG. 30 and FIG. 31, the inclined state and the tilted state shown by the coordinates with black round dots) satisfies the determination result, is determined. Then, the provisionally determined value of the radius of curvature R is determined as the shape of the wheel 2008. For example, in order to set the attitude restoring performance of the monocycle 2002, if the attitude in the inclined state in which the inclined angle is 30 degrees to −30 degrees and in the tilted state in which the tilted angle is 30 degrees to −30 degrees is determined to be restored to the non-inclined state, in the calculation results shown in FIG. 30, since the calculation result when the radius of curvature R is provisionally determined as Rf satisfies the determination result (the range surrounded by the short dashed line in FIG. 30), as the shape of the wheel 2008, the radius of curvature R is determined as Rf.

According to the above-mentioned determination method of the radius of curvature R, as the attitude restoring performance of the monocycle 2002, the attitude in which state (more specifically, which inclined state and tilted state) can be restored to the non-inclined state is determined, and based on the determination result and the parameter showing the control ability of the CMG 2030, the radius of curvature R with which the attitude in the state shown by the determination result can be restored to the non-inclined state is to be determined. As a result, when the attitude of the monocycle 2002 changes to the inclined state, or the tilted state within the range of the set attitude restoring performance, it is possible to appropriately restore the attitude to the non-inclined state, by the control of the CMG 2030, and thus the performance of the monocycle 2002 improves.

Moreover, in this embodiment, in order to determine the attitude in which state is to be restored to the non-inclined state, the attitude in which inclined state and which tilted state is to be restored is determined. Therefore, the attitude in which inclined state and which tilted state is to be restored becomes clear, and the shape of the wheel 2008 can be determined, by considering the rotation moment that is generated when the attitude of the monocycle 2002 is in the inclined state and the tilted state. Specifically, for example, during the running movement of the monocycle 2002, in the case where the attitude of the monocycle 2002 is in the inclined state in which the car body 2004 and the wheel 2008 are inclined to the one end side of the rotation axis 2008a of the wheel 2008 in the axial direction, and in the tilted state in which the car body 2004 is tilted forward, the monocycle 2002 performs a movement that turns in a predetermined rotation direction (the rotation direction shown by reference character P in FIG. 32), about an imaginary axis along the vertical direction (the imaginary axis shown in a long dashed line in FIG. 32). In connection with this movement, the axial direction of the rotation axis 2032a of the flywheel 2032 provided to the CMG 2030 changes. At that time, the direction of angular momentum of the flywheel 2032 changes, and therefore by the gyro-effect, the rotation moment (the rotation moment in the direction shown by reference character T in FIG. 32) that rotates the monocycle 2002 about the X axis is generated. The rotation moment T needs to be considered when determining the shape of the wheel 2008 (especially, the radius of curvature R of the first intersection line 2100), since it affects whether the set attitude restoring performance is achieved or not. Further, size and direction of the rotation moment T is determined by the degree of the inclined state of the attitude of the monocycle 2002 (namely, the inclined angle θ) and the degree of the tilted state (namely, the tilted angle φ). Therefore, if it is clear the attitude in which inclined state and which tilted state is to be restored, the rotation moment T that changes the attitude can be considered, and the shape of the wheel 2008 can be determined more appropriately.

Further, in the numerical calculation according to this embodiment, it is to be decided whether or not the attitude can be restored to the non-inclined state, for all the combinations of the inclined angle θ and the tilted angle φ. Namely, the decision is carried out for a plurality of times, however, it is not limited as such. For example, the decision can be performed for only one time, regarding the state which is expressed by the combination of the maximum value of the inclined angle θ and the maximum value of the tilted angle φ.

Further, in this embodiment, the radius of curvature R is determined as for the shape of the wheel 2008, however, it is not limited as such. For example, instead of the radius of curvature R, a relative position of the center of curvature C of the first intersection line 2100 that is an arc, with respect to the center of gravity M of the monocycle 2002 can be determined.

Other Embodiments

A method of determining the shape of a wheel according to this invention is described as above based on the above-mentioned embodiment, however, the foregoing embodiment is for the purpose of elucidating the present invention, and is not to be interpreted as limiting the present invention. This invention can be altered and improved without departing from the gist thereof, and of course includes its equivalents.

Furthermore, in the above embodiment, it is assumed that the number of the wheel 2008 is one, however it is not limited as such, and the number of the wheel 2008 can be a plurality. Namely, in the above embodiment, the monocycle 2002 is described as an example of a car, however it is not limited as such. This invention can be applied, for example, when determining the shape of the wheel 2008 that is provided to a two-wheeled vehicle, a three-wheeled vehicle, a four-wheeled vehicle and the like. However, in the case where the number of the wheel 2008 is one, the attitude of the car is more liable to become an inclined state, as compared to the case where the number of the wheel 2008 is a plurality, thus the shape of the wheel 2008 needs to be more appropriately determined, in order to achieve the attitude restoring performance of the car. Therefore, the method of determining the shape of the wheel 2008 according to this invention becomes more significant. In this respect, the above-mentioned embodiment is more preferable.

Furthermore, in the above embodiment, the monocycle 2002 is provided with the CMG 2030 as the attitude control mechanism. In this case, according to the control ability of the CMG 2030, the shape of the wheel 2008 can be determined. However, as the attitude control mechanism, it is not limited to the CMG 2030. For example, this invention can also be applied in the case where a person's hands and feet are used as the attitude control mechanism, as in the case of a wheelbarrow. In such a case, the shape of the wheel 2008 can be determined, according to the control ability of the person for controlling the attitude of the wheelbarrow. Further, in such a case, as the parameter showing the control ability of the attitude control mechanism that is inputted in the numerical calculation, a maximum value of the force which the person can exert for controlling the attitude of the wheelbarrow and the like is used.

Furthermore, in the above embodiment, there is described the case in which the rotation axis 2032a of the flywheel 2032 is along the rotation axis 2008a of the wheel 2008, however, it is not limited as such. For example, the rotation axis 2032a of the flywheel 2032 can be along the direction that intersects the rotation axis 2008a of the wheel 2008.

Furthermore, in the above embodiment, the largest external diameter r is determined based on the determination result with respect to the attitude in which tilted state is to be restored to the non-tilted state, and the maximum output of the internal motor 2060, however, it is not limited as such. For example, in the method of determining the shape of the wheel 2008 described above, step S2 for determining the attitude in which tilted state is to be restored to the non-tilted state, and step S4 for determining the largest external diameter r of the wheel 2008 can be omitted. However, in the case where the largest external diameter r is determined based on the determination result and the maximum output of the internal motor 2060, it is possible to realize the monocycle 2002 that can appropriately restore the attitude which is in the tilted state shown by the determination result to the non-tilted state. In this respect, the above-mentioned embodiment is more preferable.

Furthermore, in the above embodiment, the internal motor 2060 is provided as a rotation control mechanism for controlling the number of rotations of the wheel 2008, however, it is not limited as such. For example, as other rotation control mechanisms, an apparatus such as a brake can be provided to the monocycle 2002. In such a case, as the parameter showing the control ability of the rotation control mechanism which has to be considered when determining the largest external diameter r, for example, a maximum value and a minimum value of a force which is applied to the wheel 2008 by the brake for controlling the rotation of the wheel 2008 can be mentioned.

Furthermore, in the above embodiment, as the parameter showing the control ability of the CMG 2030, the maximum number of rotations of the flywheel 2032, the diameter of the flywheel 2032, the maximum output of the gimbal motor 2038 and the like are employed, however, it is not limited as such. For example, as the parameter, instead of the parameters mentioned above, an output limit value of the moment which the CMG 2030 generates for controlling the attitude of the monocycle 2002, and the like can be employed.

What is claimed is:

1. A car having a wheel that is rotatable about a rotation axis comprising,
an attitude control mechanism for controlling an attitude of the car,
wherein the wheel has a contacting portion that can contact a ground while the car is moving, the contacting portion being located lower than the rotation axis,
wherein an intersection line formed by an intersection of the contacting portion and a first imaginary plane is a curved line, the first imaginary plane being an imaginary plane that includes the rotation axis and in which a direction of a normal thereof is a horizontal direction, the direction of the normal of the first imaginary plane being perpendicular to the rotation axis,
wherein among the points on the curved line are included a first point that satisfies a following first condition and a second point that satisfies a following second condition,
wherein in the first condition, an intersection between a second imaginary plane and a line from a center of gravity of the car to a center of the intersection line is located lower than the center of gravity of the car, the second imaginary plane including the first point and being perpendicular to the first imaginary plane, a direction of a normal of the second imaginary plane being a tangential direction of the curved line at the first point,
wherein in the second condition, an intersection between a third imaginary plane and a line extending from the center of the intersection line through the center of gravity of the car is located higher than the center of gravity of the car, the third imaginary plane including the second point and being perpendicular to the first imaginary plane, a direction of a normal of the third imaginary plane being a tangential direction of the curved line at the second point,
wherein a shape of the contacting portion is configured to allow the attitude of the car to be changed to an inclined state,
wherein both ends of the intersection line are adjacent to non-contacting portions that do not contact the ground while the car is moving, and that is provided on the wheel, wherein a center of the intersection line contacts the ground when the car is in an upright state, wherein the intersection line includes a first curved line portion in which all points on the line are the first points and a second curved line portion in which all points on the line are the second points, and wherein the second curved line portion is located at both end portions of the intersection line.

2. A car having a wheel that is rotatable about a rotation axis comprising, an attitude control mechanism for controlling an attitude of the car, wherein the wheel has a contacting portion that can contact a ground while the car is moving, the contacting portion being located lower than the rotation axis, wherein an intersection line formed by an intersection of the contacting portion and a first imaginary plane is a curved line, the first imaginary plane being an imaginary plane that includes the rotation axis and in which a direction of a normal thereof is a horizontal direction, the direction of the normal of the first imaginary plane being perpendicular to the rotation axis, wherein among the points on the curved line are included a first point that satisfies a following first condition and a second point that satisfies a following second condition, wherein in the first condition, an intersection between a second imaginary plane and a line from a center of gravity of the car to a center of the intersection line is located lower than the center of gravity of the car, the second imaginary plane including the first point and being perpendicular to the first imaginary plane, a direction of a normal of the second imaginary plane being a tangential direction of the curved line at the first point, wherein in the second condition, an intersection between a third imaginary plane and a line extending from the center of the intersection line through the center of gravity of the car is located higher than the center of gravity of the car, the third imaginary plane including the second point and being perpendicular to the first imaginary plane, a direction of a normal of the third imaginary plane being a tangential direction of the curved line at the second point, wherein a shape of the contacting portion is configured to allow the attitude of the car to be changed to an inclined state, and wherein the car has only one wheel.

* * * * *